(12) United States Patent
Nagai et al.

(10) Patent No.: US 6,639,585 B1
(45) Date of Patent: Oct. 28, 2003

(54) COORDINATE READING DEVICE

(75) Inventors: Takuya Nagai, Nagoya (JP); Tsuyoshi Ohashi, Nagoya (JP); Kazunari Taki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 85 days.

(21) Appl. No.: 09/634,322

(22) Filed: Aug. 7, 2000

Related U.S. Application Data

(63) Continuation-in-part of application No. 09/628,724, filed on Jul. 28, 2000.

(30) Foreign Application Priority Data

| Jul. 29, 1999 | (JP) | P11-215390 |
| Jul. 29, 1999 | (JP) | P11-215392 |
| Aug. 6, 1999 | (JP) | P11-223530 |
| Sep. 16, 1999 | (JP) | P11-261596 |
| Nov. 9, 1999 | (JP) | P11-317788 |
| Nov. 15, 1999 | (JP) | P11-323476 |
| Nov. 15, 1999 | (JP) | P11-323482 |

(51) Int. Cl.$^7$ .............................................. G09G 5/00
(52) U.S. Cl. ..................................... 345/173; 178/18.3
(58) Field of Search ............................. 345/173; 178/18

(56) References Cited

U.S. PATENT DOCUMENTS

| 4,752,655 A | * | 6/1988 | Tajiri et al. ................... 178/18 |
| 5,136,125 A | | 8/1992 | Russell |
| 5,420,379 A | | 5/1995 | Zank et al. |
| 5,644,108 A | | 7/1997 | Katsurahira et al. |
| 5,831,599 A | * | 11/1998 | Inoue .......................... 345/173 |
| 6,414,673 B1 | * | 7/2002 | Wood et al. ................. 345/173 |

FOREIGN PATENT DOCUMENTS

| JP | 56145474 | 11/1981 |
| JP | 2190919 | 7/1990 |
| JP | 5-143224 | 6/1993 |
| JP | 5-165560 | 7/1993 |
| JP | 7-56677 | 3/1995 |
| JP | 8202491 | 8/1996 |

* cited by examiner

Primary Examiner—Matthew C. Bella
Assistant Examiner—Tam Tran
(74) Attorney, Agent, or Firm—Oliff & Berridge, PLC

(57) ABSTRACT

When there exist two X coils that generate voltages of the same values during the X coil-scan operation (yes in S314), the CPU 56 discards the position coordinate table 58a that is already stored in the work area, and reloads a new position coordinate table 58a from the ROM 58, and then stores the position coordinate table 58a in association with the pen attribute data that is detected in S310. Then, the CPU 58 calculates a ratio r between the detected value d and the reference value g in S318, and multiplies, with the ratio r, each voltage difference value DIFF in the reloaded position coordinate table 58a in S320. As a result, the position coordinate table 58a is corrected in correspondence with the lowering of the output level of the alternating magnetic field of the pen 60. The CPU then calculates the X coordinate based on the corrected position coordinate table 58a.

37 Claims, 55 Drawing Sheets

FIG.9
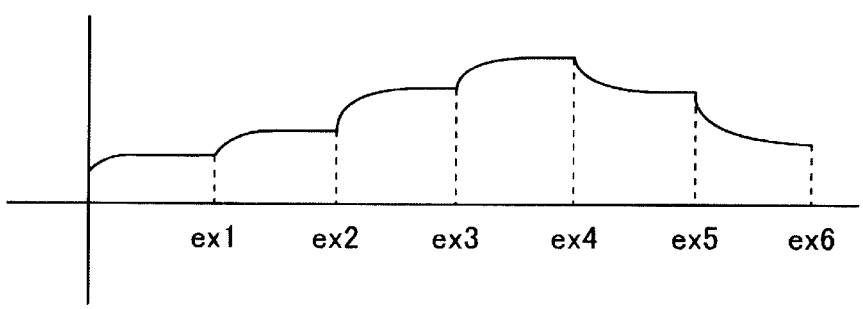

| ΔX ΔY | DIFF |
|---|---|
| 0 | 167 |
| 1 | 157 |
| 2 | 147 |
| 3 | 137 |
| ⋮ | ⋮ |
| 12.5 | 0 |

| ΔX ΔY | DIFF |
|---|---|
| 0 | 83 |
| 1 | 78 |
| 2 | 73 |
| 3 | 68 |
| ⋮ | ⋮ |
| 12.5 | 0 |

RAM 59

| BLACK COLOR | POSITION COORDINATE TABLE 58a |
|---|---|
| TEMPORARY STORAGE AREA 59a | |
| FINALIZED AREA 59b | |
| ⋮ | |

TEMPORARY STORAGE AREA 59a

| COIL NUMBER | DETECTED VALUES |
|---|---|
| X1 | 0 |
| X2 | 0 |
| X3 | 26 |
| X4 | 102 |
| X5 | 128 |
| X6 | 128 |
| X7 | 102 |
| X8 | 26 |
| X9 | 0 |
| ⋮ | ⋮ |
| Xm | 0 |

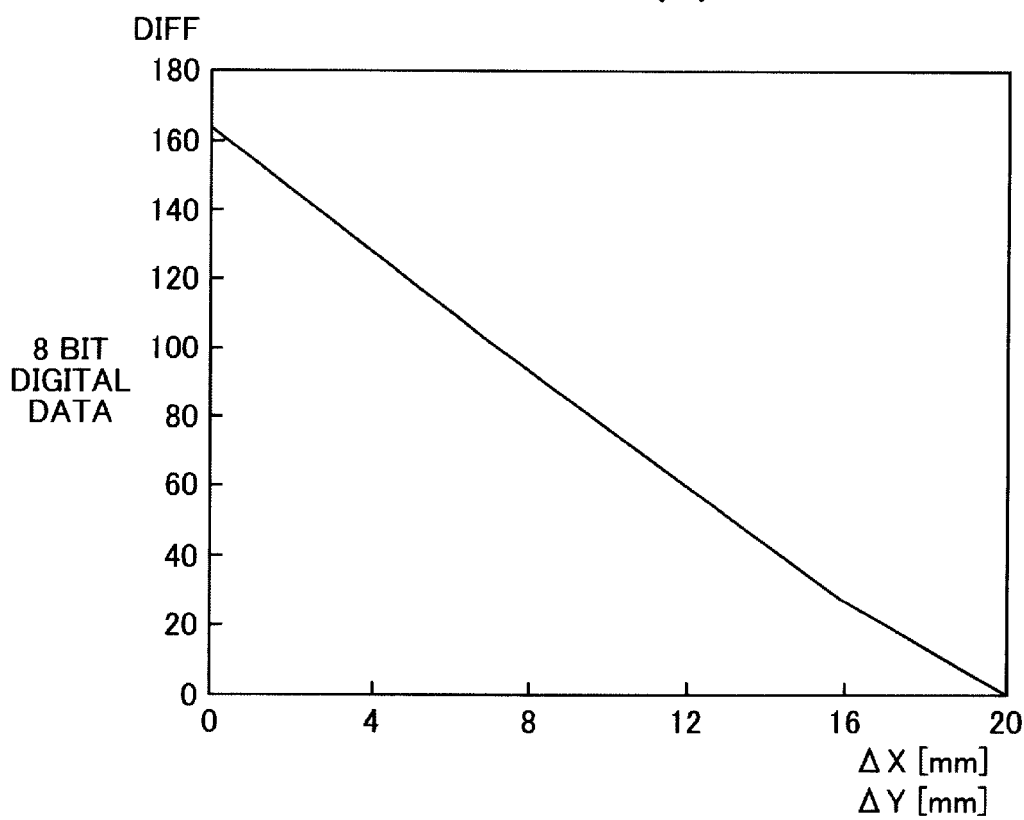

TEMPORARY STORAGE AREA 59a

| COIL NUMBER | DETECTED VALUES |
|---|---|
| X1 | 102 |
| X2 | 128 |
| X3 | 26 |
| X4 | 0 |
| X5 | 0 |
| X6 | 0 |
| X7 | 0 |
| X8 | 0 |
| X9 | 0 |
| ⋮ | ⋮ |
| Xm | 0 |

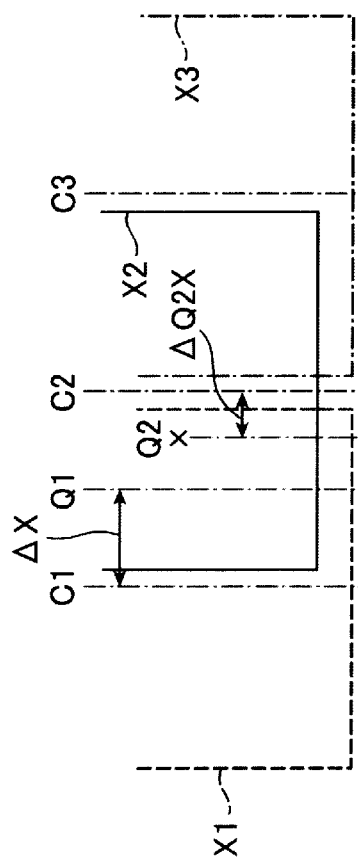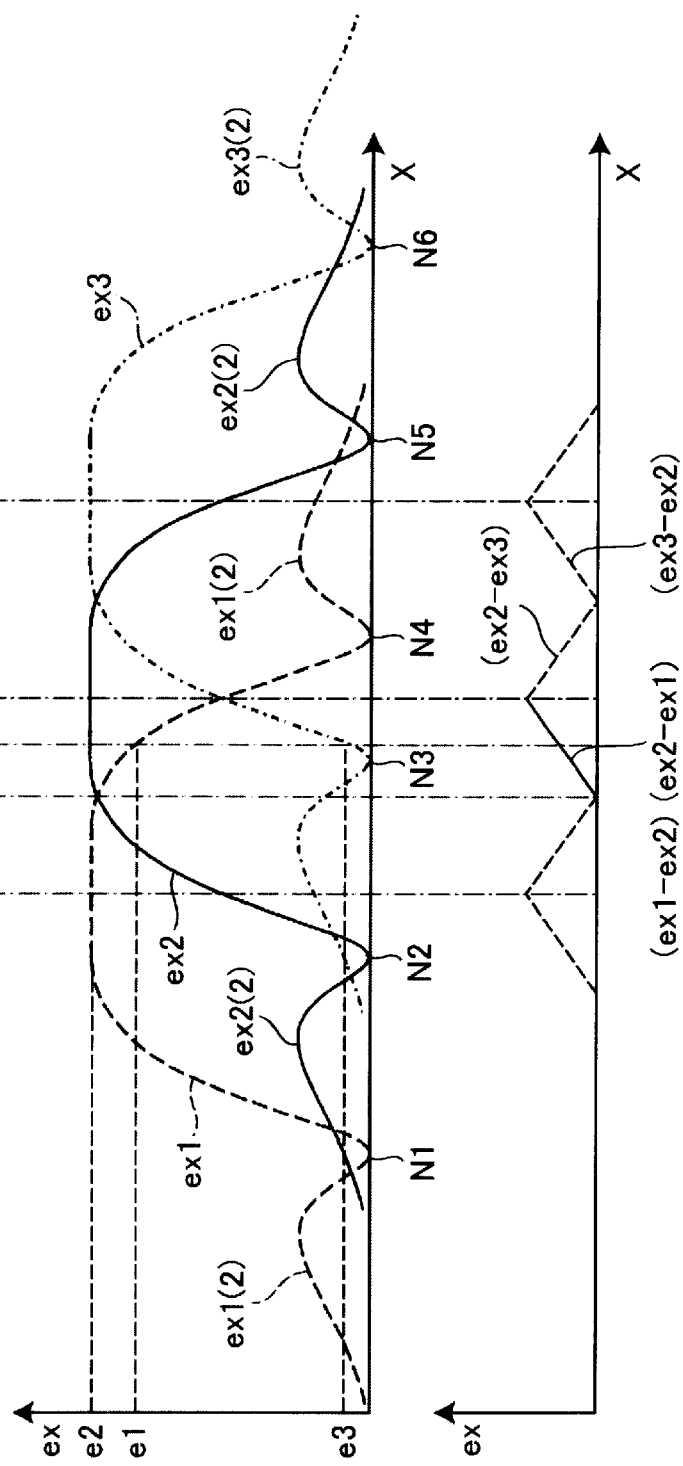
FIG.23(a) FIG.23(b) FIG.23(c)

FIG.30(a)

RAM 59

| WORK AREA 59c |
| TEMPORARY STORAGE AREA 59a |
| FINALIZED AREA 59b |
| POSITION COORDINATE TABLE AREA 59d |
| 1 | 2 | 3 | 4 |
| ⋮ |

FIG.30(b)

TEMPORARY STORAGE AREA 59a

| COIL NUMBER | DETECTED VALUES |
|---|---|
| X1 | 102 |
| X2 | 128 |
| X3 | 26 |
| ⋮ | ⋮ |
| X8 | 0 |
| X9 | 0 |
| ⋮ | ⋮ |
| Xm | 0 |

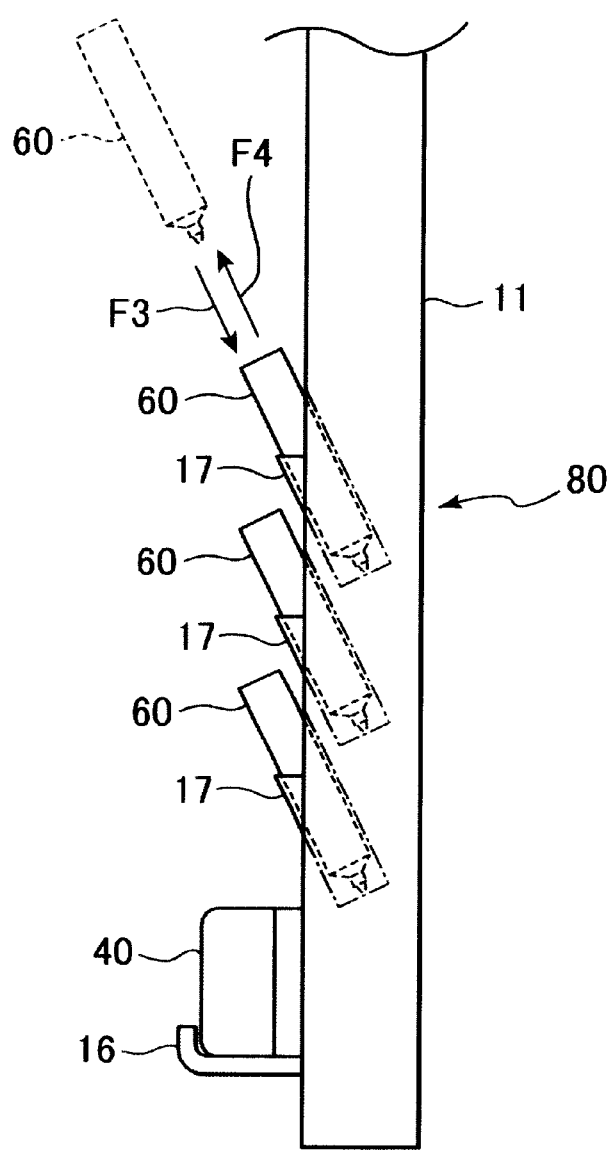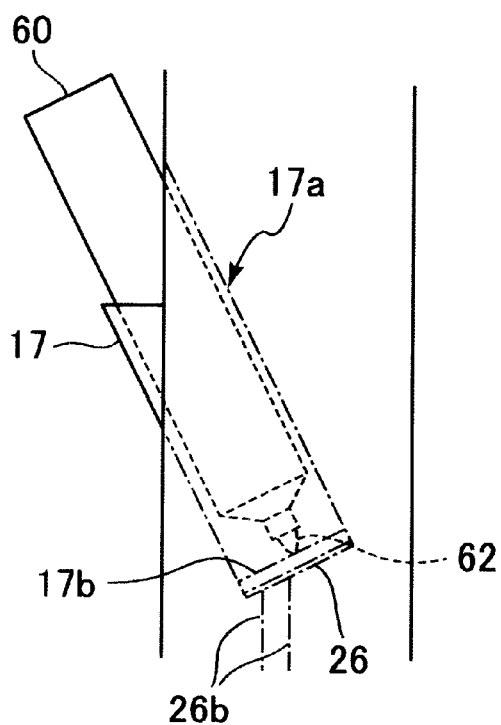

FIG.41(b) POSITION COORDINATE TABLE 58a

| ΔX [mm] ΔY | DIFF |
|---|---|
| 0 | 163 |
| ⋮ | ⋮ |
| 2.5 | 127 |
| ⋮ | ⋮ |
| 5.0 | 91 |
| ⋮ | ⋮ |
| 7.5 | 58 |
| ⋮ | ⋮ |
| 10.0 | 26 |
| ⋮ | ⋮ |
| 12.5 | 0 |

FIG.41(c) TEMPORARY STORAGE AREA 59a

| COIL NUMBER | VOLTAGE VALUES |
|---|---|
| X1 | e1 |
| X2 | e2 |
| X3 | e3 |
| X4 | e4 |
| X5 | e5 |
| X6 | e6 |
| X7 | e7 |
| X8 | e8 |
| X9 | e9 |
| ⋮ | ⋮ |
| Xm | em |

FIG.42(a)

RELATIONSHIP BETWEEN PEN ATTRIBUTES AND MODULATION FREQUENCIES fm

| fm (KHz) | 10 | 8.7 | 7.7 | 6.9 | 6.3 | 5.6 | 5.0 | 4.5 | 4.1 |
|---|---|---|---|---|---|---|---|---|---|
| PEN ATTRIBUTE | ERASER | RED FINE | RED THICK | GREEN FINE | GREEN THICK | BLUE FINE | BLUE THICK | BLACK FINE | BLACK THICK |
| DEMODULATION COUNT NUMBER | 100 | 115 | 130 | 145 | 160 | 180 | 200 | 220 | 245 |

FIG.45
LIMITER OUTPUT SIGNAL 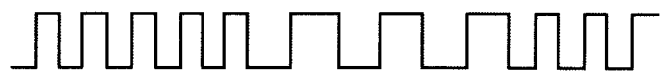
RISING EDGE OF THE
LIMITER OUTPUT SIGNAL 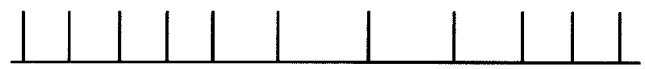
COUNTER VALUE BY THE
COUNTER CIRCUIT 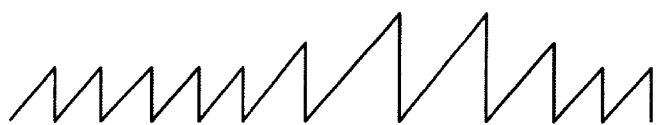
THRESHOLD VALUE
JUDGEMENT OUTPUT
THRESHOLD VALUE
JUDGEMENT OUTPUT 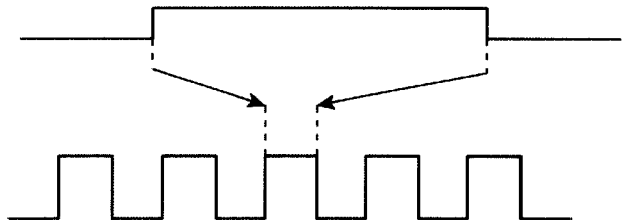
COUNTER VALUE OF THE
COUNTER CIRCUIT
(HIGH FREQUENCY fm) 
THRESHOLD VALUE
JUDGEMENT OUTPUT 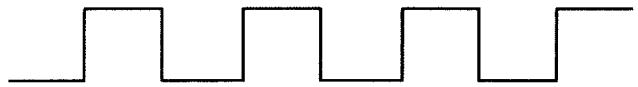
COUNTER VALUE OF THE
COUNTER CIRCUIT
(LOW FREQUENCY fm) 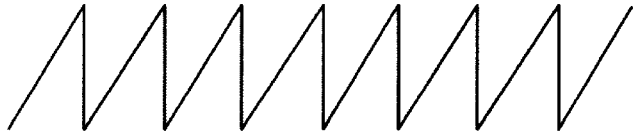

PEN ATTRIBUTE DETECTION ROUTINE 2

COORDINATE READING DEVICE

CROSS-REFERENCE TO RELATED APPLICATION

This application is a continuation-in-part application of U.S. patent application Ser. No. 09/628,724 entitled "Coordinate Reading Devices" and filed on Jul. 28, 2000.

BACKGROUND OF THE INVENTION

1. Field of the Invention

The present invention relates to a coordinate reading device.

2. Description of Related Art

Various types of coordinate reading device have been proposed. A representative example of the conventional coordinate reading device is disclosed in Japanese Patent Application Publication (Kokai) No. HEI-5-165560.

SUMMARY OF THE INVENTION

FIG. 1(a) is a configuration of a conceivable coordinate reading device. The conceivable coordinate reading device includes: a tablet 91, a scanning circuit 92, and a detection circuit 90. The tablet 91 is provided with a plurality of X sense coils (conductive loop wires) X1 to Xm and Y sense coils (conductive loop wires) Y1 to Yn. The X sense coils X1 to Xm are for detecting X coordinates of a pen (target member) 400, the Y sense coils Y1 to Yn are for detecting Y coordinates of the pen 400. The scan circuit 90 is for serially scanning the sense coils X1–Xm and Y1–Yn on the tablet 91. The detection circuit 90 is for calculating the x and y coordinates of the pen by detecting induction signals generated at the sense coils X1–Xm and Y1–Yn.

The pen 400 includes a coil 401 that generates an alternating magnetic field. When the pen 400 contacts the tablet 91, some sense coils that are located near to the pen 400 generate induction signals 97 due to magnetic coupling with the alternating magnetic field from the coil 401. The induction signals 97 are inputted into the detection circuit 90. The induction signals 97 are amplified at an amplifier 93 and then its amplitude is detected at an amplitude detection circuit 94. Next, an A/D conversion circuit 95 converts the measured amplitude into digital values, and outputs the digital values to a CPU 96. The CPU 96 calculates the positional coordinate of the pen 400 based on the inputted digital values from the A/D conversion circuit 95. For example, the CPU 96 may refer to a coordinate table that stores data indicative of a relationship between a plurality of digital values and coordinate positions. The CPU 96 selects a positional coordinate that corresponds to the digital values presently inputted from the A/D conversion circuit 95.

According to the above-described conceivable coordinate reading device, the coordinate table stores fixed digital values in correspondence with the coordinate positions. It is noted, however, that when the batteries inside the pen 400 are get used up, the output level of the alternating magnetic field drops. In this case, the sense coils will generate induction signals whose levels correspond to the thus decreased output level of the alternating magnetic field. If the CPU 96 detects such an induction signal, and selects the position coordinate in correspondence with the amplitude of the induction signal, accuracy in the coordinate reading is reduced.

FIG. 1(b) illustrates how the precision of coordinate reading drops. As shown in FIG. 1(b), when the battery is fresh, an output voltage V1 will be detected when the pen is at coordinate P1. However, once the battery is get used up, even when the pen is located at the same place P1, the voltage V2, that is lower than the original voltage V1, will be detected, and therefore the pen coordinate will be detected as coordinate P2. This results in a reading error of ΔP(=P2−P1).

Japanese Patent-Application Publication (Kokai) No. HEI-7-56677 discloses a method for correcting coordinate tables depending on such drops in voltage. FIG. 1(c) is a graph representing the relationship between a position of the pen and a voltage generated at one sense coil. In the method disclosed by the publication, a maximum voltage value Va, generated by one sense coil, is detected, and is compared with a prestored reference value. The coordinate table is then corrected based on the results of this comparison.

However, as apparent from the graph of FIG. 1(c), the plot of voltage change is almost flat in the vicinity of the maximum value Va. Therefore, it is difficult to detect the true maximum value Va accurately. For this reason, it is difficult to correct the coordinate table with a great deal of precision.

It is therefore an objective of the present invention to provide an improved coordinate reading device that is capable of reading correct coordinates of the target member with high precision.

In order to attain the above and other objects, the present invention provides a coordinate reading device for reading a coordinate of a position of a target member, which generates an alternating magnetic field, the coordinate reading device comprising: a coordinate input sheet that has a coordinate input surface defining a coordinate of a target member that generates an alternating magnetic field; a loop-wire attaching member that is provided below the coordinate input sheet and that has a plurality of loop wires, each loop wire being capable of producing a signal in response to the alternating magnetic field; a detection unit that detects the signals from the plurality of loop wires; a coordinate determination unit that determines a coordinate of the position of the target member based on the signal from at least one of the loop wires that is selected for coordinate determination; and a correction unit that controls the coordinate determination unit to determine a corrected coordinate of the position of the target member based on a relationship between a predetermined reference value and the value of the signal from at least one of the plurality of loop wires that is selected for coordinate correction.

The plurality of loop wires may include one correction loop wire that is located on a predetermined position on the loop-wire attaching member and that is used exclusively for the correction operation, wherein the correction unit compares the value of the signal from the correction loop wire with the predetermined reference value, and controls the coordinate determination unit to determine the corrected coordinate of the position of the target member based on the compared result.

The correction unit may include: a selection unit that selects, for coordinate correction, at least two loop wires among the plurality of loop wires, based on the relationship between the values of the signals from the at least two loop wires; a ratio calculation unit that calculates a ratio between the value of the signal from at least one loop wire in the at least two loop wires selected for coordinate correction and the predetermined reference value; and a control unit that controls the coordinate determination unit to determine the corrected coordinate of the position of the target member based on the calculated ratio.

The selection unit may select two loop wires that are adjacent to each other and that produce the signals of the same values with each other, and wherein the ratio calculation unit calculates a ratio between the value of the signal from one loop wire in the selected two loop wires and the predetermined reference value.

The selection unit may select one maximum loop wire that produces the signal of the maximum values among all the loop wires and two adjacent loop wires that are adjacent to the one loop wire. In this case, the selection unit may include a judging unit that judges whether the selected two adjacent loop wires produce the signals of the same values, the ratio calculation unit calculating a ratio between the value of the maximum loop wire and the predetermined reference value when the two adjacent loop wires produce the signals of the same values. Or, the selection unit may include a judging unit that judges whether one of the selected two adjacent loop wires produces the signal of the value that is lower than a predetermined threshold value, the ratio calculation unit calculating a ratio between the value of either one of the maximum loop wire and the other one of the adjacent loop wire and the predetermined reference value when the one of the two adjacent loop wires produces the signal of the value that is lower than the predetermined threshold value.

The selection unit may select one loop wire and two adjacent loop wires that are adjacent to the one loop wire and that produce the signals of the same values, the ratio calculation unit calculating a ratio between the value of the one loop wire that is sandwiched between the two adjacent loop wires and the predetermined reference value when the two adjacent loop wires produce the signals of the same values.

According to another aspect, the present invention provides a coordinate reading device for reading a coordinate of a position of a target member, which generates an alternating magnetic field, the coordinate reading device comprising: a coordinate input sheet that has a coordinate input surface defining a coordinate of a target member, which employs a battery and which generates an alternating magnetic field whose strength corresponds to a condition of the battery; a loop-wire attaching member that is provided below the coordinate input sheet and that has a plurality of loop wires, each loop wire being capable of producing a signal in response to the alternating magnetic field, the signal having a value that corresponds to the location of the target member and to the condition of the battery in the target member; a detection unit that detects the signals from the plurality of loop wires; a coordinate determination unit that determines a coordinate of the position of the target member based on the signal from at least one of the loop wires that is selected for coordinate determination; and a correction unit that controls the coordinate determination unit to determine a corrected coordinate of the position of the target member dependently on the condition of the battery in the target member.

BRIEF DESCRIPTION OF THE DRAWINGS

The above and other objects, features and advantages of the invention will become more apparent from reading the following description of the preferred embodiments taken in connection with the accompanying drawings in which:

FIG. 1(*b*) is a graph illustrating how the precision of coordinate reading drops;

FIG. 1(*c*) is a graph representing the relationship between a position of the pen and a voltage generated at one sense coil;

FIG. 6(*b*) is a circuit diagram showing electric configuration of the pen 60;

FIG. 7(*b*) illustrates a width of the sense coils 23 and a pitch, by which the sense coils 23 are arranged while being partly overlapped with one another;

FIG. 9 illustrates signals A, B, and C in the block diagram of FIG. 8;

FIG. 10(*b*) illustrates a structure of the position coordinate table 58*a*;

FIG. 10(*c*) illustrates a structure of the position coordinate table 58*a* after it is corrected;

FIG. 11(*b*) shows how the voltages induced at the X coils X1–X3 change when the position of the pen 60 moves along the X direction;

FIG. 11(*c*) shows how the voltage difference between two adjacent loop coils among the X loop coils X1 to X3 changes when the position of the pen 60 moves along the X axis;

FIG. 12(*a*) illustrates a part of a storage area in the RAM 59;

FIG. 12(*b*) illustrates how the detected voltage values from the coils are stored in a temporary storage area 59*a* in FIG. 12(*a*);

FIG. 20(*a*) is a graph representing a position coordinate table 58*a* according to the second embodiment;

FIG. 20(b) illustrates a structure of the position coordinate table 58a;

FIG. 20(c) illustrates a structure of the position coordinate table 58a after it is corrected;

FIG. 21(a) illustrates the detected values at the correction timing of the position coordinate table and shows how the detected value drops from the reference value;

FIG. 21(b) illustrates how the detected voltage values from the coils are stored in the temporary storage area 59a;

FIG. 23(a) illustrates a part of X coils X1–X3;

FIG. 23(b) shows how the voltages induced at the X coils X1–X3 change when the position of the pen 60 moves along the X direction;

FIG. 23(c) shows how the voltage difference between two adjacent loop coils among the X loop coils X1 to X3 changes when the position of the pen 60 moves along the X axis;

FIG. 30(a) illustrates a part of a storage area in the RAM 59;

FIG. 30(b) illustrates how the detected voltage values from the coils are stored in the temporary storage area 59a in FIG. 30(a);

FIG. 35(a) is a side view showing the inside of a right portion of the electronic white board 80 of FIG. 34, while omitting a part;

FIG. 35(b) is a magnified view at a portion of the view of FIG. 35(a);

FIG. 41(b) illustrates a structure of the position coordinate table 58a;

FIG. 41(c) illustrates how the detected voltage values from the coils are stored in a temporary storage area 59a in the RAM 59;

FIG. 42(a) shows the relationship between the pen attributes and modulation frequencies fm;

FIG. 44(a) illustrates the relationship between the output signal from the CR oscillation circuit 69e, the carrier signal outputted from the LC oscillation circuit 69c and FSK modulated by the FSK circuit 69d, the output signal from the limitter circuit 54, and the counter value K by the counter circuit 55a;

FIG. 45 illustrates several signals that appear in the respective portions in the FSK demodulation circuit 55;

DETAILED DESCRIPTION OF THE PREFERRED EMBODIMENTS

Figure 1A:
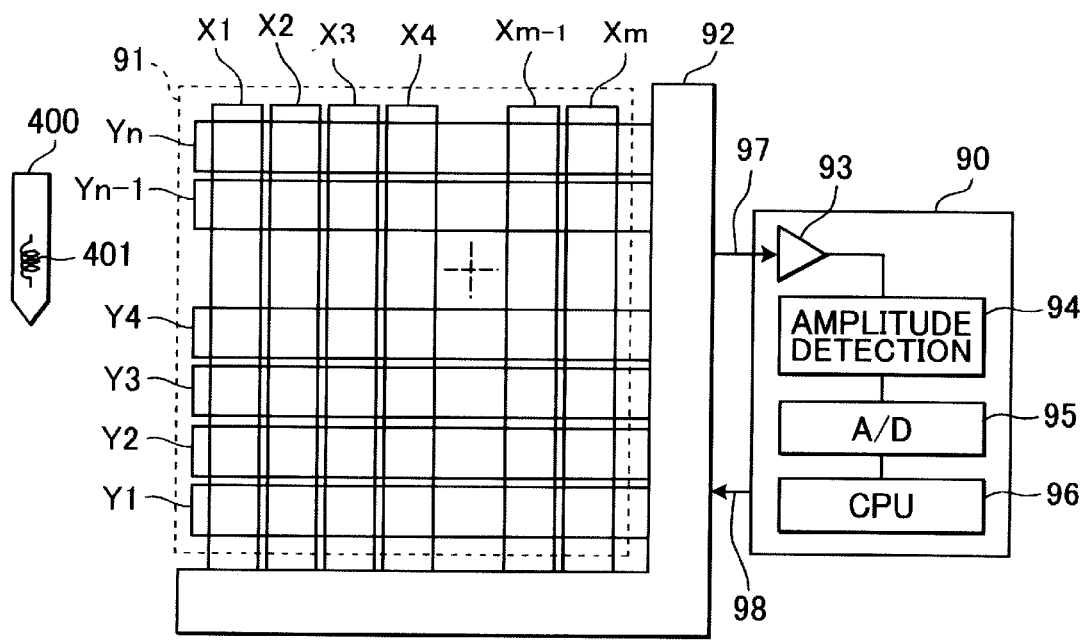
FIG. 1(*a*) is a configuration of a conceivable coordinate reading device.
Figure 1B:
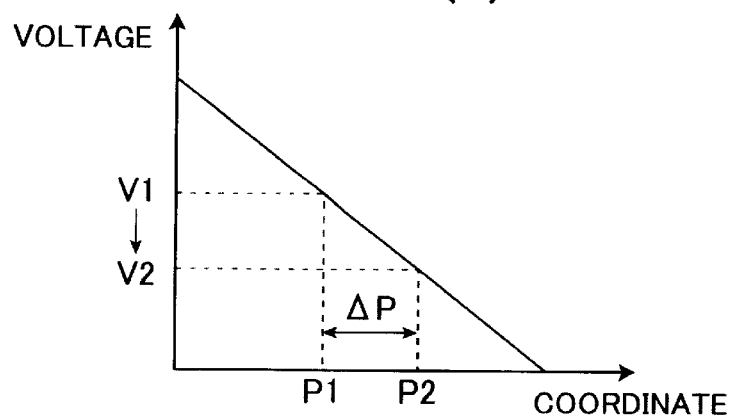
Figure 1C:
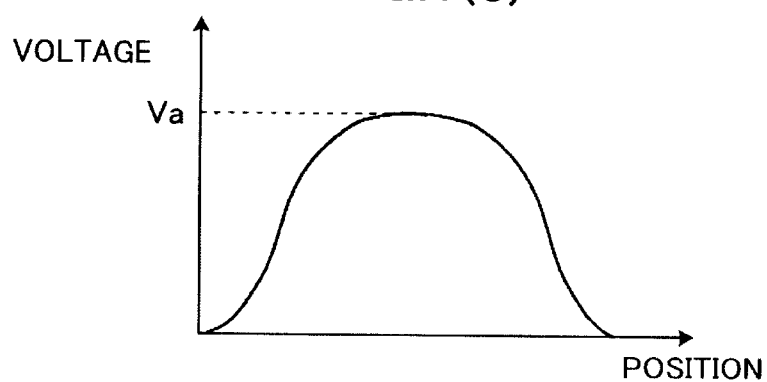

A coordinate reading device according to preferred embodiments of the present invention will be described while referring to the accompanying drawings wherein like parts and components are designated by the same reference numerals to avoid duplicating description.

First Embodiment

A coordinate reading device according to a first embodiment will be described below with reference to FIGS. 2 to 18.

The coordinate reading device of the present embodiment is an electronic white board. A pen is used to draw images such as characters and/or figures on the electronic white board, whereupon the electronic white board electrically reads the drawn images and stores data of the read images therein.

Next, the configuration of the electronic white board 1 will be described while referring to FIGS. 2 and 3.

Figure 2:
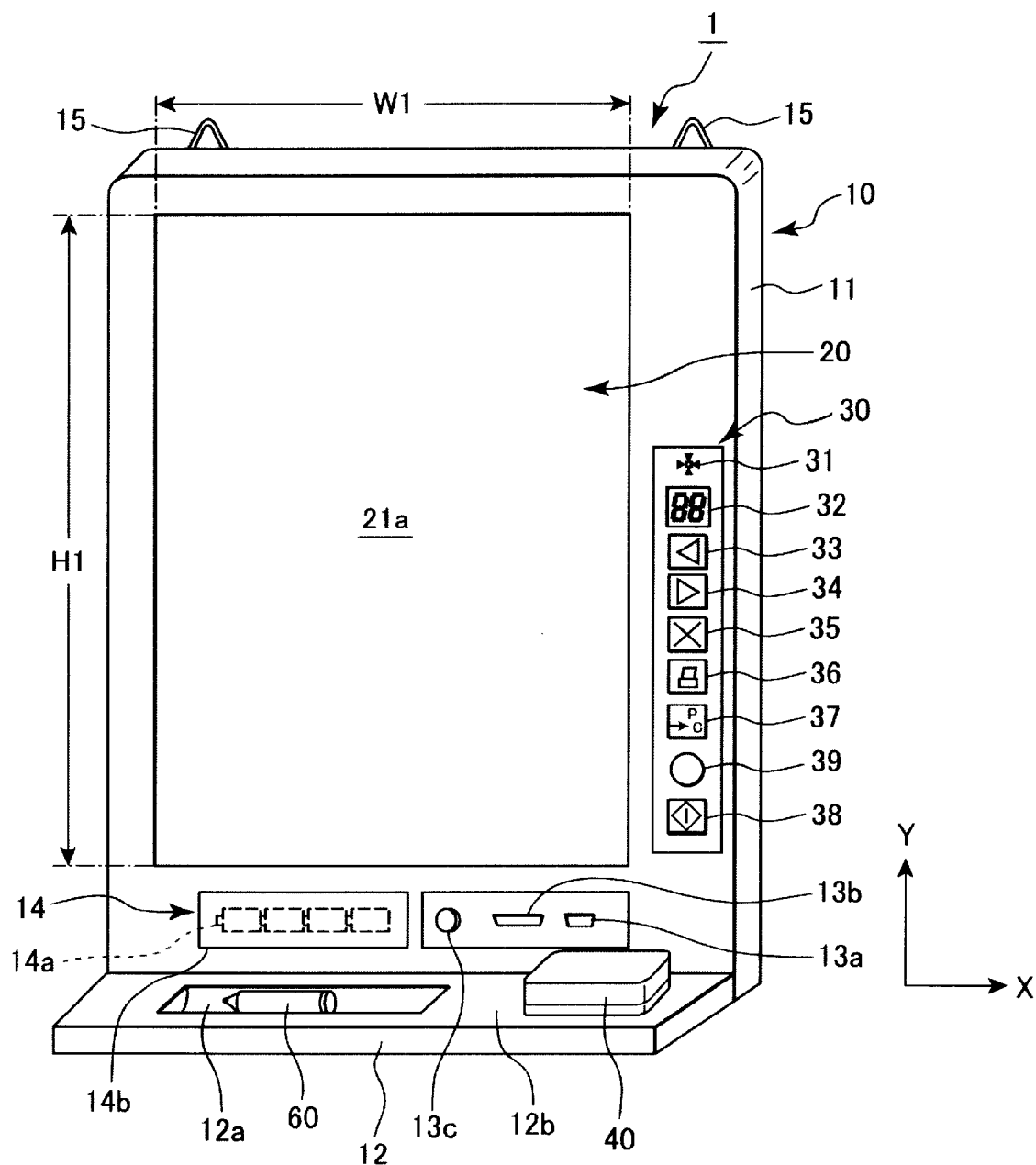
FIG. 2 is an external perspective view illustrating an essential configuration of an electronic white board according to a first embodiment of the present invention.
Figure 3:
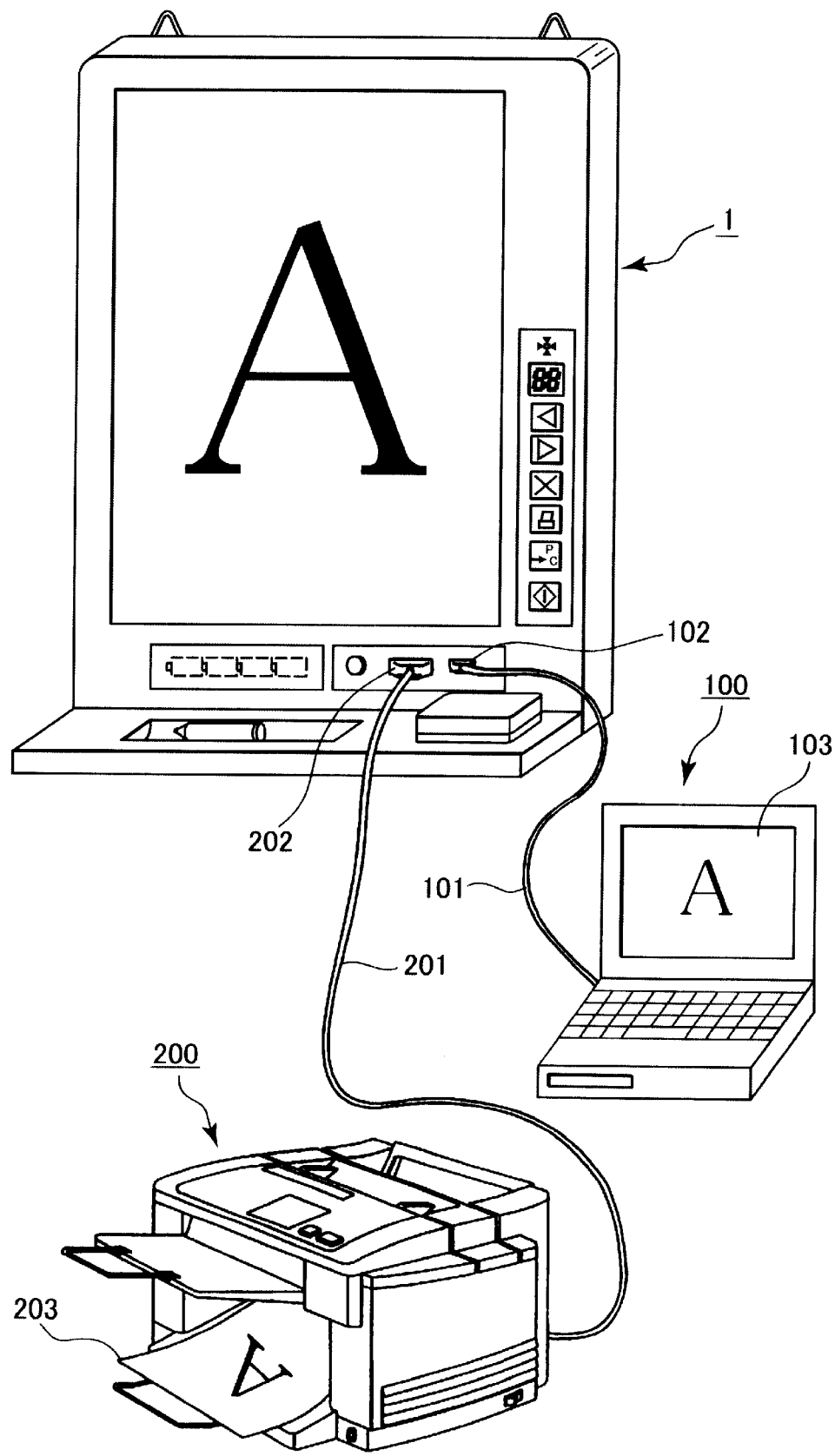
FIG. 3 is an illustration showing the electronic white board of FIG. 2 being electrically connected to a personal computer (PC) and a printer.

As shown in FIG. 2, the electronic white board 1 has a writing panel 10. A pen 60 and an eraser 40 are provided to the electronic white board 1. The pen 60 is for writing images, such as characters and/or figures, on the writing panel 10 and for allowing the electronic white board 1 to store data indicative of the written images. The eraser 40 is for erasing the written images from the writing panel 10 and also for erasing the data indicative of the written images. The electronic white board 1 can be electrically connected to a personal computer (PC) 100 and a printer 200 as shown in FIG. 3.

Next, the configuration of the writing panel 10 will be described in greater detail below.

As shown in FIG. 2, the writing panel 10 includes a frame 11. A panel main body 20 is assembled within the frame 11. The panel main body 20 has a writing surface 21$a$, on which images, such as characters and/or figures, can be written by the pen 60. A plate-shaped stand 12 is attached to a lower end surface of the frame 11 and extends frontwardly from the frame 11. A concave 12$a$ having a semicircular cross-section is formed in the upper surface of the stand 12 for supporting the pen 60. A flat portion 12$b$ is formed to the right of the concave 12$a$. The eraser 40 is placed on the flat portion 12$b$.

An operation portion 30 is provided at the right side of the front surface of the frame 11. The operation portion 30 includes: a speaker 31, a page number display LED 32, a page reverse button 33, a page forward button 34, an erase button 35, a print output button 36, a PC output button 37, a power button 38, and a battery warning LED 39. The speaker 31 is for reproducing sounds such as operation sounds and warning sounds. The page number display LED 32 is constructed from a seven-segmented LED to display the number of pages of images, which are written on the writing surface 21$a$ and whose data (which will be referred to as "written data" hereinafter) is stored in the electronic white board 1. The page reverse button 33 is used by a user to return one page at a time each time it is pressed. The page forward button 34 is used also by the user to feed one page at a time each time it is pressed. The erase button 35 is used to erase one page's worth of written data at a time each time it is pressed. The printer output button 36 is pressed to output the written data to the printer 200. The PC output button 37 is pressed to output the written data to the PC 100. The power button 38 is pressed by the user to start and stop operation of the electronic white board 1. The battery warning LED 39$b$ is for warning when a buttery 70 in the pen 60 (to be described later) runs out.

A battery case 14 is provided at the lower portion on the front surface of the frame 11. The battery case 14 is for storing four C batteries 14$a$, for example, which serve as a power source of the electronic white board 1. A lid 14$b$ is openably and closably attached to the front surface of the battery case 14. A volume adjustment knob 13$c$ is provided to the right of the battery case 14. The volume adjustment knob 13$c$ is for adjusting volume of the sounds outputted from the speaker 31. A pair of connectors 13$a$ and 13$b$ are provided to the right of the volume adjustment knob 13$c$. As shown in FIG. 3, a plug 202 of a connection cable 20$a$ from the printer 200 is connected to the connector 13$b$. A plug 102 of another connection cable 101 from the PC 100 is connected to the connector 13$a$. Thus, the written data indicative of the content written on the writing surface 21$a$ can be outputted to the PC 100. Accordingly, the user can view the content written on the electronic white board 1 using a monitor 103 provided on the PC 100. The written data can also be outputted to the printer 200 so that the content written on the electronic white board 1 can be printed on a print sheet 203.

Next, the configuration of the panel main body 20, which is housed within the frame 11, will be described in greater detail. The panel main body 20 is housed within the frame 11. The panel main body 20 may be produced into any flexible or non-flexible sheet or plate shape.

Figure 4:
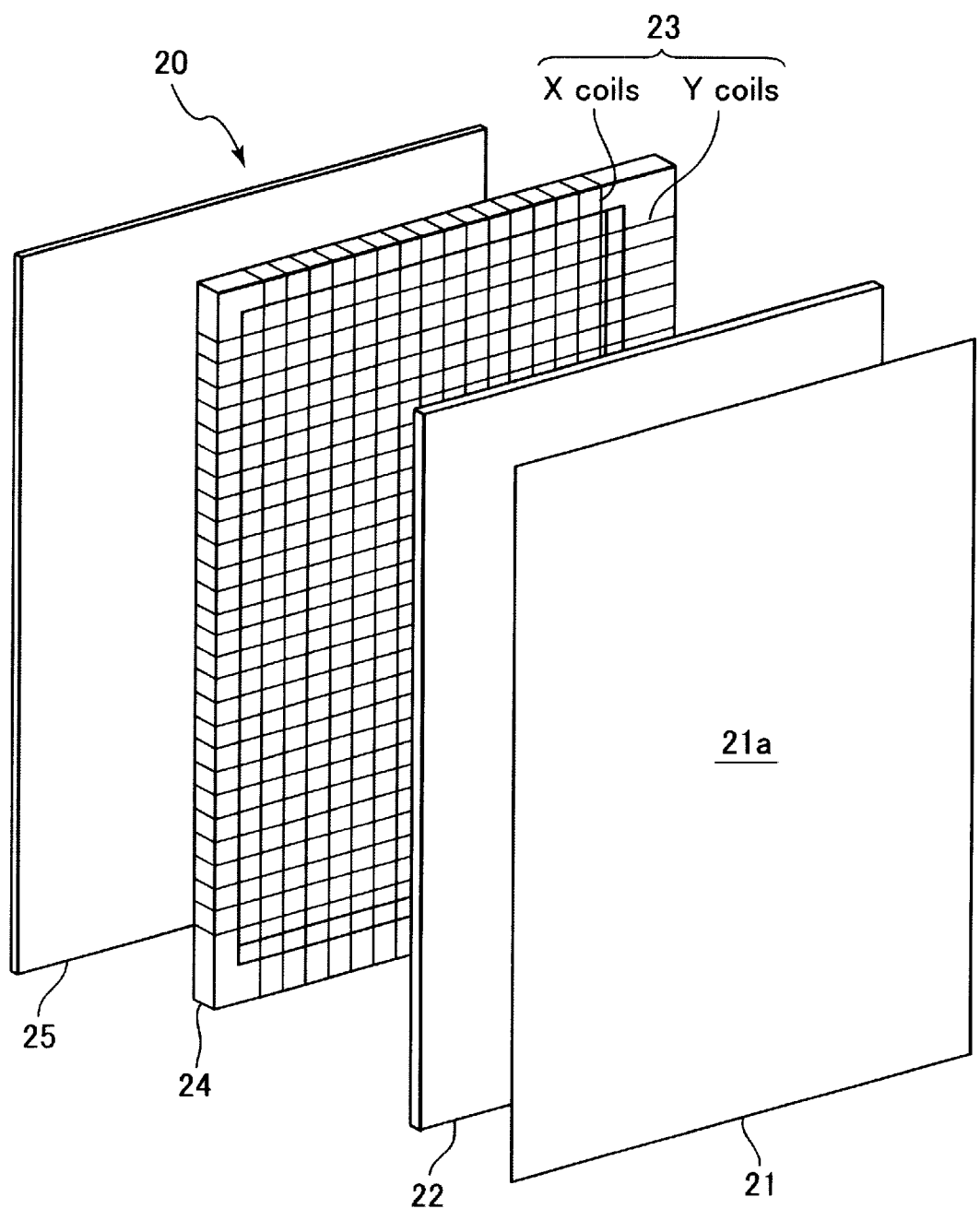
FIG. 4 is an exploded perspective view showing the components of a panel main body provided within the electronic white board.

FIG. 4 is an exploded perspective view showing the components of the panel main body 20. The panel main body 20 includes: a writing sheet 21, a plate-shaped panel 22, a frame-shaped attachment panel 24, and a plate-shaped back panel 25, all of which are mounted one on another in this order. The writing sheet 21 has the writing surface 21$a$ on its one surface. The frame-shaped attachment panel 22 is provided with a plurality of sense coils (loop wires or loop coils) 23 as will be described later. The plate-shaped back panel 25 is for blocking noises.

According to the present embodiment, the writing sheet 21 is made from several sheets of polyethylene terephthalate (PET) film which are attached together into a thickness of 0.1 mm. The panel 22 is formed to a thickness of 3.0 mm from acryl resin, acrylonitrile-butadiene-styrene copolymer (ABS), or polycarbonate (PC). The attachment panel 24 is formed to a thickness of 40 mm, for example, from a foam resin material such as cellular styrene. The back panel 25 is formed to a thickness of about 1 mm from electrically-conductive material such as aluminum. The overall thickness of the frame 11 that sandwiches all the components of the panel main body 20 is formed to a thickness of 50 mm.

As shown in FIG. 2, hooks 15, 15 are attached, at both sides, to the upper end of the back surface of the frame 11. Those hooks 15, 15 are used to hang the electronic white board 1 on the wall. According to the present embodiment, the writing surface 21$a$ has a height H1 of 900 mm and a width W1 of 600 mm, for example. The frame 11 and the stand 12 are formed to light weight by synthetic resin such as polypropylene (PP). The total weight of the electronic white board 1 is less than 10 kg.

The electronic white board 1 can transmit the written data, indicative of the images written on the writing surface 21$a$, to other electronic white boards 1 and other personal computers.

Figure 5:
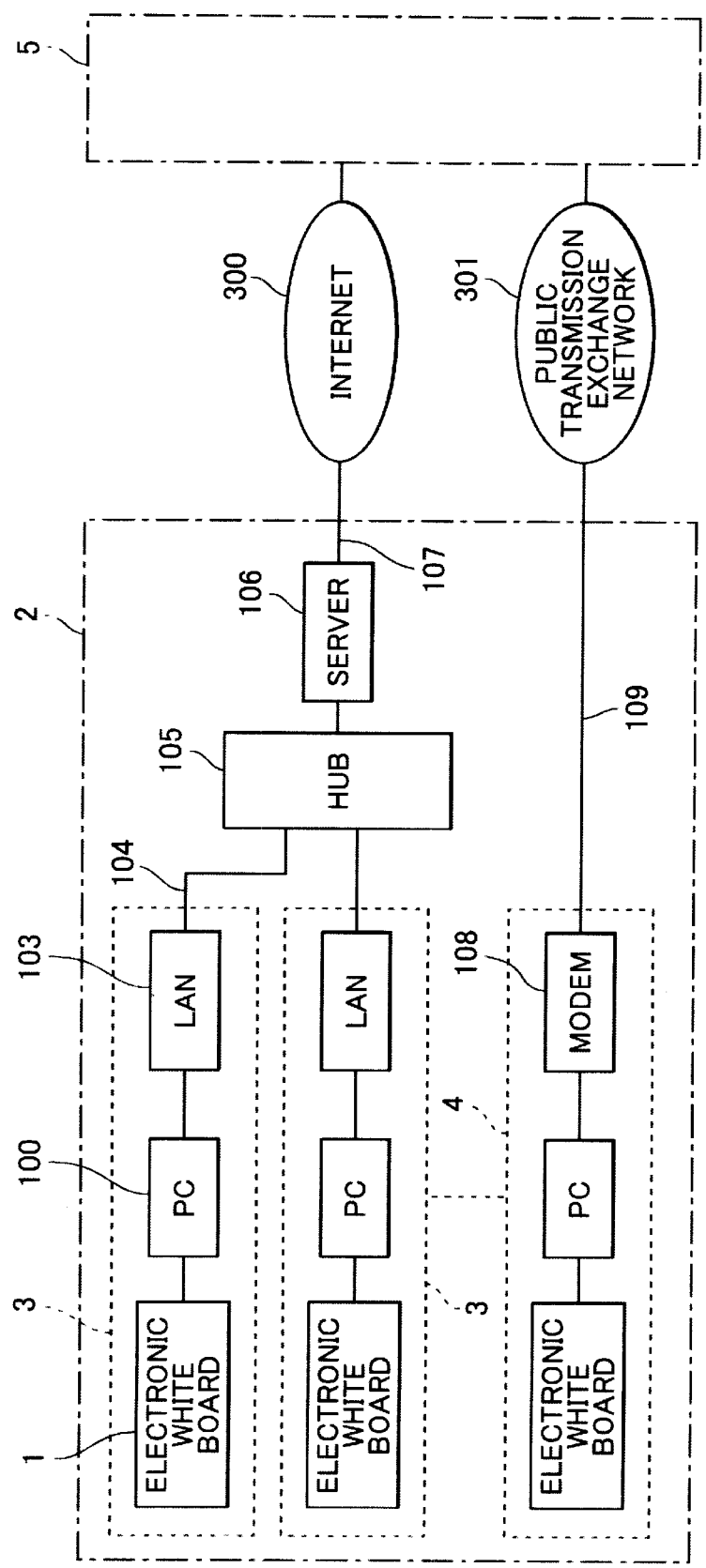
FIG. 5 is a block diagram showing configuration of a network for communicating written data between the electronic white board and other electronic white boards.

FIG. 5 is a black diagram showing configuration of a network for communicating written data between one electronic white board 1 and other electronic white boards and/or personal computers. In this example, it is assumed that a plurality of electronic white boards 1 are provided in a plurality of different rooms within the same company 2 and are provided also in other companies 5 and that written data is communicated between the plurality of rooms and also between different companies.

The company 2 includes several rooms 3 and one room 4. Each of the rooms 3, 4 includes the electronic white board 1 and the personal computer 100 in electrical connection with each other as shown in FIG. 3. In each room 3, the personal computer 100 is connected to a corresponding LAN board 103. The personal computer 100 in the room 4 is connected to a modem 108. The LAN board 103 provided to each room 3 is connected to a hub 105 by a corresponding LAN cable 104. The hub 105 is connected to a server 106. The server 106 can be connected to other companies 5 through the Internet 300. The modem 108 in the room 4 can be connected to other companies 5 through a telephone line 109 and a public communication exchange network 301. Although not shown in the drawings, the other companies 5 have the electronic white boards 1 that can perform communication with personal computers 100 in the same manner as in the company 2.

In the network having the above-described arrangement, written data stored in the electronic white board 1 in one room 3 is transmitted from the electronic white board 1 to the personal computer 100 via the connection cable 101, and then to the personal computer 100 in another designated room 3 through the LAN board 103 and the hub 105. A user who receives the written data can view the content of the received data by displaying the received data on the monitor 103 of the personal computer 100 or by printing out the received data onto a sheet using the printer 200 that is connected to the personal computer 100.

The written data can be transmitted also to other companies 5 from the server 106 across the Internet 300 as an image file, in Tag Image File Format (TIFF), appended to an e-mail message. In this case, the other companies 5 can view the content of the written data by decoding the image file, appended to the e-mail message, transmitted from the company 2.

Figure 6A:
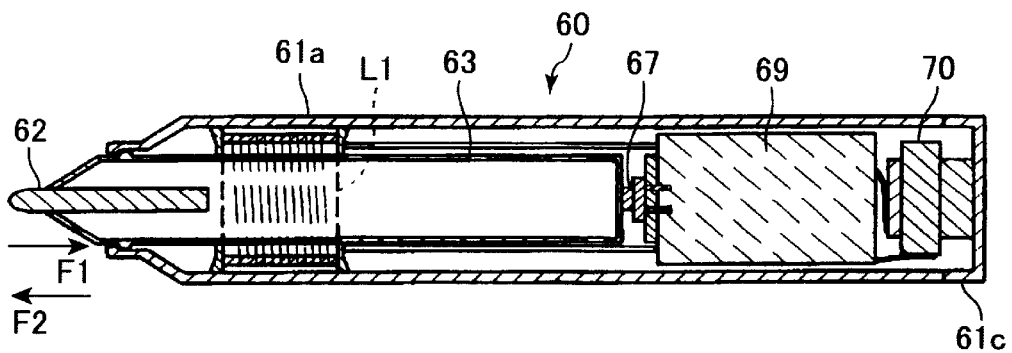
FIG. 6(*a*) is a cross-sectional view showing internal configuration of the pen 60.
Figure 6B:
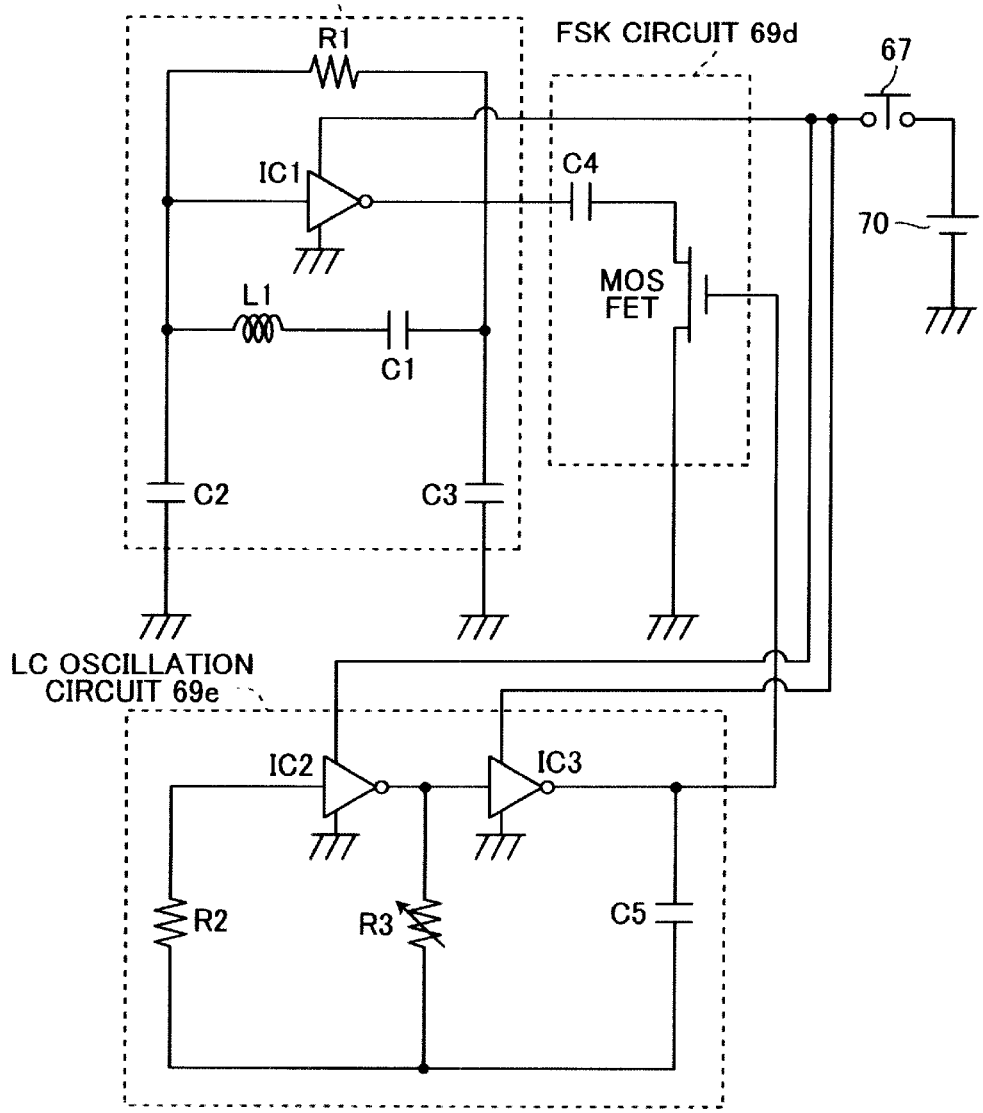

Next, essential configuration of the pen 60 will be explained while referring to FIGS. 6(a) and 6(b). FIG. 6(a) is a cross-sectional view showing internal configuration of the pen 60. FIG. 6(b) is a circuit diagram showing electric configuration of the pen 60.

As shown in FIG. 6(a), the pen 60 includes a cylindrical body 61a and a lid 61c which is detachably attached to one end of the body 61a. The body 61a houses a coil L1, an ink cartridge 63, a pen tip 62, a circuit board 69, and a battery 70. The ink cartridge 63 stores ink and is removable in a direction indicated by an arrow F2. The pen tip 62 is inserted into the ink cartridge 63. The circuit board 69 serves as an oscillation circuit for oscillating the coil L1 to generate an alternating magnetic field. The battery 70 serves as a power source for supplying electric power to the circuit board 69.

The coil L1 has a ring shape and is formed from a plurality of turns of windings. The coil L1 is mounted inside the pen 60 so that the coil L1 will be separated by some distance from the tip of the pen tip 62 when the tip of the pen tip 62 abuts against the writing surface 21a of the writing panel 10.

A push button switch 67 is provided between the ink cartridge 63 and the circuit board 69. The push button switch 67 is for supplying electric power from the battery 70 to the circuit board 69, and also for terminating supply of the electric power to the circuit board 69. When the pen tip 62 is pressed against the writing surface 21a, the ink cartridge 63 moves in a direction indicated by an arrow F1, as a result of which the push button switch 67 turns ON. When the pen tip 62 is separated away from the writing surface 21a, the ink cartridge 63 moves in the direction indicated by the arrow F2 by a spring (not shown) provided within the push button switch 67. As a result, the push button switch 67 turns OFF. Thus, an alternating magnetic field is generated from the coil L1 only when the pen 60 is pressed against the writing surface 21a to draw images such as characters and/or figures on the writing surface 21a.

As shown in FIG. 6(b), the circuit board 69 in the pen 60 includes: an LC oscillation circuit 69c, a CR oscillation circuit 69e, and a frequency shift keying (FSK) circuit 69d. The LC oscillation circuit 69c is for oscillating a carrier wave, whose oscillation frequency is determined by capacitances of the condensers C1, C2, C3, the resistance of the resistor R1, and inductance of the coil L1. In this example, the carrier wave has a frequency of 410 kHz.

The CR oscillation circuit 69e is for oscillating a signal whose frequency is set with one of a plurality of modulation frequencies fm that corresponds to attributes of the subject pen 60. It is noted that the modulation frequency fm is determined by resistance of a variable resistor R3, resistance of a resistor R2, and capacitance of a capacitor C5 in the CR oscillation circuit 69e. For example, the frequency of the CR oscillation circuit 69e is set with a modulation frequency fm of 4.1 kHz for black pen, that is, when ink stored in the ink cartridge 63 is black.

The carrier wave oscillated by the LC oscillation circuit 69c carries the signal thus oscillated by the CR oscillation circuit 69e. The FSK oscillation circuit 69d is for modulating the oscillation frequency of the LC oscillation circuit 69c by using the modulation frequency fm of the signal from the CR oscillation circuit 69e. The frequency deviation, by which the oscillation frequency of the carrier wave deviates by the FSK circuit 69d, is determined by capacitance of the condenser C4 in the FSK oscillation circuit 69d.

With the above-described structure, when the push button switch 67 is turned ON, electric power from the battery 70 is supplied to the entire circuitry. Output from the integrated circuit IC3 in the CR oscillation circuit 69e switches the MOS FET gate in the FSK oscillation circuit 69d. The carrier wave generated at the LC oscillation circuit 69c is frequency-modulated by the signal generated from the CR oscillation circuit 69e. Thus, the coil L1 generates an alternating magnetic field (carrier wave) whose frequency is modulated by the FSK oscillation circuit 69d.

The eraser 40 shown in FIG. 2 also houses a coil, an oscillating circuit for oscillating the coil, and a battery that supplies electric power to the oscillating circuit. The coil generates an alternating magnetic field when being oscillated by the oscillating circuit.

Figure 7A:
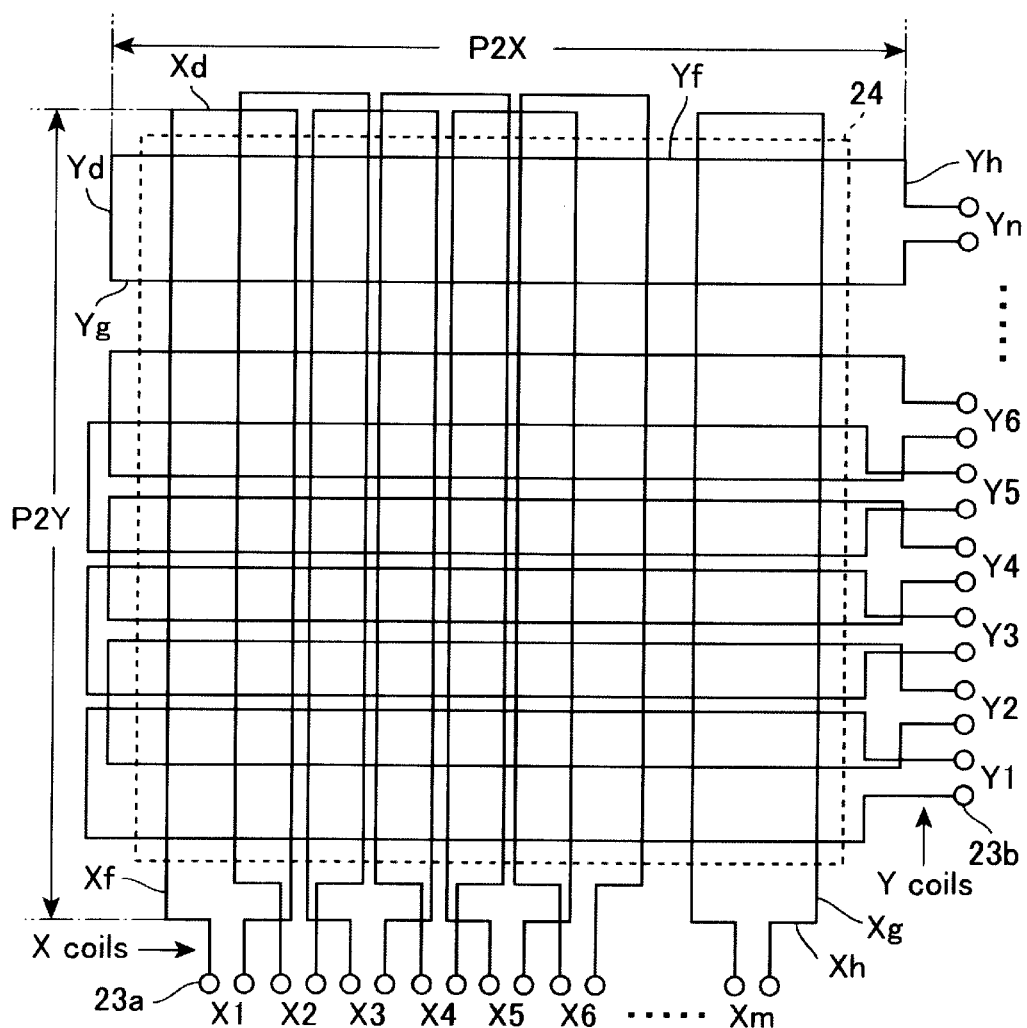
FIG. 7(*a*) illustrates how a plurality of sense coils 23 are arranged on the attachment panel 24, while omitting a part of the sense coils.
Figure 7B:
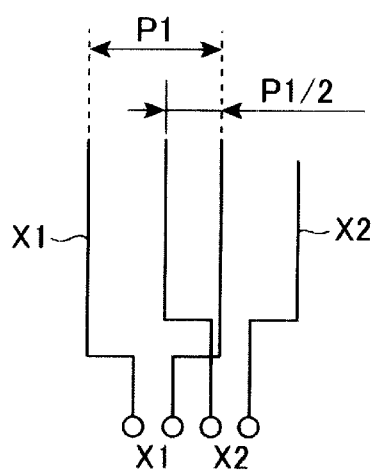

As shown in FIGS. 4 and 7(a) and 7(b), the attachment panel 24 in the writing panel 10 is provided with the plurality of sense coils 23 (loop coils or loop wires) 23. The sense coils 23 are for producing signals by magnetic coupling with the alternating magnetic field generated from the coil L1 in the pen 60 or generated from the coil in the eraser 40. The electronic white board 1 uses the signals thus produced by the sense coils 23 to determine the position of the pen 60 or the eraser 40. Thus, the electronic white board 1 can read the coordinates of successive points of images drawn by the pen 60 and can read the coordinates of points to be erased by the eraser 40. For example, each sense coil 23 is formed from a copper wire that has a diameter of 0.35 mm and that is covered with an insulation film, of enamel layer or nichrome plating layer, for example, on its outer surface.

The sense coils 23 include a plurality of X sense coils 23 and a plurality of Y sense coils 23 which are arranged on the attachment panel 24 as shown in FIG. 7(a). The plurality of X sense coils 23 are arranged in a direction of a predetermined X axis. As shown in FIG. 2, the X axis extends horizontally when the writing panel 10 is being used. In this example, as shown in FIG. 7(a), X coils X1 to Xm are disposed following the direction of the X axis. The total number of the X coils is "m" wherein "m" is an integer greater than one (1). In this example, m=22. The X coils X1 to Xm are for detecting the X coordinate in the coordinates (X, Y) of the pen 60 or the eraser 40 on the writing surface 21a.

The plurality of Y sense coils 23 are arranged in a direction of a predetermined Y axis that is perpendicular to the X axis. As shown in FIG. 2, the Y axis extends vertically when the writing panel 10 is being used. As shown in FIG. 7(a), in this example, Y coils Y1 to Yn are arranged along the Y axis. The total number of the Y coils is "n" where "n" is an integer greater than one (1). In this example, n=33. The Y coils Y1 to Yn are for detecting the Y coordinate in the coordinates (X, Y) of the pen 60 or the eraser 40.

Each of the X and Y coils 23 is formed in a loop-shaped coil (loop wire) with a single turn and has approximately a rectangular shape as shown in FIG. 7(a). Thus, each coil 23 has: a pair of short sides that are located opposite to each other, and a pair of long sides that extend between the pair of short sides. More specifically, each of the X coils X1–Xm has: a pair of short sides Xd and Xh that are located opposite to each other, and a pair of long sides Xf and Xg that extend between the pair of short sides Xd and Xh. Each of the Y coils Y1–Yn has: a pair of short sides Yd and Yh that are located opposite to each other, and a pair of long sides Yf and Yg that extend between the pair of short sides Yd and Yh. The short side Xh of each X coil X1–Xm is connected to a pair of coil terminal 23a, and the short side Yh of each Y coil Y1–Yn is connected to a pair of coil terminal 23b.

Each of the X coils 23 has a length of P2Y in the lengthwise direction of the rectangular shape. In other words, the long sides Xf and Xg of each X coil 23 has the length of P2Y. Each of the Y coils 23 has a length of P2X in the lengthwise direction of the rectangular shape. In other words, the long sides Yf and Yg of each Y coil 23 has the length of P2X.

As shown in FIG. 7(b), each of the X and Y coils 23 has a width of the same amount P1. Thus, each X coil 23 has a length P2Y along its long sides Xf and Xg, and has a width P1 along its short sides Xd and Xh. Each Y coil 23 has a length P2X along its long sides Yf and Yg, and has a width P1 along its short sides Yd and Yh. Adjacent X coils 23 are arranged along the X axis to overlap with one another by a half of the width P1, that is, P1/2. Similarly, adjacent Y coils 23 are arranged along the Y axis to overlap with one another also by a half of the width P1, that is, P1/2. In this example, P2X=680 mm, P2Y=980 mm, and P1=50 mm.

It is noted that in FIG. 7(a), for clarity and simplicity, the sides of the coils 23 are shifted from one another. However, actually, they are arranged to overlap with one another. For example, the long sides X1g, X2g, . . . , and Xm-2g of the X coils X1, X2, . . . , Xm-2 overlap with long sides X3f, X4f, . . . , Xmf of X coils X3, X4, . . . , Xm, respectively. Similarly, the long sides Y1g, Y2g, . . . , and Yn-2g of the Y coils Y1, Y2, . . . , Yn-2 overlap with long sides Y3f, Y4f, . . . , Ynf of Y coils Y3, Y4, . . . , Yn, respectively. Additionally, the short sides Yd of all the Y coils 23 overlap with the long side Xf of the X coil X1, and the short sides Yh of all the Y coils 23 overlap with the long side Xg of the X coil Xm. The short sides Xd of all the X coils 23 overlap with the long side Yf of the Y coil Y1, and the short sides Xh of all the X coils 23 overlap with the long side Yg of the Y coil Yn. Also, the pair of terminals 23a for each X coil 23 are configured to have the minimum interspacing therebetween. Similarly, the pair of terminals 23b for each Y coil 23 are configured to have the minimum interspacing therebetween.

Figure 8:
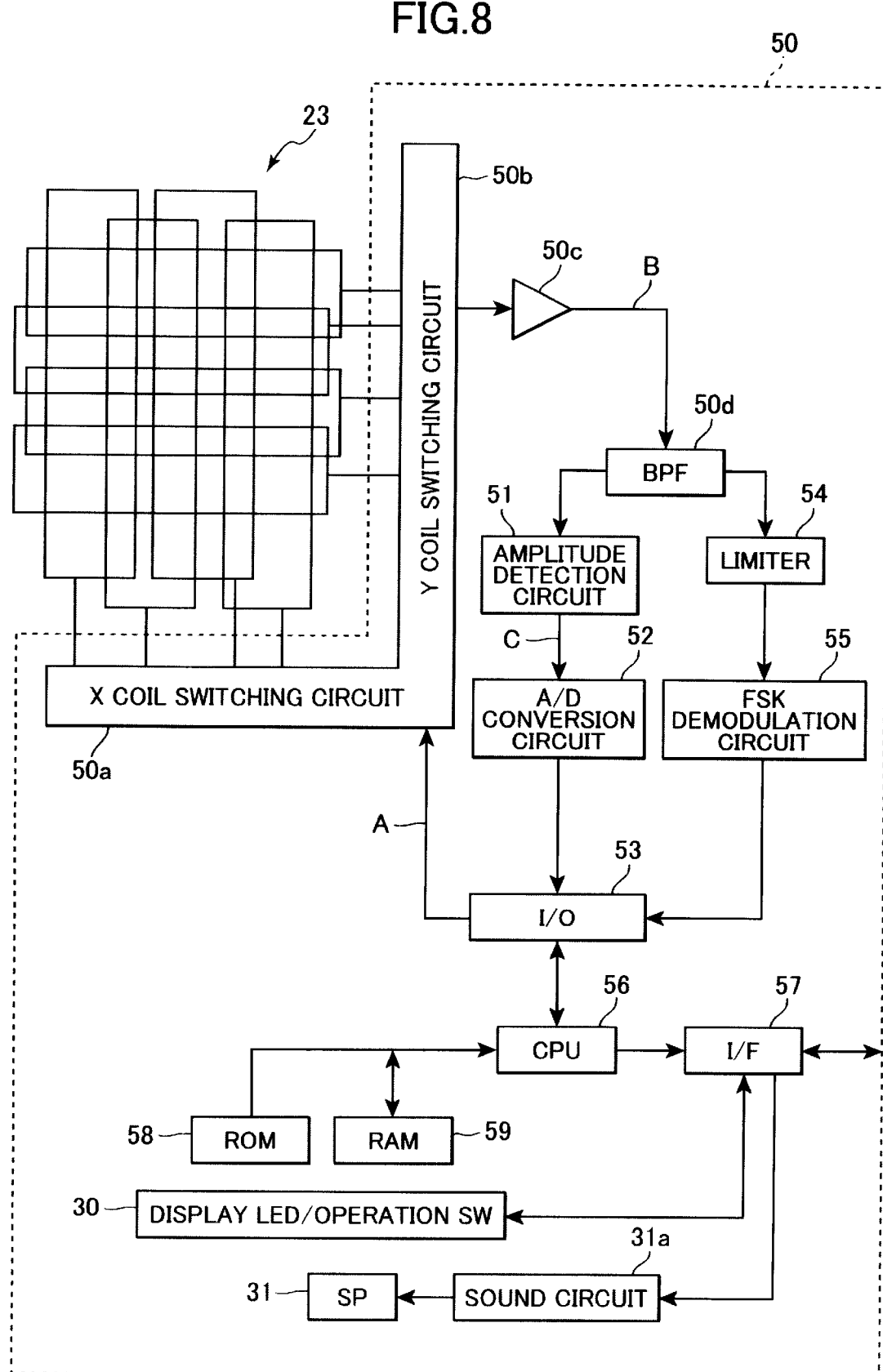
FIG. 8 is a block diagram showing an electrical configuration of the electronic white board.

As shown in FIG. 8, the pair of coil terminals 23a for each X coil 23 is connected to an X coil switching circuit 50a, which is provided in a control portion 50 of the electronic white board 1. Similarly, the pair of coil terminals 23b for each Y coil 23 is connected to a Y coil switching circuit 50b, which is also provided in the control portion 50 of the electronic white board 1.

Next, electrical configuration of the control portion 50 of the electronic white board 1 will be described while referring to the block diagram of FIG. 8.

The electronic white board 1 includes the control device 50 that is internally provided in the writing panel 10. The control device 50 includes: the X coil switching circuit 50a for switching the X coils X1 to Xm in this order to successively scan the X coils X1 to Xm; and a Y coil switching circuit 50b for switching the Y coils Y1 to Yn in this order to successively scan the Y coils Y1 to Yn. Although not shown in the drawing, each circuit 50a, 50b includes a switching element such as a transistor (MOS FET, for example).

The control portion 50 further includes: an amplifier 50c, a bandpass filter (BPF) 50d, an amplitude detection circuit 51, an analog-to-digital (A/D) conversion circuit 52, a limitter circuit 54, a FSK demodulation circuit 55, an input/output (I/O) circuit 53, a CPU 56, a ROM 58, a RAM 59, an interface (I/F) device 57, a sound circuit 31a.

When the pen 60 is placed on the writing surface 21a, the X and Y sense coils 23 are magnetically coupled with the alternating magnetic field from the pen 60, and produces electric signals. The I/O circuit 53 is controlled by the CPU 56 to output coil selecting signals A, as shown in FIG. 9, to control the X and Y coil switching circuits 50a and 50b to successively scan the X coils X1–Xm and the Y coils Y1–Yn. As a result, the electric signals induced on the X coils X1–Xm and the Y coils Y1–Yn are scanned, and are inputted through the sense coil terminals 23a and 23b to the X and Y coil switching circuits 50a and 50b.

The amplifier 50c is for receiving the signals thus scanned by the X and Y coil switching circuits 50a and 50b, and for amplifying the received signals to produce amplified signals B shown in FIG. 9.

The bandpass filter (BPF) 50d is for filtering out portions of unnecessary bandwidths from the amplified signal B. The portion of the amplified signal B, only in a required bandwidth, passes through the bandpass filter (BPF) 50d. The resultant signals have the same waveform as that of the carrier signals, which has been frequency-shift-keying modulated according to the modulation frequency fm and which has been transmitted from the pen 60.

The amplified signals, having passed through the BPF 50d, are received by the amplitude detection circuit 51. The amplitude detection circuit 51 is for detecting amplitudes (voltage values) of the thus amplified signals B, and produces detection amplitude signals C also shown in FIG. 9.

The A/D conversion circuit 52 is for converting those analog signals C, which are outputted from the amplitude detection circuit 51 and which are indicative of the amplitudes of the amplified signals, into digital signals that correspond to the amplitudes of the amplified signals. The CPU 56 receives the thus obtained digital signals through the I/O circuit 53.

The limitter circuit 54 and the FSK demodulation circuit 55 are for cooperating to detect the modulation frequency fm of the bandpass-filtered amplified signals, that is, the modulation frequency fm of the alternating magnetic-field from the pen 60, thereby detecting the attribute of the pen 60 now located on the writing surface 21$a$. That is, the amplified signal B having passed through the BPF 50$d$ is received also by the limitter circuit 54. The limiter circuit 54 is for converting the filtered, amplified signal (frequency-shift-keying modulated carrier wave) B into a square waveform pulse. The FSK demodulation circuit 55 is for demodulating the square waveform pulse and for obtaining output values indicative of the demodulated result. The CPU 56 receives the output values through the I/O circuit 53, and determines the attribute of the pen now being located on the writing surface 21$a$.

Figure 14:
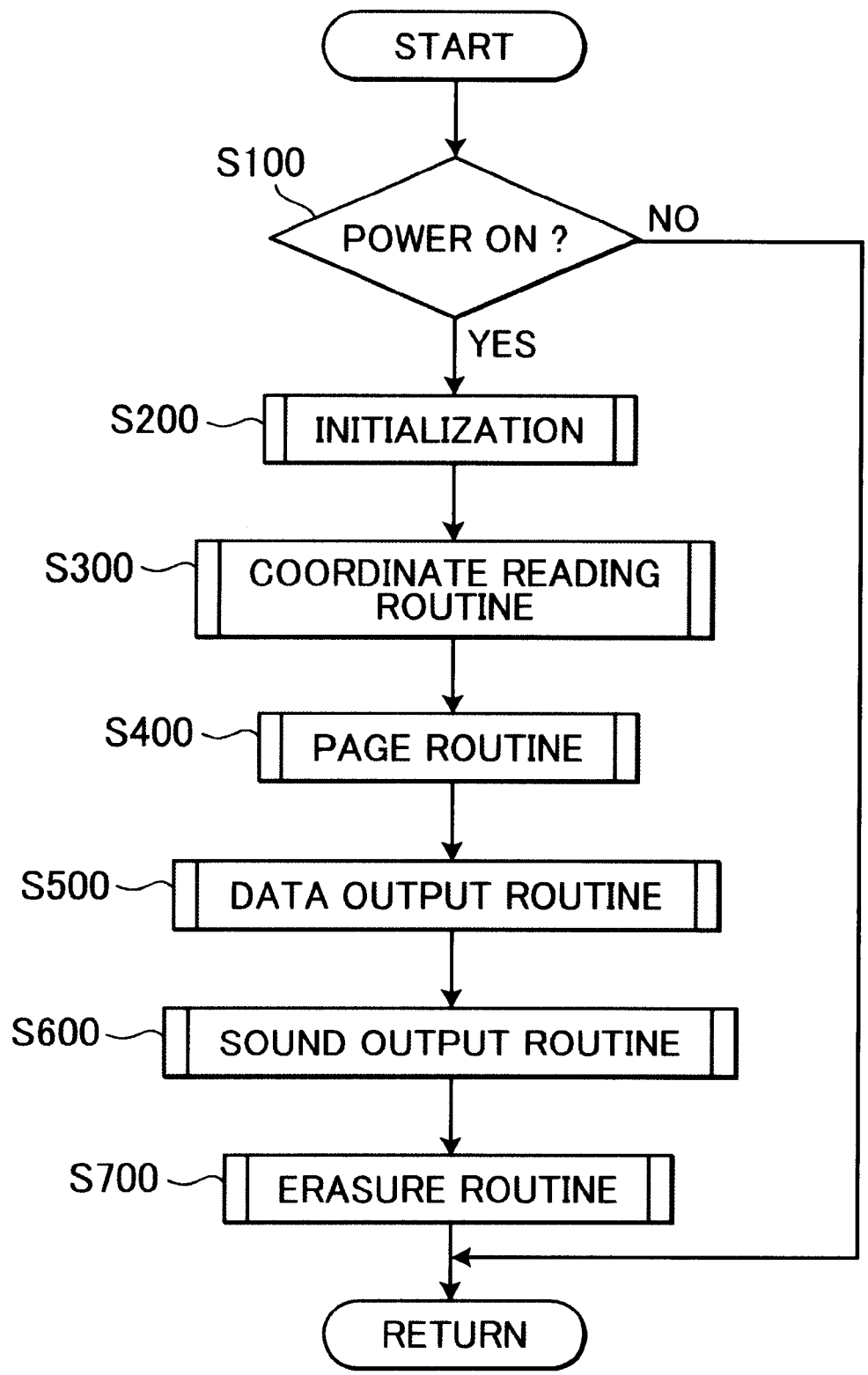
FIG. 14 is a flowchart of a main routine executed by the CPU in the control portion of FIG. 8.
Figure 15:
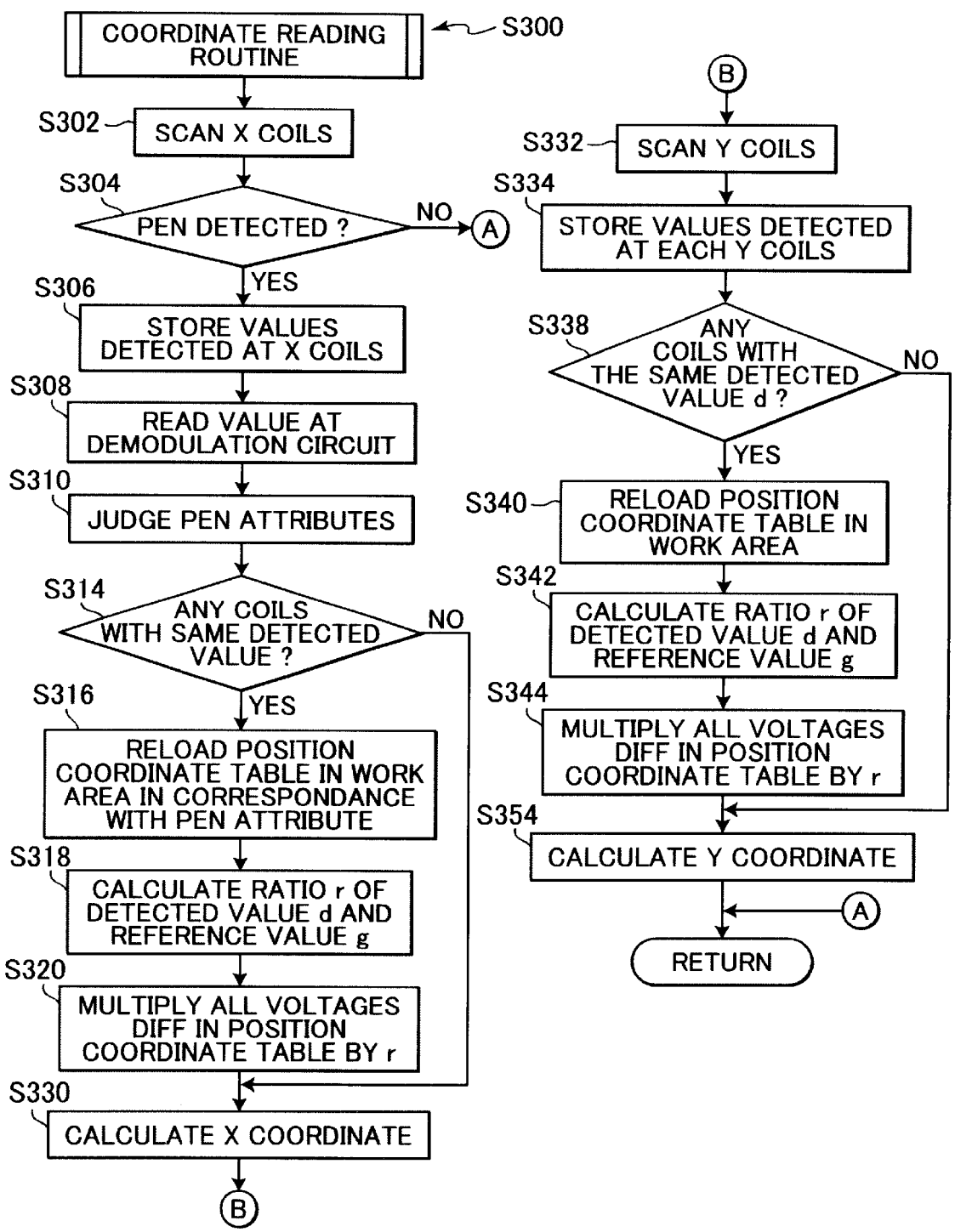
FIG. 15 is a flowchart of a coordinate reading process of S300 in FIG. 14.

The ROM 58 stores therein a variety of control programs to be executed by the CPU 56, such as the programs of the routines of FIGS. 14 and 15. The ROM 58 further stores a position coordinate table 58$a$ (FIG. 10($b$)) as will be described later.

The I/F device 57 is connected to the CPU 56 and to the control panel 30 (FIG. 2). When one of the page reverse button 33, the page forward button 34, and the erasure button 35 is pressed, then the CPU 56 will execute appropriate page process, such as, reversing, forwarding, or erasing the stored written data in page units. The sound circuit 31$a$ is controlled by the CPU 56 to generate operational sounds, such as beeps, through the speaker (SP) 31 when one of the buttons on the operation panel 30 is pressed.

Next, the position coordinate table 58$a$ will be described while referring to FIGS. 10($a$) and 10($b$).

The position coordinate table 58$a$, shown in FIG. 10($b$), is used for detecting the coordinates indicative of the position of the pen 60 on the writing surface 21$a$. FIG. 10($a$) is a graph representing the position coordinate table 58$a$.

The position coordinate table 58$a$ is prepared in a manner described below.

As shown in FIG. 11($a$), the X coils X1, X2, X3 have center lines c1, c2, and c3, respectively. Each center line c1, c2, c3 extends along the Y direction. If the pen 60 is positioned at some place near the X coils X1–X3 on the writing surface 21$a$, the X coils X1, X2, X3 generate voltages ex1, ex2, ex3, respectively, as shown in FIG. 11($b$). FIG. 11($b$) shows how the voltages induced at the loop coils X1–X3 change when the position of the pen 60 moves along the X direction. As apparent from FIG. 11($b$), each of the voltages ex1 to ex3 becomes maximum when the pen 60 comes close to the corresponding center line c1 to c3, and gradually decreases as the pen 60 goes away from the corresponding center line toward the long sides Xf and Xg of the corresponding loop coil X1, X2, X3. It is noted that the width P1 of each sense coil can be increased as long as the voltage generated from each coil has the same characteristic.

The voltage line ex1–ex3 for each X coil X1–X3 has a pair of null points where the voltage ex1–ex3 has a voltage of about zero (0) value. In other words, each X coil generates a voltage of zero value when the pen 60 is located on one of the null points along the X axis. According to the present embodiment, the X coils X1–Xm are arranged to overlap with adjacent X coils by a half of the width P1 so that each null point for each X coil will be located at a position that is separated from the corresponding center line by a distance greater than the half of the width P1. Accordingly, the null point for each X coil is separated away from the corresponding center line by a distance that is greater than the distance of the corresponding center line to the center lines of adjacent X coils. In this example shown in FIG. 11($b$), the null points for the X coil X2 are separated away from the center line C2 by a distance that is greater than the distance from the center line C2 to the center lines C1 and C3 of the adjacent X coils X1 and X3. The amount, by which adjacent sense coils are overlapped with one another, can be made smaller than P1/2 as long as the null point for each coil is separated away from the corresponding center line by a distance that is greater than the distance (P1/2) of the corresponding center line to the center lines of adjacent X coils. In this case, coordinate detection within a wide area can be attained by using the small number of sense coils.

It should be noted that in the drawings of FIGS. 11($a$) –11($c$), the width of the sense coils 23 is indicated slightly smaller than the actual size in order to facilitate understanding of the overlap between the sense coil 23.

FIG. 11($c$) shows how the voltage difference between two adjacent loop coils 23 among the X loop coils X1 to X3 changes when the position of the pen 60 moves along the X axis. As shown in FIG. 11($c$), the voltage difference is largest when the pen 60 is located at the center c1 to c3 of each sense coil, and becomes zero when the pen 60 is located at the position in the intermediate position defined between the center of each sense coil and a long side (Xg or Xf) of the corresponding sense coil. That is, the voltage difference is zero at the middle position in the area where two adjacent sense coils overlap with one another.

For example, FIG. 11($c$) indicates, using a solid line, how the voltage difference value (ex1–ex2) between the voltages at the X coils X1 and X2 changes when the pen 60 goes away from the center C1 of the X coil X1 toward the intermediate point Q1 (FIG. 11($a$)), which is the middle point in the area where the X coil X1 overlaps with the X coil X2. In this case, the distance ΔX of the pen 60 from the center C1 of the X coil X1 changes from a zero value toward a half of the intercoil pitch (P1/2), that is, P1/4. It is therefore apparent that the distance ΔX of the pen 60 from the center C1 can be known based on the voltage difference (ex1–ex2) between the voltages at the adjacent X coils X1 and X2.

For example, when the pen 60 is located at a position Q2 of FIG. 11($a$), by detecting the voltage difference (ex1–ex2), the distance ΔX1 of the pen 60 from the center C1 can be determined, and the X coordinate of the point Q2 can be determined accordingly.

When the voltage difference (ex1–ex2) is expressed in digital data DIFF of eight bits, the relationship between the digital data DIFF and the distance ΔX [mm] from the center C1 can be indicated as shown in FIG. 10($a$). More specifically, the graph of FIG. 10($a$) is obtained when the pen 60 is located at some place in the area between the center line C1 and the middle line Q1. The voltages induced at the X coils X1 and X2 are scanned by the x-coil scanning circuit 50$a$, amplified by the amplifier 50$c$, filtered by the BPF 50$d$, detected by the amplitude detection circuit 51, and converted by the A/D converter 52 into eight-bit digital data.

The digital data DIFF is obtained by calculating the difference between the eight-bit digital data for the voltages at the X coils X1 and X2. The relationship between the position $\Delta X$ [mm] of the pen 60 from the center line C1 and the digital difference data DIFF is shown in FIG. 10($a$). The position coordinate table 58$a$ of FIG. 10($b$) is obtained simply by converting the graph of FIG. 10($a$) into a table form.

As indicated by a solid line in FIG. 11($c$), in the area from the center line C1 to the middle line Q1, the characteristic in FIG. 10($a$) shows the relationship between the voltage difference (ex1−ex2) and the pen location $\Delta X$ [mm] from the center line C1 in the positive direction along the X axis. However, as indicated by broken lines in FIG. 11($c$), in another area from the middle line Q1 to the center line C2, the same characteristic in FIG. 10($a$) shows the relationship between the voltage difference (ex2−ex1) and the pen location $\Delta X$ [mm] that is now defined from the center line C2 in the negative direction along the X axis.

Thus, in the area from the center line Ci of each X coil Xi (where $1 \leq i \leq m-1$) to the middle line Qi, between the center line Ci and the center line Ci+1 of its next X coil Xi+1, the characteristic of FIG. 10($a$) represents the relationship between the voltage difference (exi−exi+1) and the pen location $\Delta X$ [mm] that is defined from the center line Ci of the X coil Xi in the positive direction along the X axis. Contrarily, in the area from the middle line Qi to the center line Ci+1, the same characteristic of FIG. 10($a$) represents the relationship between the voltage difference (exi+1−exi) and the pen location $\Delta X$ [mm] defined from the center line Ci+1 in the negative direction along the X axis.

Additionally, the same characteristic in FIGS. 11($a$)–11($c$) is obtained for the relationship between the voltages induced at the Y sense coils Y1–Yn and the position of the pen 60 in the Y axial direction. Accordingly, in the area from the center line Ci of each Y coil Yi (where $1 \leq i \leq n-1$) to the middle line Qi between the center line Ci of the subject Y coil Yi and the center line Ci+1 of the next Y coils Yi+1, the characteristic in FIG. 10($a$) represents the relationship between the voltage difference (eyi−eyi+1) for the coils Yi and Yi+1 and the pen location $\Delta Y$ [mm], that is defined from the center line Ci of the Y coil Yi in the positive direction along the Y axis. Contrarily, in the area from the middle line Qi to the center line Ci+1 of the Y coil Yi+1, the characteristic in FIG. 10($a$) represents the relationship between the voltage difference (eyi+1−eyi) and the pen location $\Delta Y$ [mm], which is defined from the center line Ci+1 in the negative direction along the Y axis.

As will be described later, when the pen 60 is located at some place on the writing surface 21$a$, the voltages induced at the X coils X1–Xm are scanned by the x-coil scanning circuit 50$a$, amplified by the amplifier 50$c$, filtered by the BPF 50$d$, detected by the amplitude detection circuit 51, and converted by the A/D converter 52 into eight-bit digital data. The thus obtained eight-bit digital data are stored in the RAM 59 at its temporary storage area 59$a$ as shown in FIG. 12($b$). When the voltage at some X coil Xi is the largest among all the X coils X1–Xm and when the voltage at its adjacent coil Xi+1 is greater than the voltage at its other adjacent coil Xi−1, it can be known that the pen 60 is within the area between the center line Ci of that coil Xi and the middle line Qi between the center lines Ci and Ci+1. Accordingly, the X coordinate of the pen can be obtained by adding, to the X coordinate of the center line Ci, the distance $\Delta X$ [mm] that is indicated in the table of FIG. 10($b$) in correspondence with one value DIFF that is most near to a difference value calculated between the digital data for the coils Xi and Xi+1.

Similarly, when the voltage at some X coil Xi is the largest among all the X coils X1–Xm and when the voltage at the adjacent coil Xi−1 is greater than that at the adjacent coil Xi+1, it can be known that the pen 60 is within the area between the center line Ci of that coil Xi and the middle line Qi−1 between the center lines Ci and Ci−1. Accordingly, the X coordinate of the pen can be obtained by subtracting, from the X coordinate of the center line Ci, the distance $\Delta X$ [mm] that is indicated in the table of FIG. 10($b$) in correspondence with one value DIFF that is most near to a difference value calculated between the digital data for the coils Xi and Xi−1. Thus, the x coordinate of the pen 60 on the writing surface 21$a$ can be determined.

In a similar manner, the y coordinate of the pen 60 on the writing surface 21$a$ can be determined. That is, the voltages induced at the Y coils Y1–Yn are scanned by the y-coil scanning circuit 50$b$, filtered by the BPF 50$d$, amplified by the amplifier 50$c$, detected by the amplitude detection circuit 51, and converted by the A/D converter 52 into eight-bit digital data. The thus obtained eight-bit digital data are stored in the RAM 59 at its voltage value storage area 59$a$ in the same manner as shown in FIG. 12($b$). Then, in the same manner as described above for the x-coordinate, the y-coordinate of the pen 60 can be determined using the difference between the voltages of two adjacent Y coils that induce the largest and the second largest voltages and referring to the table 58$a$.

As described already, the position coordinate table 58$a$ is stored in the ROM 58, and will be referred to as table data for determining coordinates of the position of the pen 60 using the detected induction voltages.

As shown in FIG. 12($a$), the RAM 59 has a plurality of storage areas. More specifically, the RAM 59 has: a storage area for storing pen attribute data detected through the FSK demodulation circuit 55; another storage area for storing the position coordinate table 58$a$ retrieved from the ROM 58; the temporary storage area 59$a$; and a finalized area 59$b$.

As described already, the position coordinate table 58$a$ shown in FIG. 10($b$) indicates the relationship between the voltage difference DIFF between the maximum voltage e(max) and the second maximum voltage e(max2) and offset distances $\Delta X$ from the center of the maximum-voltage sense coil. The voltage differences DIFF are represented as 8 bit digital values. Position coordinates are calculated using the offset distance $\Delta X$ in association with a detected voltage differences DIFF.

It is noted that the relationship between the voltage differences DIFF and the offset distance $\Delta X$ in the position coordinate table 58$a$ are prepared by executing the measurements using the pen 60 whose battery 70 is fully charged. Accordingly, the voltage differences DIFF in the position coordinate table 58$a$ are fixed values. Because the battery 70 is thus fully charged when the measurement is taken, the alternating magnetic field generated by the pen 60 is at its maximum strength. However, after the battery 70 of the pen 60 is used, the strength of the alternating magnetic field decreases. Therefore, the voltage difference DIFF detected, when the pen 60 is located a certain distances $\Delta X$ from the center of the maximum voltage sense coil, will be less than the corresponding fixed value DIFF in the table 58$a$. Therefore, the pen 60 will be judged as being a distance $\Delta X$ that is farther from the center of the maximum voltage sense coil than the actual distance $\Delta X$. As a result, errors will occur in the calculated position coordinates.

According to the present embodiment, in order to solve this problem, when the battery 70 of the pen 60 has not been used at all and therefore is fully charged, the voltage value generated by two adjacent sense coils is measured when those adjacent sense coils generate the same voltage value. The measured voltage value is stored in the ROM 58 as a reference value g. After the battery 70 has been used, the voltage value generated by two adjacent sense coils is measured again when those adjacent sense coils generate the same voltage value. The measured value is stored as a detected value d. A ratio r between the reference value g and the detected value d is calculated and used to correct the voltage differences DIFF in the position coordinate table 58a. With this configuration, errors in position coordinates caused by decrease in the strength of the alternating magnetic field from the pen 60 can be corrected.

Figures 12A, 12B, 13:
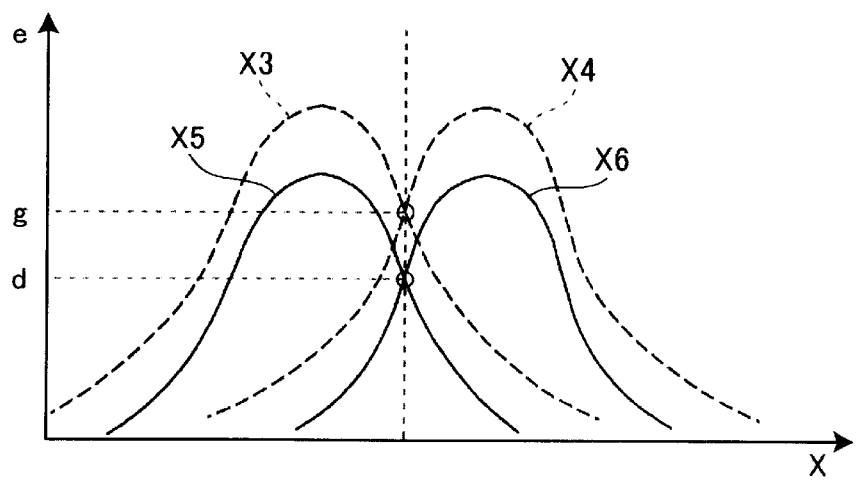
FIG. 13 is a graph illustrating the case where voltages detected by two adjacent sense coils are substantially equal to each other.

For example, as shown in FIG. 13, it is assumed that voltages are detected at X sense coils when the battery 70 is fully charged. More specifically, the X coils are scanned while the battery 70 is fully charged. When both X coils X3 and X4 generate the same voltages with each other, the voltage detected by those two adjacent X coils X3 and X4 is stored as the reference value g. The X coils are scanned again after some time has elapsed and when the battery 70 is less than fully charged. When both X coils X5 and X6 generate the same voltages with each other, the voltage detected for those two adjacent X coils X5 and X6 is stored as the detected value d. Then, the ratio r of d to g (r=d/g) is determined and the ratio r is used to correct to voltage difference DIFF in the position coordinate table 58a. It should be noted that the same voltage value will be detected from any two adjacent sense coils X coils Xi and Xi+1 when those adjacent X coils Xi and Xi+1 are scanned while the pen 60 is located at a center line Qi of the overlapping section of the X coils Xi and Xi+1. For example, the two adjacent sense coils X1 an X2 will detect the same voltage value when the X coils X1 and X2 are scanned while the pen 60 is located at the center line Q1 of the overlapping section of the X coils X1 and X2.

With the above-described structure, the CPU 56 controls the entire device 1. More specifically, the CPU 56 executes the main routine as shown in FIG. 14.

When the CPU 56 detects that the power button 38 is pressed down to be turned ON (S100:YES), then in S200, the CPU 56 executes initialization processes. During the initialization processes, the CPU 56 loads the various control programs from the ROM 58 into a work area of the RAM 59. The CPU 56 also loads the position coordinate table 58a from the ROM 58 into the work area of the RAM 59.

Next, the CPU 56 executes a coordinate reading process in S300 to read X and Y coordinates of the position of the pen 60 on the writing surface 21a, and to store data of the read X and Y coordinates in the RAM 59. As the coordinate reading process of S300 is repeatedly executed, the pen is continuously detected by the sense coils 23 and the X and Y coordinates of the position of the pen 60 are repeatedly determined, and stored in the RAM 59. The thus successively-determined position coordinate data of the pen 60 constitute a set of written data that is indicative of an image (characters and/or figures) drawn on the writing surface 21a by the pen 60. A plurality of sets of written data, indicative of a plurality of pages' worth of images, can be stored in the RAM 59, wherein each set of written data indicates a corresponding page image.

In S400, the CPU 56 executes a page process of S400. During the page process of S400, when the user presses down either one of the page reverse button 33, the page forward button 34, and the erasure button 35, the CPU 50 executes appropriate page process, such as a page reversing process, a page forwarding process, or a page erasing process, in page units onto the written data now stored in the RAM 59. More specifically, the CPU 56 receives, through the I/O circuit 57, a switching signal which is generated in response to an operation of some button on the operation portion 30, and executes the page processes. For example, the CPU 56 reverses or forwards, by page units, the written data stored in the RAM 59. Or, the CPU 56 erases the written data also in page units.

In S500, the CPU 56 executes a data output process to convert all the written data (pen position coordinate data) of the user's desired page, that is now stored in the RAM 59, into an appropriate format and to output the resultant data to the PC 100 or the printer 200. In S600, the CPU 56 executes a sound output routine for generating operational sounds, such as beeps, by operating the sound circuit 31a in response to the switching signals, which are generated when one of the buttons is pressed, and by controlling the speaker (SP) 31 accordingly.

Then, the routine proceeds to S700. In S700, if the eraser 40 is located on the writing surface 21a and is detected by the sense coils 23, the CPU 56 determines the X and Y coordinates of the eraser 40, in the same manner as in the pen coordinate reading process of S300, based on values of the voltages generated by the X and Y coils 23 that are magnetically coupled with the alternating magnetic field from the coil in the eraser 40. The CPU 56 then determines the course followed by the eraser 40. The CPU 56 deletes, from the RAM 59, some pen coordinate data (written data) that corresponds to the course followed by the eraser 40.

After process of S700 is completed, one series of processes represented by the flowchart in FIG. 14 are completed, whereupon the program returns to S100 and repeats the processes in S100 to S700.

The coordinate reading process of S300 will be described below in greater detail with reference to FIG. 15.

When the coordinate reading process is started, X coils X1–Xm are successively scanned in S302. More specifically, in S302, the CPU 56 outputs the coil selection signal A (FIG. 9) to the X coil switching circuit 50a through the input/output circuit (IO) 53. By thus outputting the coil selection signal A to the X coil switching circuit 50a, the X coils X1 to Xm are scanned in this order.

When the pen 60 is not pressed against the writing surface 21a and is therefore not detected at the X coils (S304:NO), then the coordinate reading process of S300 is ended, and the routine proceeds to the page routine of S400. On the other hand, when the pen 60 is located on the writing surface 21a, some X coils are magnetically coupled with the alternating magnetic field from the coil L1 in the pen 60, and generate electric signals. These signals are amplified by the amplifier 50c into the amplified signals B shown in FIG. 9. The amplified signals B are outputted to the band pass filter (BPF) 50d, where unnecessary regions are filtered out. Then, amplitude detection is performed onto the amplified signals B at the amplitude detection circuit 51. The amplitude detection circuit 51 outputs detection signals C (FIG. 9) to the A/D conversion circuit 52, whereupon the A/D conversion circuit 52 converts the amplitude, that is, the voltage value of the amplified signals B, into corresponding digital signals. The digital signals are inputted into the CPU 56 through the input/output circuit 53. Thus, when the CPU 56 receives those digital signals, the CPU 56 determines that the pen 60 is detected (S304:YES), then the program proceeds to S306.

In S306, the CPU 56 successively stores voltage values (e1) to (em) of the received digital signals, which are inputted from the scanned X coils X1 to Xm. As shown in FIG. 12(b), the CPU 56 successively stores those digital voltage values e1 to em in the temporary storage area 59a in association with the corresponding X coil numbers of 1 to m.

The signals having passed through the BPS 50d is converted by the limitter circuit 54 into the square waveform pulses. The FSK demodulation circuit 55 performs FSK demodulation onto the square wave pulses, and outputs a demodulated result value, through the I/O circuit 53, to the CPU 56. In S308, therefore, the CPU 56 reads the output value from the FSK demodulation circuit 55. In S310, the CPU 56 judges the pen attribute based on the read output value. For example, it is assumed that the FSK demodulation circuit 55 is designed to output a value of 245 when demodulating modulation frequency fm of 4.1 kHz. If the CPU 56 receives the output value of 245, then the CPU 56 judges the pen attributes to be black.

In S314, the CPU 56 examines the detected values stored in the RAM 59, and judges whether or not any two adjacent X coils have the same detected value d. In the example shown in FIG. 12(b), the coil numbers X5 to X6 both have the same detected value d of 128. Therefore, the CPU 56 judges that the two X coils X5 to X6 have the same detected value d (S314:YES). As a result, the program proceeds to S316, in which the CPU 56 discards the position coordinate table 58a, which is already loaded in the work area of the RAM 59 in correspondence with the pen attribute detected in S310, in order to prevent a once-corrected position coordinate table from being used as the basis for further corrections. Then, the CPU 56 reloads a new position coordinate table 58a from the ROM 58 into the work area of the RAM 59. Then, the CPU 56 stores the new position coordinate table 58a in the work area of the RAM 59 in association with the pen attributes that have been determined in S310. For example, if the determined pen attribute is black color, then as shown in FIG. 12(a), the position coordinate table 58a is reloaded into the work area as a position coordinate table specifically for the black colored pens.

Figures 10A, 10B, 10C:
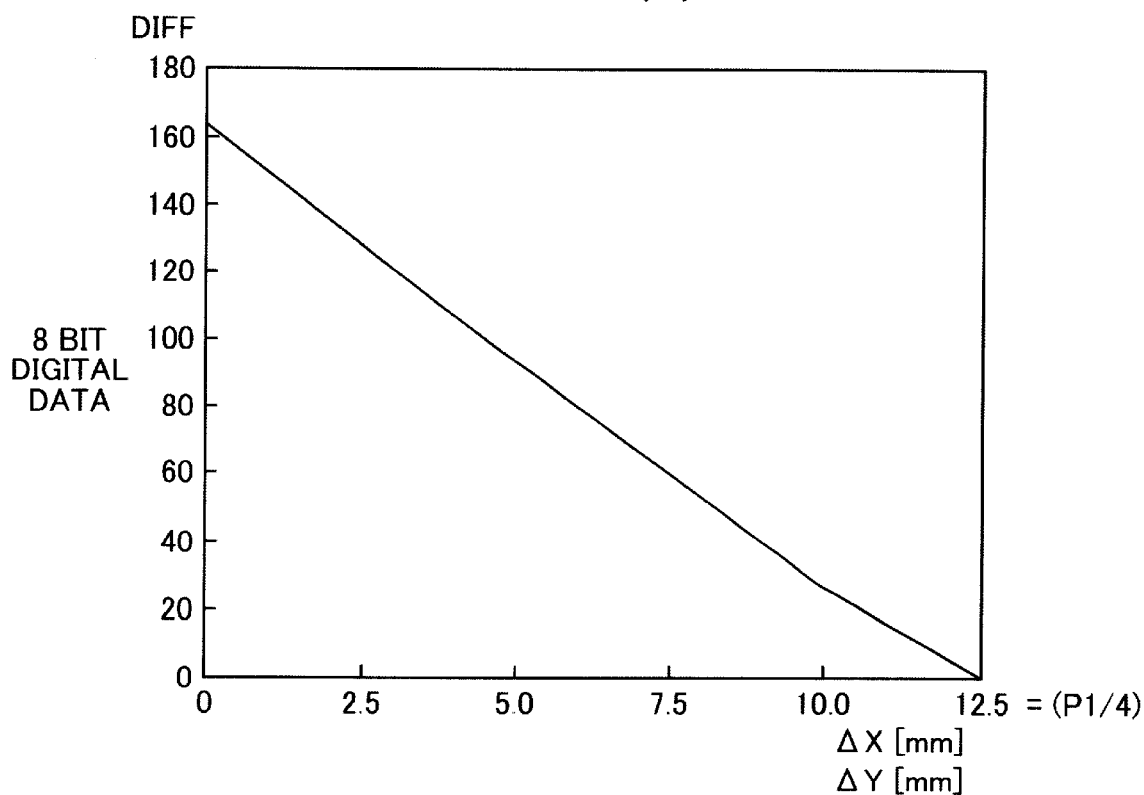
FIG. 10(*a*) is a graph representing a position coordinate table 58*a*.

Next, in S318, the CPU 56 calculates the ratio r between the reference value g and the detected value d that is detected in S314. Then, in S320, all of the voltage differences DIFF in the position coordinate table 58a, that is now stored in the work area, are multiplied by the ratio r. If the reference value g is 256 and if the detected values are stored as shown in FIG. 12(b), then the ratio r is calculated to be 0.5 because the detected value d is 128 (r=d/g=128/256=0.5). Therefore, 0.5 is multiplied with each voltage difference value DIFF in the position coordinate table 58a. If the position coordinate table 58a has values as shown in FIG. 10(b), a new updated position coordinate table 58a can be obtained as shown in FIG. 10(c), wherein all the voltage differences DIFF have been corrected to approximately one half their original values. It is noted that the voltage differences DIFF indicated in FIG. 10(c) are obtained by half-adjusting the results of multiplying with the ratio r.

Next, the CPU 56 calculates in S330 the X coordinate of the pen 60 based on the position coordinate table 58a that has been just corrected and that is now stored in the work area of the RAM 59 in association with the pen attributes that have been determined in S312. It is noted that if there exist no X coils that have the same detected values (no in S314), then, the program directly proceeds to S330. In this case, the CPU 56 performs the X coordinate calculation operation based on a position coordinate table 58a that is stored in the work area of the RAM 59 in association with the pen attributes that have been determined in S310 and that is not corrected during the present scanning operation.

The calculation in S330 is executed using the voltage values e(1) to e(m) that are stored in the temporary storage area 59a. The calculation in S330 will be described below in greater detail.

First, the CPU 56 selects the largest voltage value e(max) among all the voltage values e1 to em stored in the voltage value storage area 59a, where $1 \leq max \leq m$. The CPU 56 then determines the coil number "max" of the X coil X(max) that has generated the largest voltage value e(max). The CPU 56 stores the determined coil number "max" in the RAM 59.

Figure 11A:
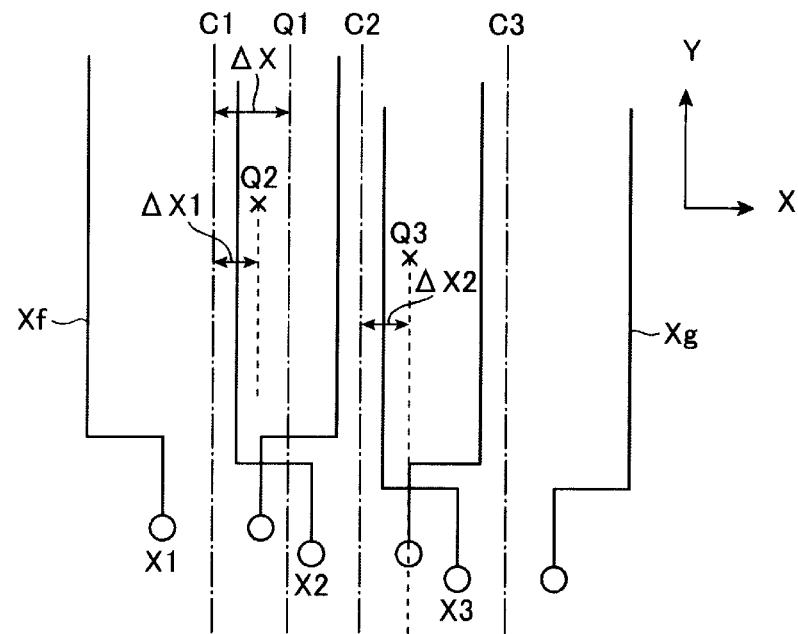
FIG. 11(*a*) illustrates a part of X coils X1–X3.
Figure 11B:
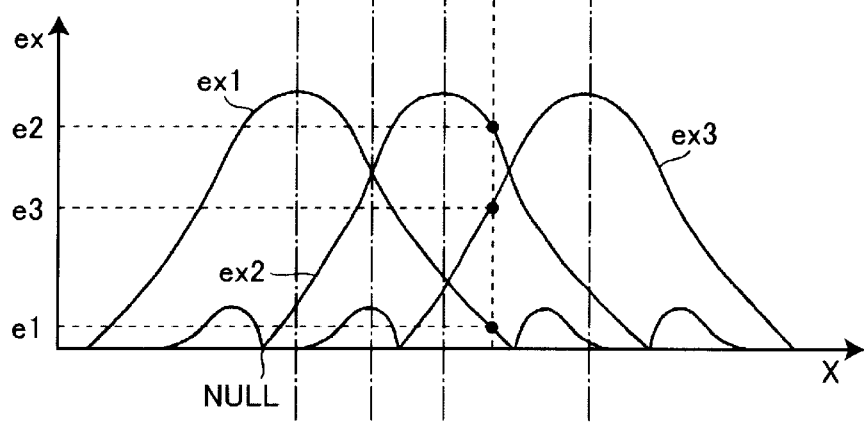

For example, if the pen 60 is located at a position Q3 shown in FIG. 11(a), the X coils X1, X2, X3 generate voltage values e1, e2, e3, respectively, as shown in FIG. 11(b). In this case, the CPU 56 selects the voltage value e2 as the largest voltage value e(max). The CPU 56 selects the coil number (2) of the X coil X2 as the coil number "max", and stores the coil number (2) in the RAM 59.

The CPU 56 then compares voltage values e(max+1) and e(max−1) with each other. The voltage value e(max+1) is the value of a voltage induced at a X coil X(max+1) that is located adjacent to and in the right side of the maximum coil X(max). In other words, the X coil X(max+1) is located in the positive direction from the X coil X(max) along the X axis. The voltage value e(max−1) is the value of a voltage induced at another X coil X(max−1) that is located adjacent to and in the left side of the maximum coil X(max). In other words, the X coil X(max−1) is located in the negative direction from the X coil X(max) along the X axis. The CPU 56 selects one of the voltage values e(max+1) and e(max−1) that is greater than the other. The CPU 56 then stores, in the RAM 59, the coil number (max2) of the X coil that has generated the selected greater voltage value e(max+1) or e(max−1). The thus selected X coil (max2) is the second maximum voltage coil that has induced the second largest voltage among all the X coils (X coil (1)–X coil (m)).

In the example shown in FIGS. 11(a) and 11(b), because the maximum coil number (max) is equal to 2, the voltage value e1 (e(max−1)) of the X coil X1 and the voltage value e3 (e(max+1)) of the X coil X3 are compared with each other. Because e3 is greater than e1 for the position of Q3, the corresponding coil number (3) of the X coil X3 is stored in the RAM 59 as the coil number (max2).

Next, the CPU 56 compares the value of the coil number (max) and the coil number (max2) which are now stored in the RAM 59. The CPU 56 then judges whether or not the coil number (max2) is greater than or equal to the coil number (max). In other words, the CPU 56 judges whether the coil X(max2) exists in the positive direction (rightside) or in the negative direction (leftside) from the coil X(max) along the X axis.

When the $max2 \geq max$, it is determined that the coil X(max2) exists in the positive direction (rightside) from the coil X(max) along the X axis. Accordingly, a variable "SIDE" is set to 1. On the other hand, when max2<max, it is determined that the coil X(max2) exists in the negative direction (leftside) from the coil X(max) along the X axis. Accordingly, the valuable "SIDE" is set to −1.

In the example of FIGS. 11(a) and 11(b), because max=2 and max2=3, max2>max, and therefore the variable SIDE is set to 1.

Next, the CPU 56 calculates a difference voltage "DIFF" between the voltages e(max) and e(max2) by calculating the following formula (1):

$$DIFF = e(\max) - e(\max 2) \tag{1}$$

Next, the CPU 56 retrieves, from the position coordinate table 58a now stored in the RAM 59 in association with the detected pen attribute, a coordinate offset amount ΔX that corresponds to a value DIFF that is closest to the calculated different value DIFF. The CPU 56 sets the retrieved coordinate offset amount ΔX as a value "OFFSET".

The CPU 56 then determines the X coordinate X1 of the pen 60 by calculating the following formula (2):

$$X1 = (P1/2) \times (\max) + OFFSET \times SIDE \tag{2}$$

wherein the value of "(P1/2) X(max)" represents the X coordinate of the center line of the maximum voltage-inducing coil X(max).

Figure 11C:
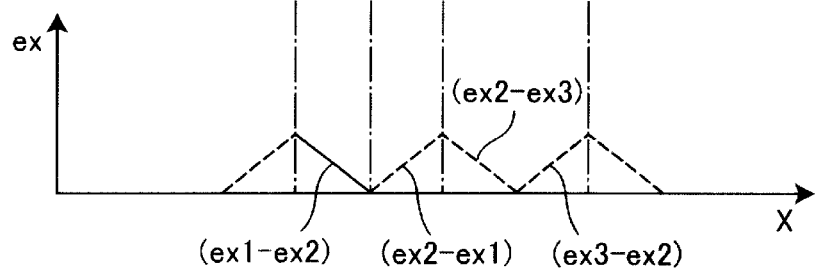

In the example shown in FIGS. 11(a)–11(c), X1 of the pen 60 at the location Q3 is calculated as being equal to (P1/2)×2+(e2−e3)×1. Thus, it is known that the position Q3 is separated, in the positive direction along the X axis, from the center line C2 of the X coil X2 by the distance ΔX2 that corresponds to the voltage value difference (e2−e3).

In the example of FIG. 12(b), the maximum value of 128 is detected at both of the X coils X5 and X6, so the voltage difference DIFF between the two is zero. As shown in FIG. 10(c), the difference ΔX of 12.5 mm is stored in the corrected position coordinate table 58a in association with a voltage difference DIFF of zero (0). Therefore, the offset amount ΔX of 12.5 mm is extracted from the position coordinate table 58a as the value OFFSET. When the X coil X6 is selected as max, then the X coil X5 will be set as max2. In this case, the coil number (max) (=6) is greater than the coil number (max2) (=5), so the variable SIDE is set to −1. Accordingly, the following formula is calculated in S330:

$$X1 = (P1/2) \times 6 + 12.5 \text{ mm} \times (-1).$$

In other words, the X coordinate X1 is the center point where the coils X5 and X6 overlap.

When the X coordinate of the pen is thus determined, the determined X coordinate is stored in the finalized area 59d of the RAM 59 (FIG. 12(a)) in association with the detected pen attributes, and the process of S330 is completed.

Then, similar processes are performed in S332–S354 to calculate the Y coordinate of the pen. More specifically, similarly to the process of S302, the CPU 50 successively scans the Y coils Y1 to Yn in S332 by outputting the coil selection signals A (FIG. 9) to the Y coil switching circuit 50b through the input/output circuit (I/O) 53.

Next, in S334, similarly to the process of S306, the digital values outputted from the Y coils Y1–Yn are stored as e(1) to e(n) in the temporary storage area 59a. The CPU 56 executes the same processes as described in S314 to S320 for the X coils, in S338 to S344 for the Y coils. That is, if some two adjacent Y coils exist with the same detected value d (S338:YES), then in S340 the position coordinate table stored in the work area of the RAM 59 is erased and the original position coordinate table 58a is reloaded from the ROM 58. In S342, the ratio r between the reference value g and the detected value d detected in S338 is calculated. In S344, the ratio r is multiplied with each voltage difference value DIFF in the position coordinate table 58a that has been reloaded in S340. Then, in S354, the y coordinate of the pen 60 is calculated in the same manner as in the process of S330. The thus calculated Y coordinate is stored in the finalized area 59d of the RAM 59 (FIG. 12(a)) in association with the detected pen attributes.

As described above, according to the present embodiment, when there exist two X coils that generate voltages of the same values during the X coil-scan operation (yes in S314), the CPU 58 discards the position coordinate table 58a that is already stored in the work area, and reloads a new position coordinate table 58a from the ROM 58, and then stores the position coordinate table 58a in association with the pen attribute data that is detected in S310. Then, the CPU 58 calculates a ratio r between the detected value d and the reference value g in S318, and multiplies, with the ratio r, each voltage difference value DIFF in the reloaded position coordinate table 58a in S320. As a result, the position coordinate table 58a is corrected in correspondence with the lowering of the output level of the alternating magnetic field of the pen 60. The CPU then calculates the X coordinate based on the corrected position coordinate table 58a.

Thus, according to the present embodiment, the ratio r between the reference value g and the detected value d indicates how much the voltage value d has dropped with respect to the reference value g. Therefore, by using this ratio r to correct error in position coordinates caused by drop in the detected signal level, accurate position coordinates of the pen can be read even when the strength of the alternating magnetic field drops. It is noted that when the pen 60 passes through the center points between two adjacent coils, the two adjacent coils produce signals with the same values d.

The LC oscillation circuit 69c, the CR oscillation circuit 69e, and the FSK circuit 69d in the pen 60 cooperate to transmit pen attributes information to the electronic white board 1. In the electronic white board 1, correction to the position coordinate table 58a is performed based on the recognized pen attribute information. Examples of the attributes include color of ink, such as black, red, and blue, and thickness of the pen tip, such as thick and fine. When a plurality of different pens are used, the amount of charge of the battery 70 used up will depend on the type of the pen used. For example, black colored pens are used most frequently, and blue colored pens are used least frequently. Therefore, the battery in the black pen will be consumed faster than the battery in the blue pen. Therefore, there is a possibility that accurate correction cannot be performed when the ratio determined for writing in black colored ink is used to correct the position coordinate table 58a when writing is being performed by using a blue colored pen. Therefore, by correcting the position coordinate table 58a to be used for a presently-used pen based on the detected attributes of that pen, the corrections can always be made accurate for any pens with any attributes.

A first modification of the present embodiment will be described while referring to FIG. 16.

The electronic white board of the present modification is designed to retroactively correct positional coordinates taken in the past. FIG. 16 is a flowchart representing the coordinate reading processes of S300 executed according to the present modification.

Figure 16:
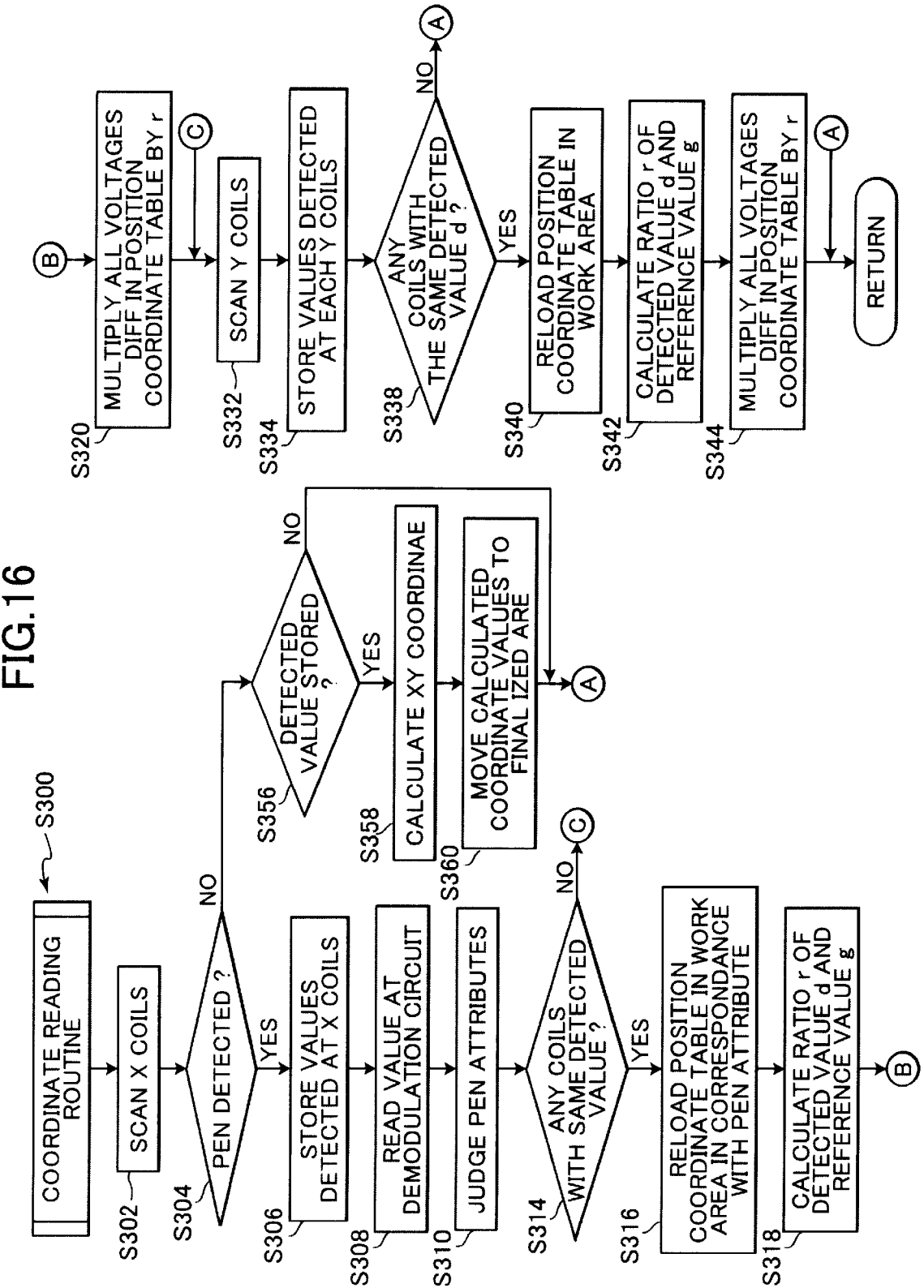
FIG. 16 is a flowchart of the coordinate reading processes of S300 according to a first modification.

As shown in FIG. 16, first, in S302, the CPU 56 scans the X coils X1–Xm. When the pen 60 is detected (S304:YES), then in S306, the CPU 56 stores the detected values e(1)–e(m) for all the X coils in the temporary memory area 59a of the RAM 59. In S309, the CPU 56 reads the values from the FSK demodulation circuit 55 and judges the pen attributes in S310. Next, the CPU 56 investigates the detected values stored in the temporary memory area 59a and determines whether two adjacent X coils indicate the same detected value d. If so (S314:YES), then in S316, the position coordinate table 58a is reloaded into the work area of the RAM 59 in association with the pen attributes determined in S310. Next, in S318, the CPU 56 calculates the ratio r between the reference value g and the detected value d. In S320, the CPU 56 multiplies the ratio r with all the voltage differences DIFF in the position coordinate table 58a that is now stored in the work area. Then, the program proceeds to S332. On the other hand, if there exist no two adjacent X coils that indicate the same detected value (S314:NO), the program directly proceeds to S332.

In S332, the CPU 56 scans the Y coils Y1–Yn. In S334, the CPU 56 stores the detected values e(1)–e(n) for the Y coils in the temporary memory area 59a. Then, the same processes executed in S314 to S320 described above for the X coils are executed in S338 to S344 for the Y coils to correct the position coordinate table 58a.

When the CPU 56 detects that the pen 60 is separated from the writing surface 21a (S304:NO), then the CPU 56 judges whether or not there are any detected values for X or Y coordinates stored in the temporary memory area 59a. If so (S356:YES), then in S358, the CPU 56 refers to the position coordinate table 58a that is now stored in the work area in association with the pen attributes detected in S310. The position coordinate table 58a has been corrected if the correction has been performed in S320 or S344.

In S358, in the same manner as described already in the present embodiment, the CPU 56 extracts, from the position coordinate table 58a, the coordinate offset values $\Delta X$ and $\Delta Y$ that correspond to the stored detected values, and calculates the X and Y coordinates using the values $\Delta X$ and $\Delta Y$. Next in S360, the CPU 56 moves the calculated X and Y coordinates into the finalized area 59d of the RAM 59 (FIG. 12(a)).

Thus, as long as the pen 60 contacts the writing surface 21a, the CPU 56 executes steps S302 to S344 to store detected values and to correct the position coordinate table 58a. Once the pen 60 is separated from the writing surface 21a, the CPU 56 executes S356 to S360 to calculate X and Y coordinates. This cycle is repeatedly executed.

In this way, the electronic white board 1 according to the present modification can correct the position coordinate table 58a in order to correct even those coordinates that have been inputted before two adjacent coils are detected to have the same voltage value. Therefore, more of the coordinates read by the electronic white board will be accurate.

Next, a second modification of the present embodiment will be described while referring to FIG. 17. The electronic white board according to the present modification is designed not to update the position coordinate table 58a until a predetermined duration has elapsed from a preceding correction timing, even if a correction timing is reached.

It is noted that there is a possibility that the pen will frequently pass through the center points between two adjacent coils while the pen is used to draw images on the writing surface 21a. Under such circumstances, two adjacent coils will frequently produce signals with the same values d, whereupon the correction timing is reached. However, for a short period of time, the strength of the alternating magnetic field from the pen 60 will not change sufficiently to generate an error in detection of coordinates. In view of this, according to the present modification, even when the correction timing is reached, if the predetermined period of time has not elapsed from the latest correction timing, the content of the position coordinate table 58a is not updated.

Figure 17:
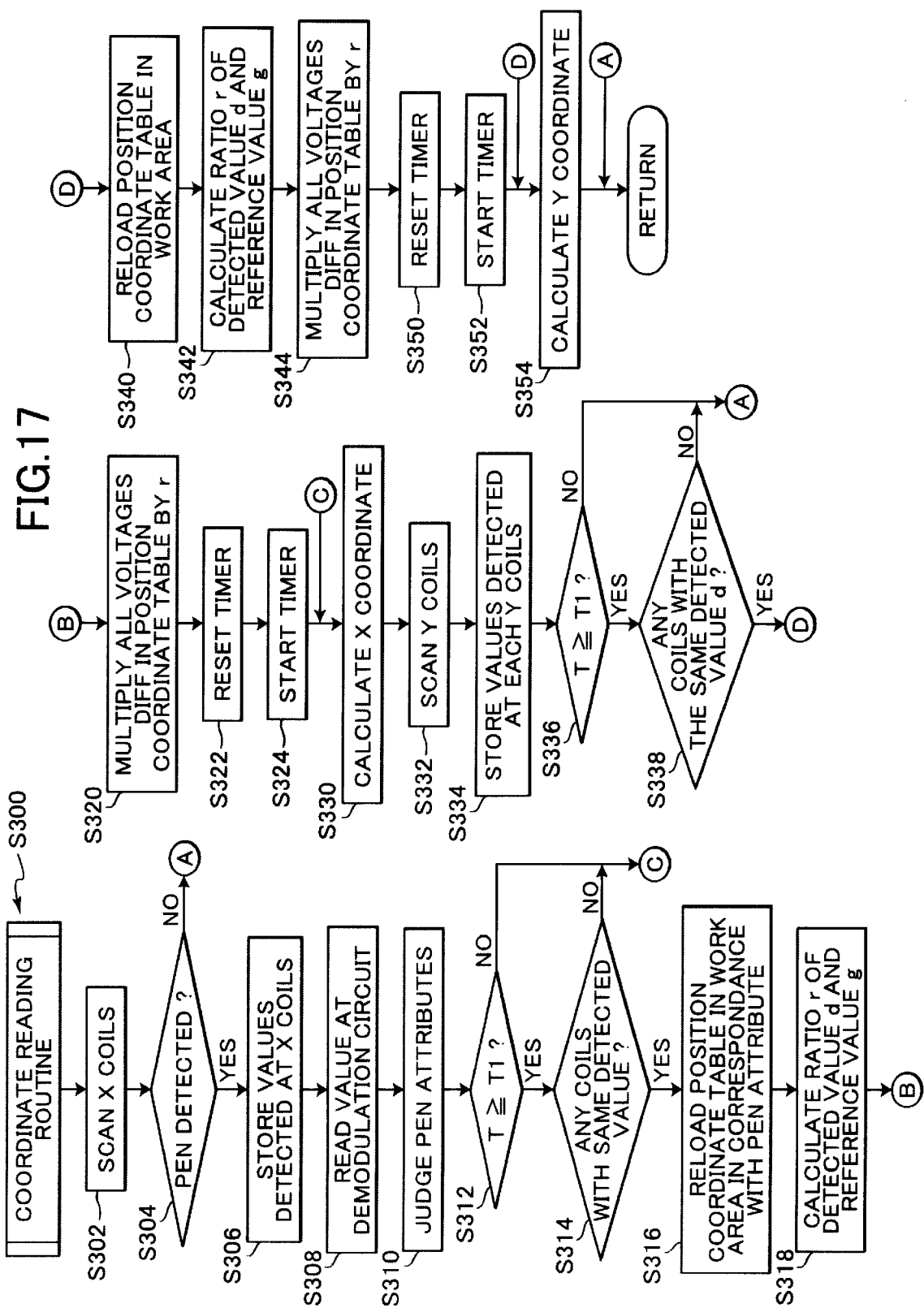
FIG. 17 is a flowchart of the coordinate reading processes of S300 according to a second modification.

According to the present modification, as shown in FIG. 17, the CPU 56 first scans the X coils in S302. When the pen 60 is detected (S304:YES), then the CPU 56 stores the detected values for all the X coils in the temporary memory area 59a of the RAM 59 in S306, reads values from the FSK demodulation circuit 55 in S308, and judges the pen attributes in S310.

Next, the CPU 56 judges whether or not the time T measured by a timer, provided in the CPU 56, has reached or exceeded a preset time T1 that is preset in the ROM 59. If so (S312:YES), then in S314, the CPU 56 checks the detected values stored in the temporary memory area 59a and judges whether or not two adjacent X coils indicate the same detected value d. If the CPU 56 finds two adjacent X coils that indicate the same detected value d (S314:YES), then in S316, the CPU 56 reloads the position coordinate table 58a in the work area of the RAM 59 in association with pen attributes detected in S310. Then in S318, the CPU 56 calculates the ratio r of the reference value g and the detected value d. In S320, the CPU 56 multiplies the ratio r with all the voltage differences DIFF in the position coordinate table 58a now stored in the work area. That is, the content of the position coordinate table 58a is updated depending on the output from the pen 60 detected in S314. Next, the CPU 56 resets the timer in S322, and starts the timer in S324. Then, the CPU 58 calculates the X coordinates in S330 based on the position coordinate table that is now stored in association with the detected pen attributes. On the other hand, if the measured time T has not reached the preset time T1 (S312:NO) or if there exist no coils that produce the same voltages d (S314:NO), the program directly proceeds to S330.

In S332, the CPU 56 scans the Y coils, and in S334 to S354 calculates the Y coordinates using the same processes as described in S306 to S330 for calculating the X coordinates.

In this way, even if detected values stored in the temporary memory area 59a during one series of scanning processes show two adjacent coils with the same detected values d, the CPU 56 will not reload the position coordinate table 58a, and will not update the position coordinate table 58a using the ratio r, as long as the timer value is less than the predetermined value T1. On the other hand, once the timer value has reached or exceeded the predetermined value T1, the CPU 56 will perform the above-described processes for updating the position coordinate table 58a and then will reset and restart the timer.

As described above, the electronic white board according to the present modification does not update the position coordinate table 58a even when two coils have the same detected value, unless the time T1 has elapsed. With this configuration, the capacity of the CPU 56 will not be wastefully consumed for updating the position coordinate table 58a.

Next, a third modification of the present embodiment will be described while referring to FIG. 18. The electronic white board 1 of the present modification is designed to notify the user when voltage from the battery 70 of the pen 60 drops to some degree.

Figure 18:
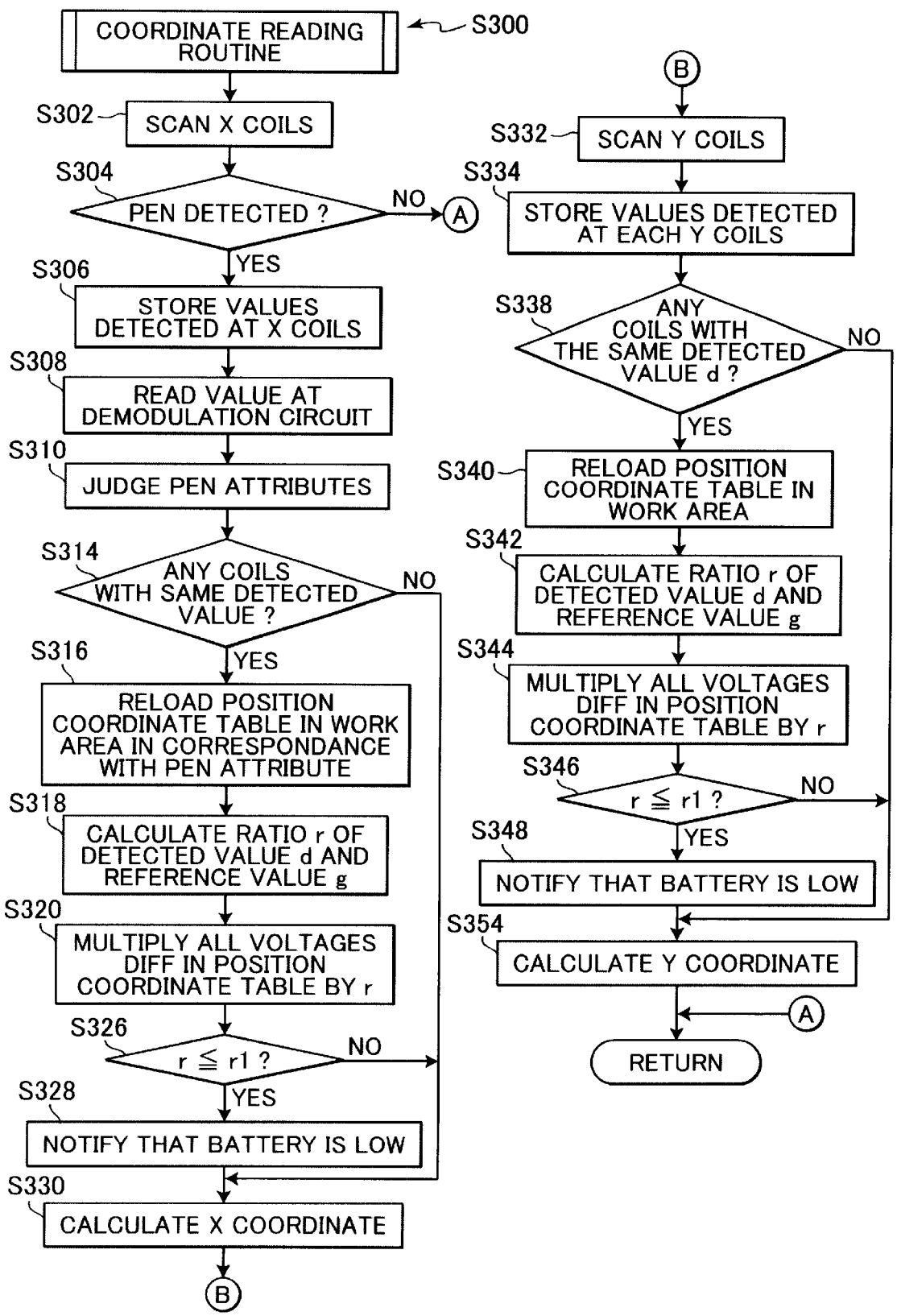
FIG. 18 is a flowchart of the coordinate reading processes of S300 according to a third modification.

According to the present modification, as shown in FIG. 18, processes of S302–S320 are executed in the same manner as already described in the present embodiment. After the CPU 56 updates the position coordinate table 58a in S320, then in S326, the CPU 56 judges whether or not the ratio r calculated in S318 is equal to or less than a preset value r1 that is prestored in the ROM 58. If the ratio r is equal to or less than the preset ratio r1 (S326:YES), then in S328, a notification is made that the battery 70 of the pen 60 is running low. According to the present modification, this notification is made by illuminating or flashing the "dead battery" warning LED 39. It should be noted that the notification can alternatively be made by sounding an electronic noise, such as a beep, using the speaker 31.

Then, the process proceeds to S330. Processes of S330–S344 are executed in the same manner as already described in the present embodiment. Then, the program proceeds to S346. If the ratio r is equal to or less than the set value r1 (S346:YES), the CPU 56 makes notification in S348 about the battery being used up. It should be noted that the preset value r1 is selected from a range $0.25 \leq r1 \leq 0.5$, for example. Then, the process proceeds to S354, in which Y coordinates are calculated in the same manner as already described in the present embodiment.

As described above, the electronic white board of the present modification notifies the user that the battery 70 of the pen 60 is used up. Therefore, the user will not use the pen 60 when the voltage in the pen 60 is low, so precision of position coordinate reading will not be degraded. It should be noted that the device can be modified to calculate the ratio of r/r1 and make a display showing the calculated ratio indicative of the present voltage of the battery 70. For example, a plurality of "dead battery" warning LEDs 39 can be provided and be illuminated in a number that corresponds to the voltage of the battery 70. Alternatively, the color of the "dead battery" warning LED 39 can be changed according to the voltage of the battery 70.

In the above-described present embodiment and the modifications, the CPU 56 detects whether two coils have exactly the same detected values d. However, the device can be modified so that two detected values that are only slightly different, such as within the detection precision range of the device, are considered to have the same detected value.

Second Embodiment

A second embodiment will be described below with reference to FIGS. 19–25.

The electronic white board 1 of the present embodiment is the same as that of the first embodiment except for the points described below.

Figure 19:
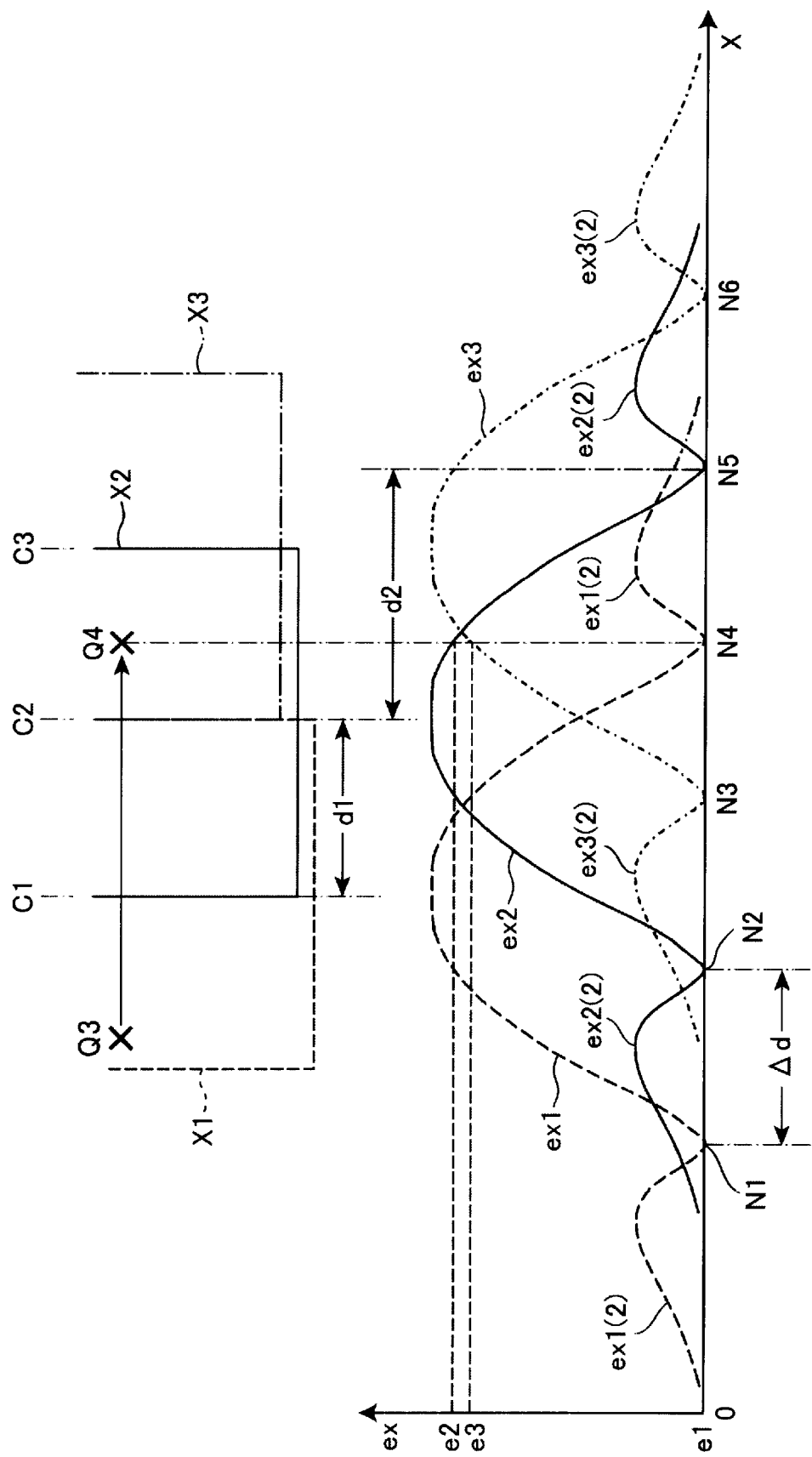
FIG. 19 illustrates how the X coils X1–X3 are arranged according to a second embodiment and how voltages induced at the X coils X1–X3 change when the position of the pen 60 moves along the X direction.

Though the X and Y coils 23 are arranged in the same manner as shown in FIGS. 7(*a*) and 7(*b*), the dimensional relationship of the coils is employed as shown in FIG. 19 in the present embodiment.

As apparent from FIG. 19, secondary peaks ex1(2) to ex3(2) appear on either side of the primary peak of each of the voltage plots ex1 to ex3. Each sense coil generates small or zero voltages at the borders between its primary peak and its secondary peaks. This small or zero voltage will be referred to as a null point hereinafter.

As shown in FIG. 19, the center lines (C1 and C2) of adjacent sense coils (X1 and X2) are separated by a distance d1. Two null points exist within the width (2×d1) of each sense coil 23. Also, a distance d2 separates the center line (C2) of each sense coil (X2) and the location where a null point (N5) is generated in the voltage from the sense coil (X2). The distances d1 and d2 have the following relationship:

$$d2 = (4 \times d1)/3.$$

With this arrangement, the null points N1, N2, . . . are arranged at a uniform interval or spacing Δd. In other words, adjacent null points of all the sense coils appear as being separated by the uniform distance of Δd. According to the present embodiment, as will be described later, the coordinate correction is performed when the pen passes through the null points. Accordingly, the timing when the coordinate correction is performed can be made uniform.

As also apparent from FIG. 19, when the pen is located between the central lines of two adjacent sense coils, the adjacent sense coils generate signals with larger levels than the levels of signals generated by any of the other sense coils. In the example of FIG. 19, when the pen is located between the center lines C1 and C2 of the X coils X1 and X2, the signal levels generated by the adjacent X coils X1, X2 are greater than the signal levels generated by the X coil X3 and other X coils. Accordingly, the X coordinate of the pen can be accurately obtained by the signal levels from the X coils X1 and X2.

Further, the null points, for example, null points N2, N5 for the case of the X coil X2, are separated by 92 mm, and the distance d1 is 45 mm at maximum.

It is noted that in this example, the total number m of X coils X1–Xm is 13, and the total number n of Y coils Y1–Yn is 20. The width P1 of each of the X and Y coils 23 is 80 mm. Accordingly, the P1/4 is equal to 20 mm, and therefore the position coordinate table 58*a* is prepared to indicate the relationship between the position coordinate offset values ΔX, ΔY and the voltage difference values DIFF as shown in FIG. 20(*a*). Thus, the position coordinate table 58*a* is prepared as shown in FIG. 20(*b*).

In order to correct error in the position coordinates due to the drop of the strength of the alternating magnetic field from the pen 60, according to the present embodiment, a reference value g is prestored in the ROM 58. The reference value g is detected when the battery 70 of the pen 60 is fully charged. More specifically, in order to detect the reference value g, all the X coils X1–Xm are detected. For example, assuming that a first sense coil is sandwiched between a second and third sense coils, if the first sense coil generates a maximum signal level "g" that is larger than all of the other remaining sense coils, and the third sense coil generates a signal level that is smaller than that of the second sense coil and that is substantially zero value, then the voltage value "g" of the signal level from the first sense coil is stored in the ROM 58 as the reference value g.

When the pen 60 is used later on, it will be determined when the signal level of one of two adjacent sense coils, that are adjacent to a maximum voltage sense coil, is smaller than the signal level of the other adjacent sense coil and is at a value of zero. The signal level generated at this time by the maximum voltage sense coil is set as a signal level "f". The ratio r between the reference value g and the signal level f is determined, and this ratio r is used to correct voltage differences DIFF in the position coordinate table 58*a*. Error in the position coordinates caused when the strength of the alternating magnetic field drops can be corrected.

For example, voltages are detected as shown in FIG. 21(*a*) when the X coils are scanned before the battery 70 of the pen 60 has been used at all, that is, when the battery 70 is fully charged. In this example, when the pen is located on the location Q4, the X coil X2 generates the largest signal value ex2 among all the X coils X1–Xm. The X coils X1 and X3 are adjacent to the X coil X2. The X coil X1 generates the smaller voltage than the other adjacent X coil X3. When the voltage generated by the X coil X1 is substantially zero, that is, at null point N4, the maximum voltage ex2 generated at this time by the X coil X2 is set as the reference value g. The reference value g is then prestored in the ROM 58.

Afterward, when the X coil X2 is scanned while the pen 60 is at the point Q4, that is, at the position corresponding to the null point N4 shown in FIG. 21(*a*), the ratio r between the reference value g and the voltage f generated by the X coil X2 at this time is calculated. Then, the ratio r (r=f/g) is used to correct the voltage difference DIFF in the position coordinate table 58a (FIG. 20(b)).

Figure 22:
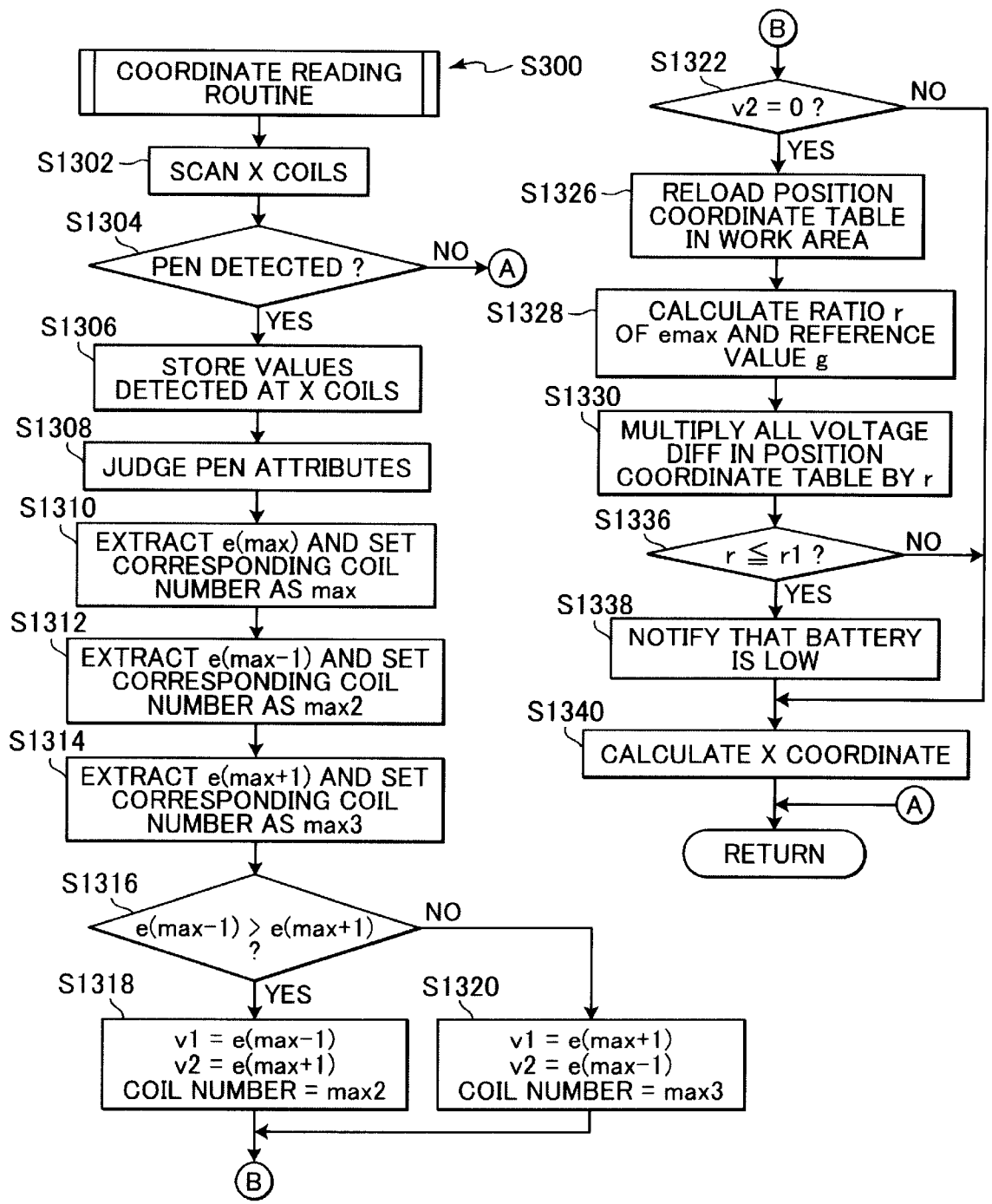
FIG. 22 is a flowchart of the coordinate reading process of S300 in FIG. 14 according to the second embodiment.

According to the present embodiment, therefore, the coordinate reading process of S300 in the first embodiment (FIG. 15) is modified as shown in FIG. 22.

Figures 21A, 21B:
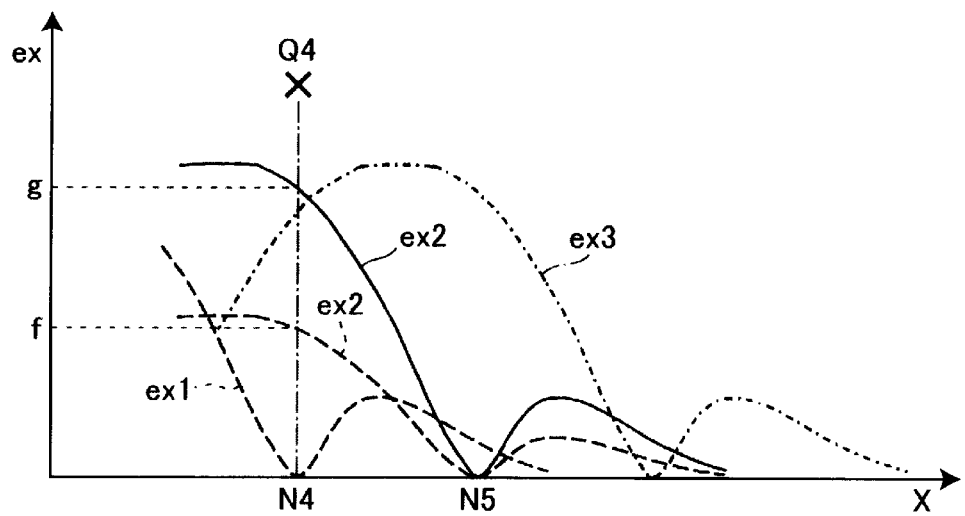

During the coordinate reading process of S300 in the present embodiment, processes of S1302–S1306 are executed in the same manner as S302–S306 described in FIG. 15 in the first embodiment. As a result, voltage values e1–em are stored in association with the coil numbers x1–xm in the temporary storage area as shown in FIG. 21(b). Process of S1308 is executed in the same manner as S308–S310 in FIG. 15 of the first embodiment.

Then, in S1310, the CPU 56 extracts, from the temporary storage area 59a, the largest voltage value e(max) among all the voltage values e1 to em. The CPU 56 stores, in the RAM.59, the coil number "max" of the maximum voltage X coil X(max).

For example, if the pen 60 is located at a position Q2 shown in FIG. 23(a), the X coils X1, X2, X3 generate voltage values e1, e2, e3, respectively, as shown in FIG. 23(b). In this case, the CPU 56 selects the voltage value e2 as the largest voltage value e(max). The CPU 56 selects the coil number (2) of the X coil X2 as the coil number "max", and stores the coil number (2) in the RAM 59.

Next, in S1312, the CPU 56 extracts, from the temporary storage area 59a, the voltage value e(max−1) induced at another X coil X(max−1) that is located adjacent to and in the negative direction from the X coil X(max) along the X axis. The CPU 56 stores, as the coil number "max2", the coil number (max−1) of the X coil X(max−1). In the example of FIG. 23, the CPU 56 stores the coil number (1) in the RAM 59.

Next, in S1314, the CPU 56 extracts, from the temporary storage area 59a, the voltage value e(max+1) induced at another X coil X(max+1) that is located adjacent to and in the positive direction from the X coil X(max) along the X axis. The CPU 56 stores, as the coil number "max3", the coil number (max−1) of the X coil X(max+1). In the example of FIG. 23, the CPU 56 stores the coil number (3) in the RAM 59.

Then, in S1316, the CPU 56 compares the voltage values e(max−1) and e(max+1) with each other. When e(max−1) is greater than e(max+1) (yes in S1316), in S1318, the CPU 56 sets the voltage value e(max−1) as first voltage V1, and sets the voltage value e(max+1) as second voltage V2. In this case, the X coil X(max−1) is the second maximum coil that has induced the second largest voltage among all the coils X1–Xm. Accordingly, the CPU 56 sets, as coil number "max2", the coil number of the second maximum voltage X coil X(max−1). The CPU 56 stores data of the thus set values V1, V2, and "max2" in the RAM 59.

In the example of FIG. 23, because e1>e3, e1 is set to first voltage V1, e3 is set to second voltage V2, and the coil number (X1) is set to max2.

On the other hand, when e(max−1) is smaller than or equal to e(max+1) (no in S1316), in S1320, the CPU 56 sets the voltage value e(max+1) as first voltage V1, and sets the voltage value e(max−1) as second voltage V2. In this case, the X coil X(max+1) is the second maximum coil that has induced the second largest voltage among all the coils X1–Xm. Accordingly, the CPU 56 sets, as coil number "max3", the coil number of the second maximum voltage X coil X(max+1). The CPU 56 stores data of the thus set values V1, V2, and "max3" in the RAM 59.

In S1322, the CPU 56 judges whether or not the pen 60 is located at a position corresponding to some null point when scanning the X coils in S1302. In this example, the CPU 56 judges whether the second voltage value v2 is substantially zero or not. Alternatively, the CPU 56 may judge in S1322 whether the voltage value v2 is smaller than a predetermined threshold voltage. It is noted that the predetermined threshold voltage is desirably set to a value that is larger than the level of noise which is generated by the electronic white board 1 when no pen 60 or no eraser 40 generates any alternating magnetic field. The predetermined threshold voltage is, for example, set to a value of 10 mV to 20 mV.

When the pen 60 is located at a position corresponding to a null point (S1322:YES), the null point serves as a trigger for starting processes for correcting the position coordinate table 58a in subsequent steps S1326 to S1330. Especially when the judgment in S1322 is designed to compare the voltage value v2 with the predetermined threshold value that is greater than the noise level, the timing of correction will not be lost by adverse effects of noise.

During the steps of S1326–S1330, first, in S1326, the CPU 56 erases the position coordinate table 58a, which has been loaded into the work area of the RAM 59 during the initialization processes of S200, and retrieves a new position coordinate table 58a (shown in FIG. 20(b)) from the ROM 58 and reloads the position coordinate table 58a into the work area of the RAM 59. This position coordinate table 58a is stored in the work area in association with the pen attributes judged in S1308 as shown in FIG. 12(a).

Next, in S1328, the CPU 56 calculates the ratio r between the reference value g and the voltage value e(max) that is extracted in S1310. Then in S1330, each voltage difference DIFF in the position coordinate table 58a, now stored in the work area of the RAM 59, is multiplied by the ratio r. For example, assuming that the reference value g is 256, and if the voltage value e(max) is f=128 as in the example shown in FIG. 21(b), then the ratio r is calculated to equal 0.5 (r=f/g=128/256=0.5). Therefore, each voltage difference DIFF in the position coordinate table 58a is multiplied by 0.5. As a result, a new position coordinate table 58a shown in FIG. 20(c) is obtained with voltage differences DIFF having values corrected to approximately one half the original values. It should be noted that the voltage differences DIFF shown in FIG. 20(c) results from half-adjusting the values obtained by multiplying with the ratio r.

Then, in S1336, the CPU 56 judges whether the calculated ratio r is smaller than or equal to a preset value r1. The preset value r1 is prestored in the ROM 58, and has a value selected from a range of, for example, $0.25 \leq r1 \leq 0.5$. When the calculated ratio r is smaller than or equal to the preset value r1 (yes in S1336), the CPU 56 notifies in S1338 that the pen 60 has been run out. For example, the buttery run-out LED 39 is illuminated or blinked to notify the user of the low battery condition of the pen 60. Alternatively, the speaker 31 can be driven by the sound circuit 31a to beep to notify the user of the low battery condition.

Next, in S1340, the CPU 56 calculates the X coordinates using the following procedures.

If the coil number max2 has been stored in S1318, it can be determined that the coil number max2 is located in a negative direction from the coil number max along the X axis because the coil number max2 corresponds to the coil number (max−1). In this case, the variable SIDE is set to −1. On the other hand, if the coil number max3 has been stored in S1320, it can be judged that the coil number max3 is located in the positive direction from the coil number max along the X axis because the coil number max3 corresponds to the coil number (max+1). In this case, the variable SIDE is set to 1.

If the pen is located in the position Q2 in the example in FIG. 23(a), the coil number 2 is the X coil (max) with the largest voltage, and the coil number 1 is the X coil (max2) with the second largest voltage, so the variable SIDE is set to −1.

Next, the CPU 56 calculates a difference voltage "DIFF" between the maximum and second maximum voltages by calculating the following formula (3):

$$DIFF = e(\max) - v1 \quad (3)$$

Next, the CPU 56 retrieves, from the position coordinate table 58a now stored in the RAM 59 in correspondence with the detected pen attributes, a coordinate offset amount ΔX that corresponds to a difference value DIFF that is closest to the calculated value DIFF. The CPU 56 sets the retrieved coordinate offset amount ΔX as a value "OFFSET".

The CPU 56 then determines the X coordinate X1 of the pen 60 by calculating the formula (2) described in the first embodiment.

In the example of FIGS. 23(a)–23(c), the coordinate X1 of the pen 60 at the location Q2 is calculated as being equal to (P1/2)×2+(e2−e1)×(−1). Thus, it is known that the position Q2 is separated, in the negative direction along the X axis, from the center line C2 of the X coil X2 by the distance ΔQ2X that corresponds to the voltage value difference (e2−e1).

Although not shown in the drawings, the CPU 56 executes the same operations as S1302–S1340 for the Y coils Y1–Yn. During this process, if v2=0, in the same manner as in S1326–S1330, the position coordinate table 58a is corrected. When the ratio r is lower than or equal to the preset value r1, the warning of the battery run out is notified in the same manner as in S1338.

As described above, the electronic white board 1 according to the present embodiment calculates the ratio r between the reference value g and the detected voltage f. It is assumed that a first sense coil generates a maximum voltage, that a second and third sense coils are located adjacent to and on either side of the first sense coil, and that the first sense coil generates the smallest voltage of the second and third sense coils. The voltage f is the voltage generated by the first sense coil when the third sense coil generates a voltage of substantially zero volts. The ratio r is multiplied with all the voltage differences DIFF in the position coordinate table 58a, thereby correcting the position coordinate table 58a.

Accordingly, after the battery 70 of the pen 60 has been used for a while so that strength of the alternating magnetic field generated by the pen 60 drops, the position coordinate table 58a is corrected by an amount that corresponds to this drop in strength of the alternating magnetic field. Therefore, position coordinates of the pen 60 can be accurately detected.

For example, if the X coil X2 is scanned when the pen 60 passes the point Q4 in FIG. 21(a), the X coil X2 generates the maximum electric voltage among all the X coils X1–Xm. Among the coils X1 and X3 that are adjacent to the coil X2, coil X1 generates a voltage smaller than coil X3 and the voltage of the coil X1 is substantially zero (0) to provide the null point N4. In this case, a ratio r between the voltage f (=e2) generated by the coil X2 and the reference voltage g is calculated. The ratio r is multiplied to all the difference values DIFF in the position coordinate table 58a, thereby correcting the position coordinate table 58a. Thus, correction of the table 58a is performed every time when the pen passes points where an adjacent coil has null points.

Thus, according to the present embodiments, null points serve as a trigger for correcting the position coordinate table 58a. Two null points will be generated each time the pen 60 is moved the distance 2×d1, which corresponds to the width of each sense coil. Therefore, the number of points where correction is executed is large. Accordingly, the time interval between corrections can be reduced, so that coordinates can be retrieved with higher precision.

Because null points appear at a fairly uniform interval, coordinates can be corrected at a fairly uniform timing.

A first modification of the present embodiment will be described while referring to FIG. 24.

The electronic white board of the present modification is provided to retroactively correct positional coordinates taken in the past. FIG. 24 is a flowchart representing the coordinate reading processes of S300 executed according to the present modification.

Figure 24:
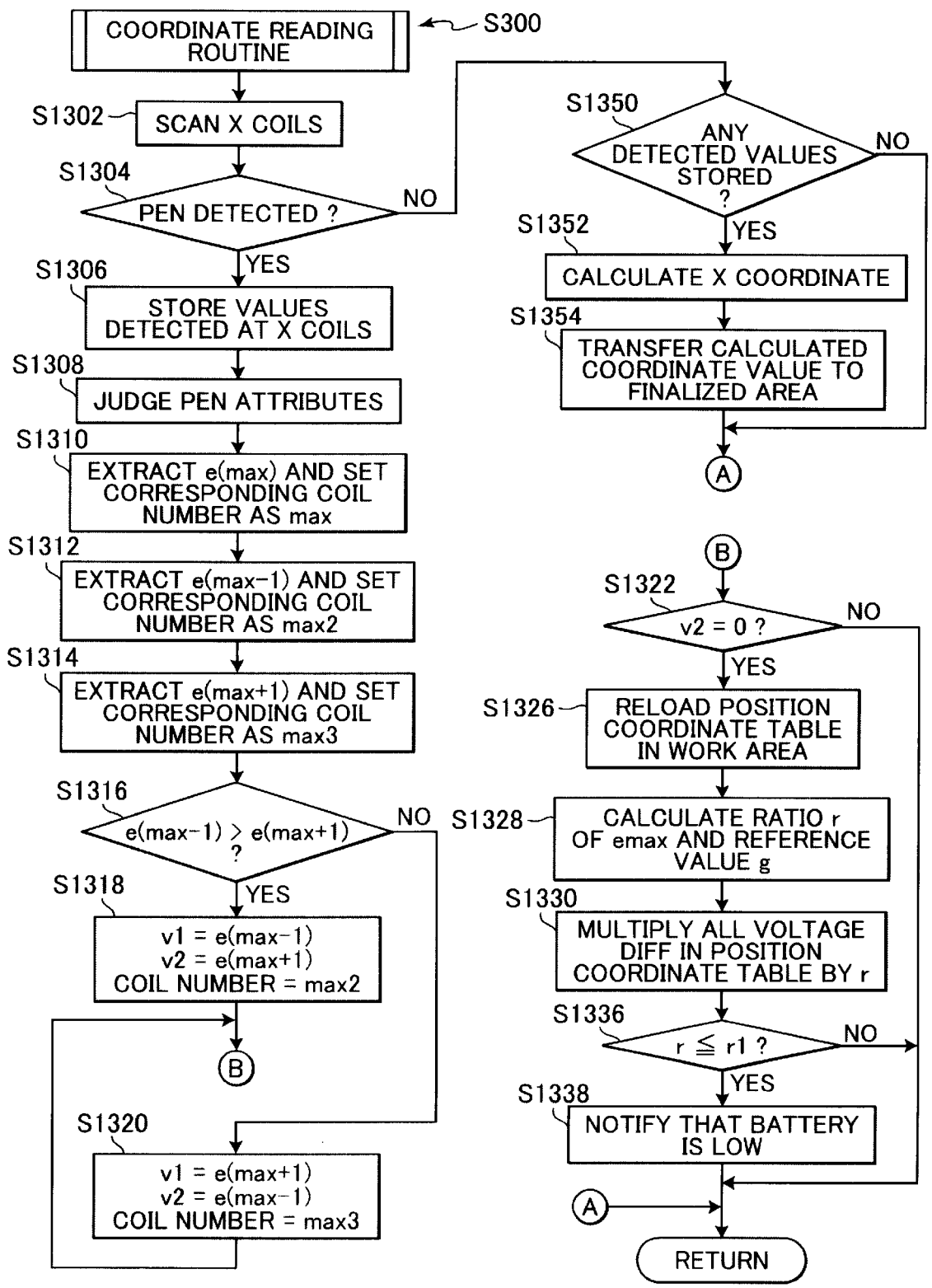
FIG. 24 is a flowchart of the coordinate reading processes of S300 according to a first modification of the second embodiment.

As shown in FIG. 24, first in S1302, the CPU 56 scans the X coils. When the pen 60 is detected (S1304:YES), then in S1306 to S1338, processes are performed in the same manner as described already in the present embodiment, from when the values detected by the X coils are temporarily stored in the temporary memory area 59a to when the position coordinate table 58a is corrected.

When the CPU 56 detects that the pen 60 has been separated away from the writing surface 21a (S1304:NO), then the CPU 56 determines whether or not any X coil-detected voltage values are stored in the temporary memory area 59a. If so (S1350:YES), then in S1352, the CPU 56 refers to the position coordinate table 58a, now stored in the work area in association with the detected pen attribute, to extract coordinate offset values ΔX that correspond to the stored detected voltage values. The CPU 56 uses the coordinate offset values ΔX to calculate the X coordinate using the same procedures as described already in the present embodiment.

Next, in S1354, the CPU 56 stores data of the calculated X coordinates to the finalized area 59b in the RAM 59 (FIG. 12(a)).

Thus, according to the present modification, while the pen 60 contacts the note surface 21a, the CPU 56 executes the processes in S1302 to S1338 to store the detected voltage values and to correct the position coordinate table 58a. Once the pen 60 has been separated from the note surface 21a, the CPU 56 executes the steps S1350 to S1354 to calculate the X coordinates. The cycles are then repeatedly performed as the pen 60 comes into contact with and is pulled away from the note surface 21a. It should be noted that the same processes performed for the X coordinates are also performed for the Y coordinates. Because the electronic white board according to the present modification corrects coordinates inputted until the pen 60 is removed from the note surface 21a, voltage values detected before the voltage value v2 is judged to equal zero in S1322 can also be corrected. This increases overall precision of coordinate reading.

Next, a second modification of the present embodiment will be described while referring to FIG. 25.

The electronic white board according to the present modification does not update the position coordinate table 58a until a predetermined duration has elapsed from a preceding correction timing, even if a correction timing is reached.

Figure 25:
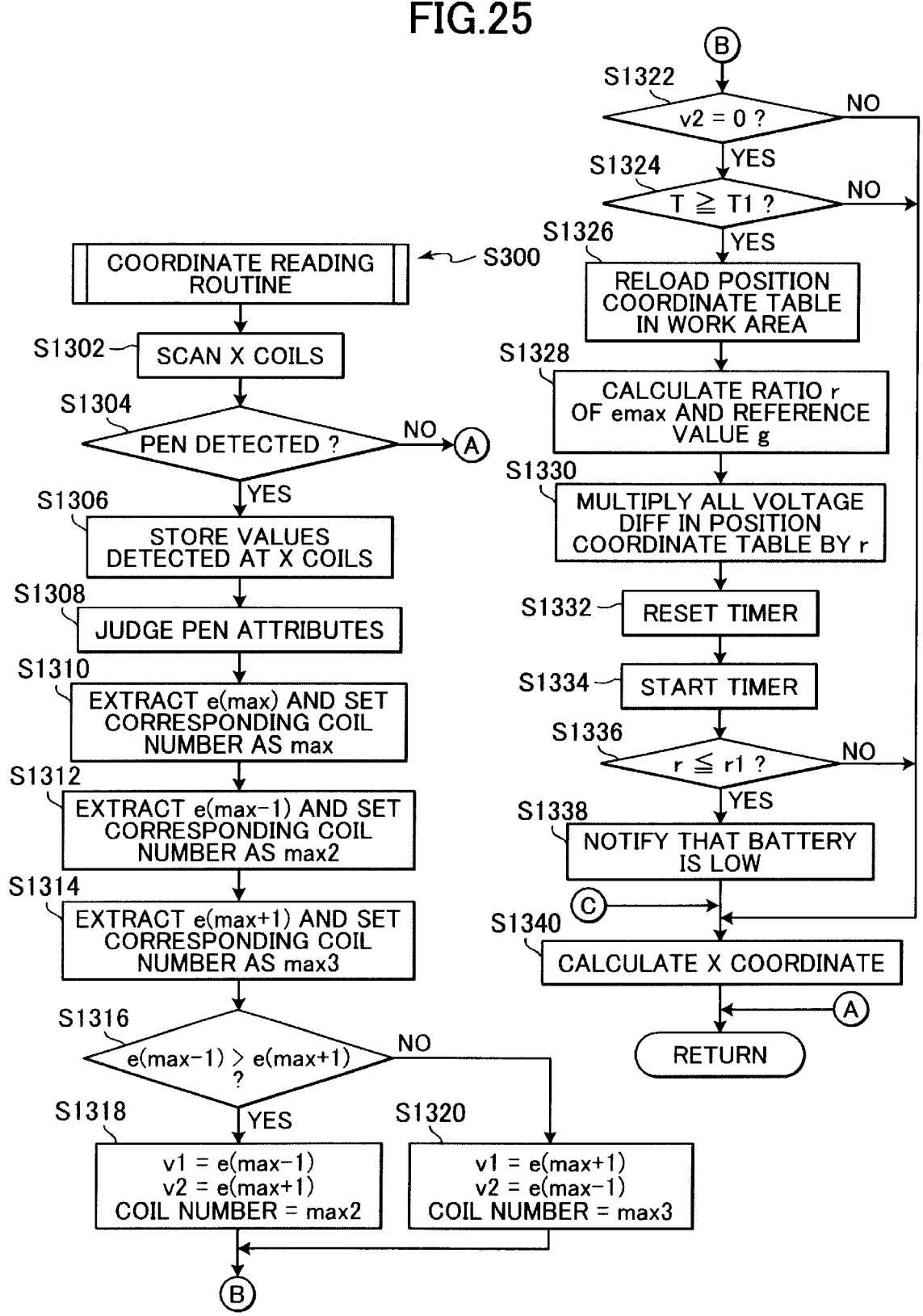
FIG. 25 is a flowchart of the coordinate reading processes of S300 according to a second modification of the second embodiment.

FIG. 25 is a flowchart representing a coordinate reading routine of S300 executed in the present modification.

The processes of S1302–S1322 are executed in the same manner as described already in the present embodiment. When the CPU 56 judges that the second voltage v2 is substantially zero (S1322:YES), then the program proceeds to S1324 where the CPU 56 judges whether a measured time T is equal to or greater than a preset time T. The measured time T is the time that has elapsed since the position coordinate table 58a was last corrected, and is measured by a timer provided, for example, in the CPU 56. The preset time T1 is preset in the ROM 58, for example. If the measured time T equals or exceeds the set time T1 (S1324:YES), then the position coordinate table 58a is corrected in S1326 to S1330 in the same manner as described already in the present embodiment. Afterward, the CPU 56 resets the timer in S1332 and restarts the timer in S1334.

Next, when the ratio r calculated in S1328 is equal to or less than the preset value r1 (S1336:YES), then the notification is made in S1338 that the battery is used up. Then in S1340, X coordinates are calculated based on the corrected position coordinate table 58a.

On the other hand, if the measured time T has not reached or exceeded the set time T1 (S1324:NO), then the X coordinate is calculated in S1340 without correcting the position coordinate table 58a.

It should be noted that the same procedures for determining the X coordinate are performed for determining the Y coordinate.

It should also be noted that the preset time T1 according to the present modification can be in units of seconds, minutes, or hours. Also, the electronic white board can be designed so that once the position coordinate table 58a is corrected, then that corrected position coordinate table 58a will be used until power of the electronic white board is turned OFF.

As described above, according to the present modification, even if a correction timing arrives, the CPU 56 will not reload or update the position coordinate table 58a until the preset time T1 or greater has elapsed since the previous correction timing. On the other hand, once the value of the timer has reached or exceeded the preset time T1, processes will be performed to update the position coordinate table 58a and then the timer will be reset and restarted. Accordingly, the capacity of the CPU 56 will not be wastefully consumed to unnecessarily update the position coordinate table 58a.

In the above description, each of the reference value g and the signal level f is defined as the voltage level that is generated by the first sense coil, which is the largest signal level, when the signal level from the third sense coil is smaller than that from the second sense coil and is smaller than the predetermined threshold level. Then, the ratio r is calculated as a ratio of the reference value g to the signal level f. However, the present embodiment and its modifications can be modified so that each of the reference value g and the signal level f is defined as the voltage level generated by the second sense coil. The ratio r is calculated as a ratio between the thus defined values g and f. In the example of FIG. 21(a), the value of the coil X3 (second coil) may be used for determining the reference voltage f and the detected voltage g, rather than the value of the coil X2 (first coil).

Alternatively, the ratio r can be calculated as a ratio of the reference value g to a signal level f generated by either the first or the second sense coil when the third sense coil generates the smallest signal level.

Third Embodiment

A third embodiment will be described below with reference to FIGS. 26(a)–39.

The electronic white board 1 of the present embodiment is the same as that of the second embodiment except for the points described below.

Figure 26A:
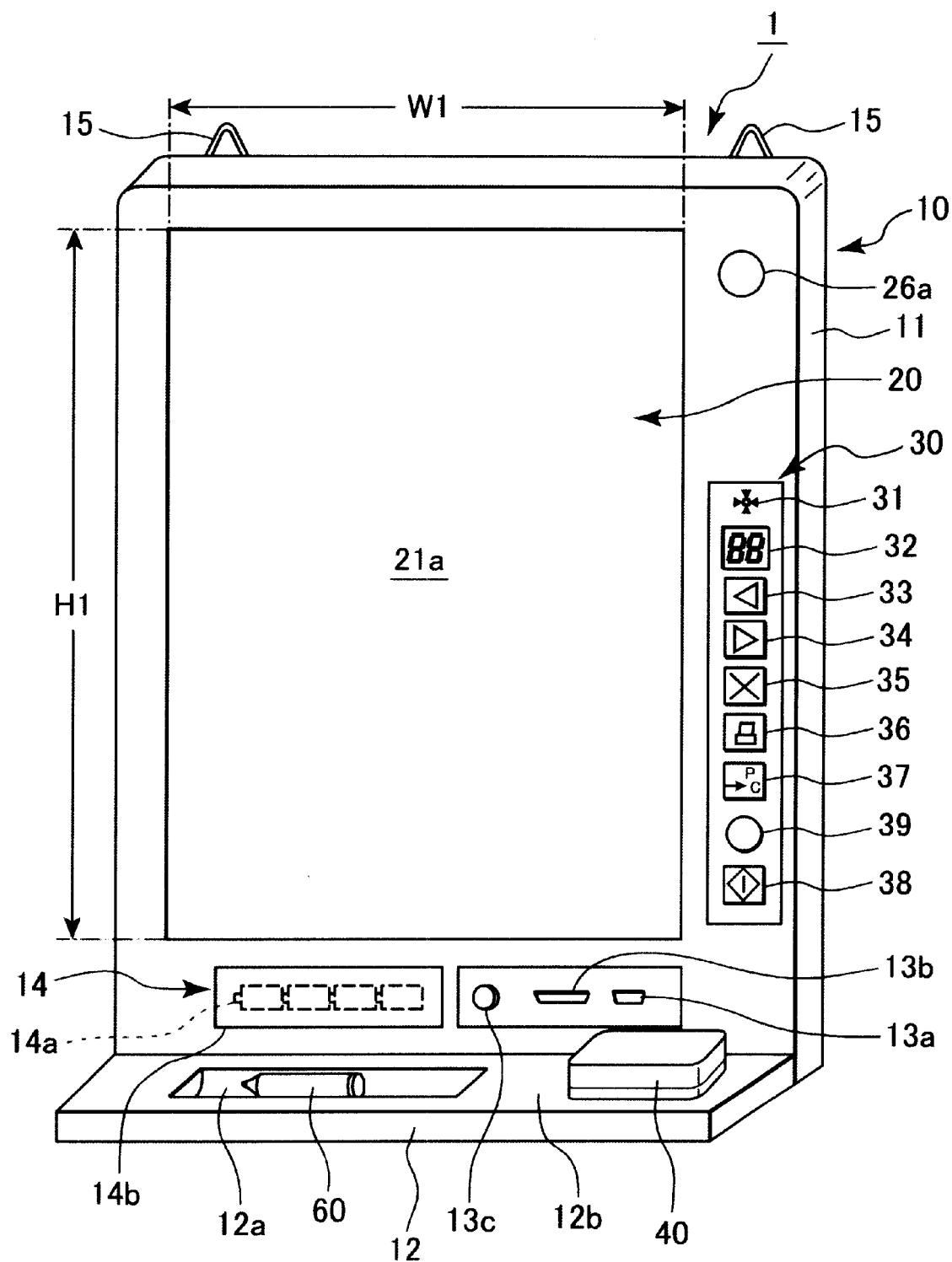
FIG. 26(a) is an external perspective view illustrating an essential configuration of an electronic white board according to a third embodiment.
Figure 26B:
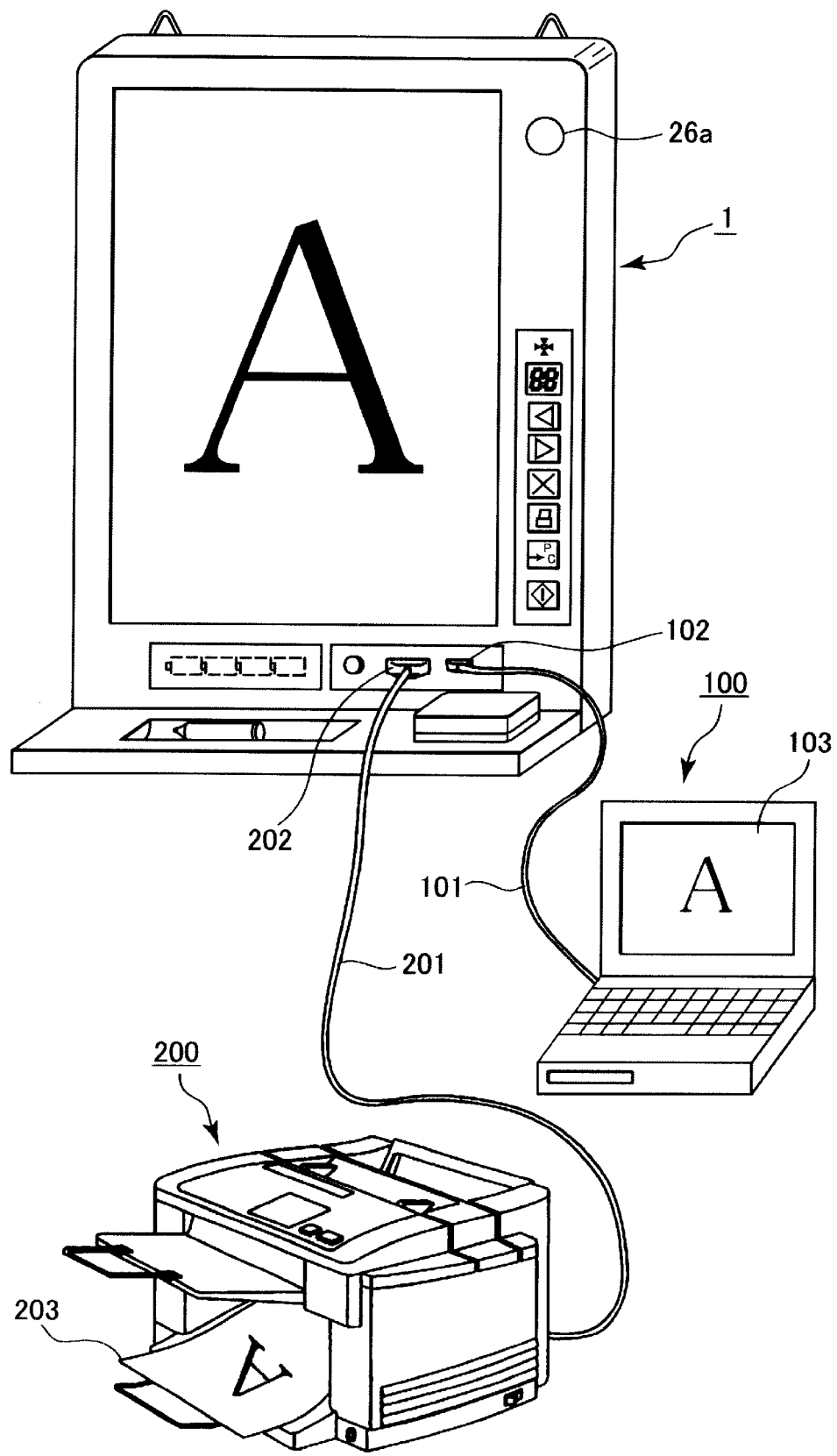
FIG. 26(b) is an illustration showing the electronic white board of FIG. 26(a) being electrically connected to a personal computer (PC) and a printer.

As shown in FIGS. 26(a) and 26(b), a correction region 26a is provided at an upper right end surface of the frame 11. The region 26a is for correcting an error in coordinate reading operation that is caused by consumption of the battery 70 in the pen 60. The region 26a is for detecting the level in the alternating magnetic field generated by the coil L1 in the pen 60. More specifically, as shown in FIGS. 27(a) through 29, a correction coil 26 is provided on the attachment panel 24 at a position below the correction region 26a.

For example, before writing anything on the writing surface 21a, the user presses the pen tip 62 against the region 26a, so that an alternating magnetic field is generated at the coil L1. As a result, the correction coil 26, provided below the region 26a, will generate a voltage that corresponds to the level of the alternating magnetic field from the pen. By comparing the generated voltage with a predetermined reference value, the coordinates can be corrected based on the results of the comparison.

Figure 27A:
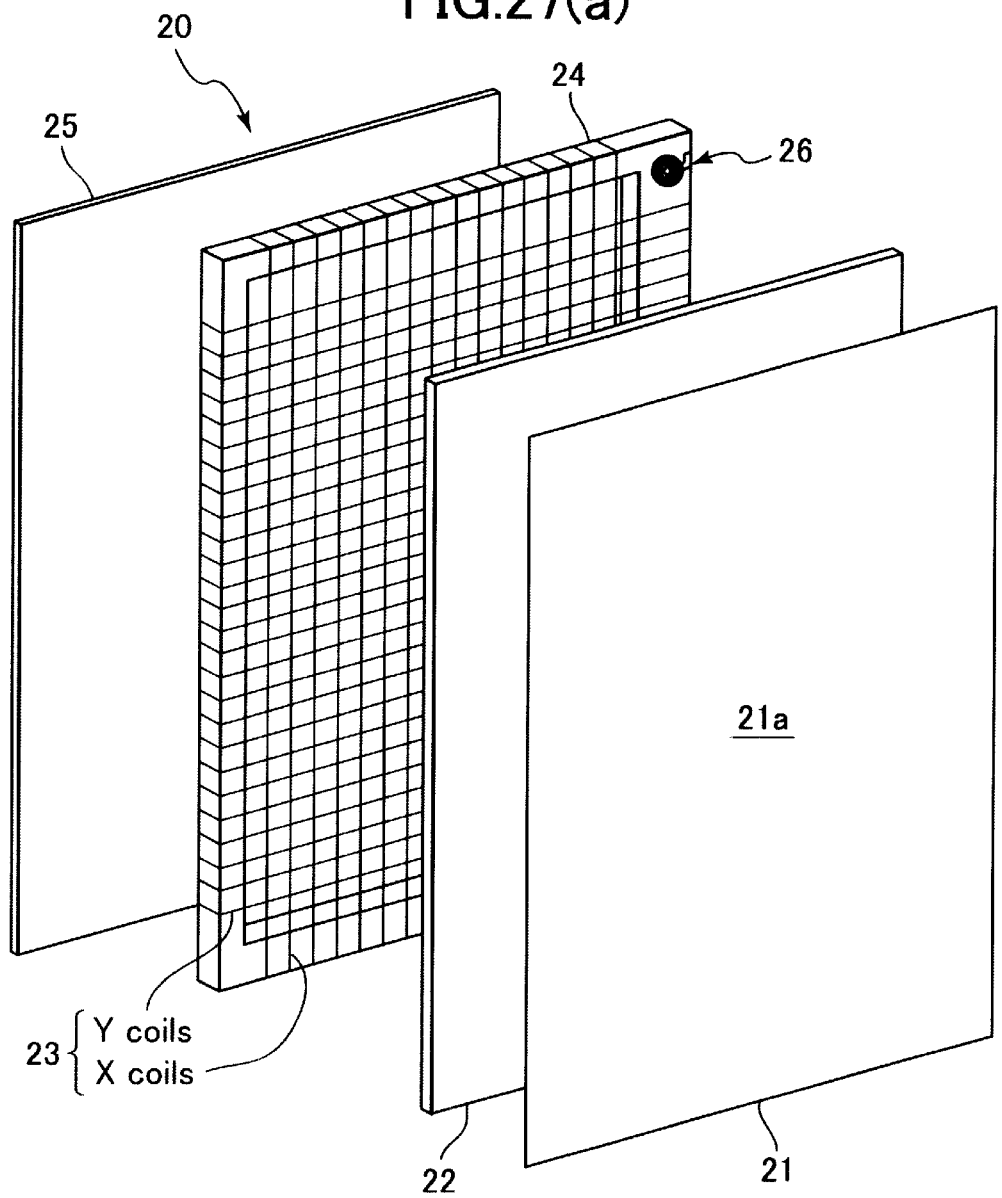
FIG. 27(a) is an exploded perspective view showing the components of the panel main body provided within the electronic white board.
Figure 27B:
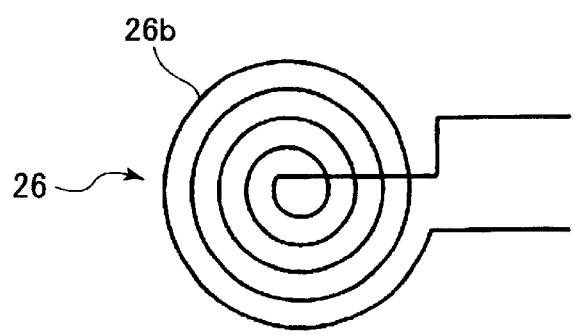
FIG. 27(b) illustrates a structure of a correction coil 26.
Figure 28:
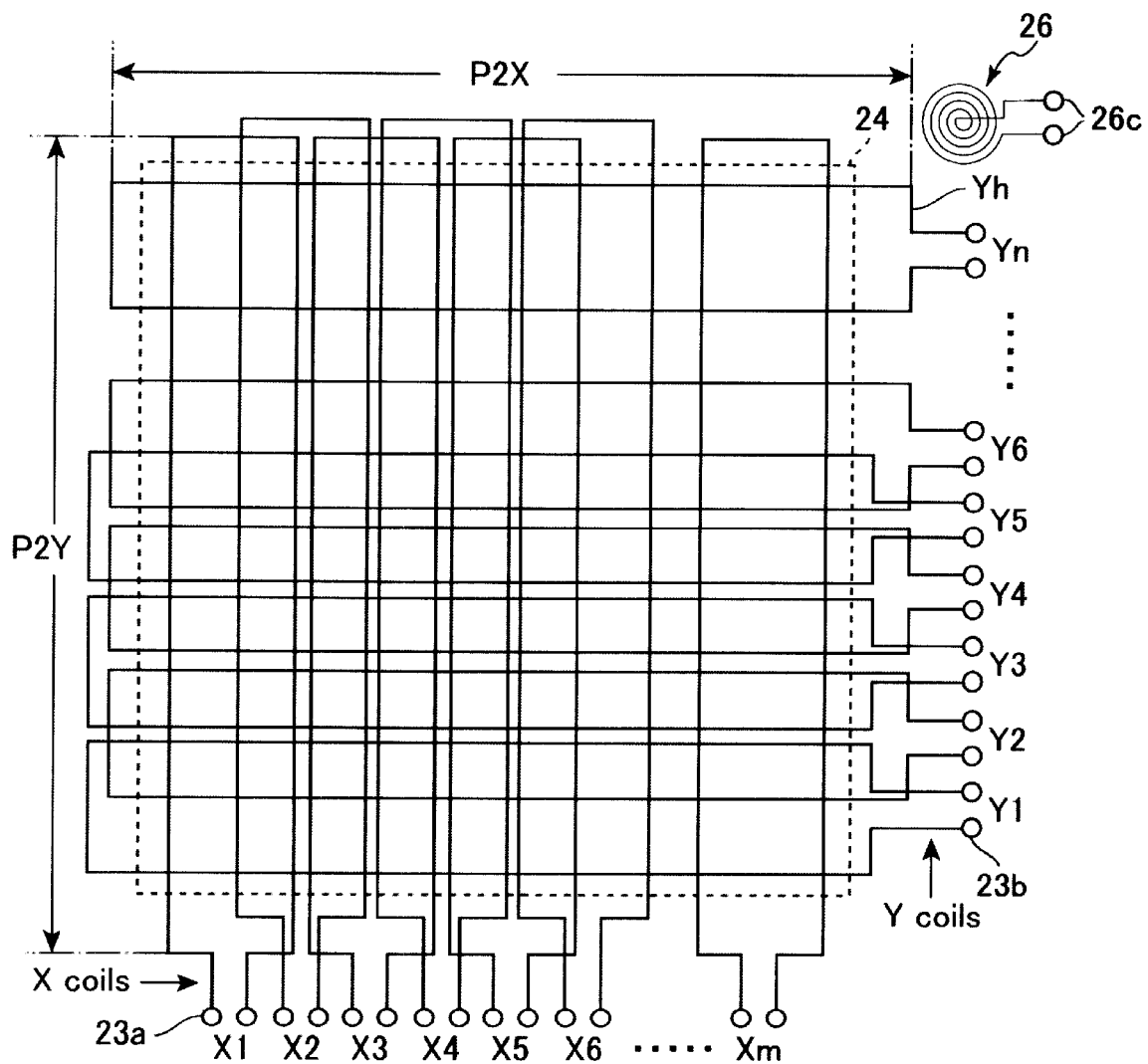
FIG. 28 illustrates how a plurality of sense coils 23 are arranged on the attachment panel 24, while omitting a part of the sense coils.
Figure 29:
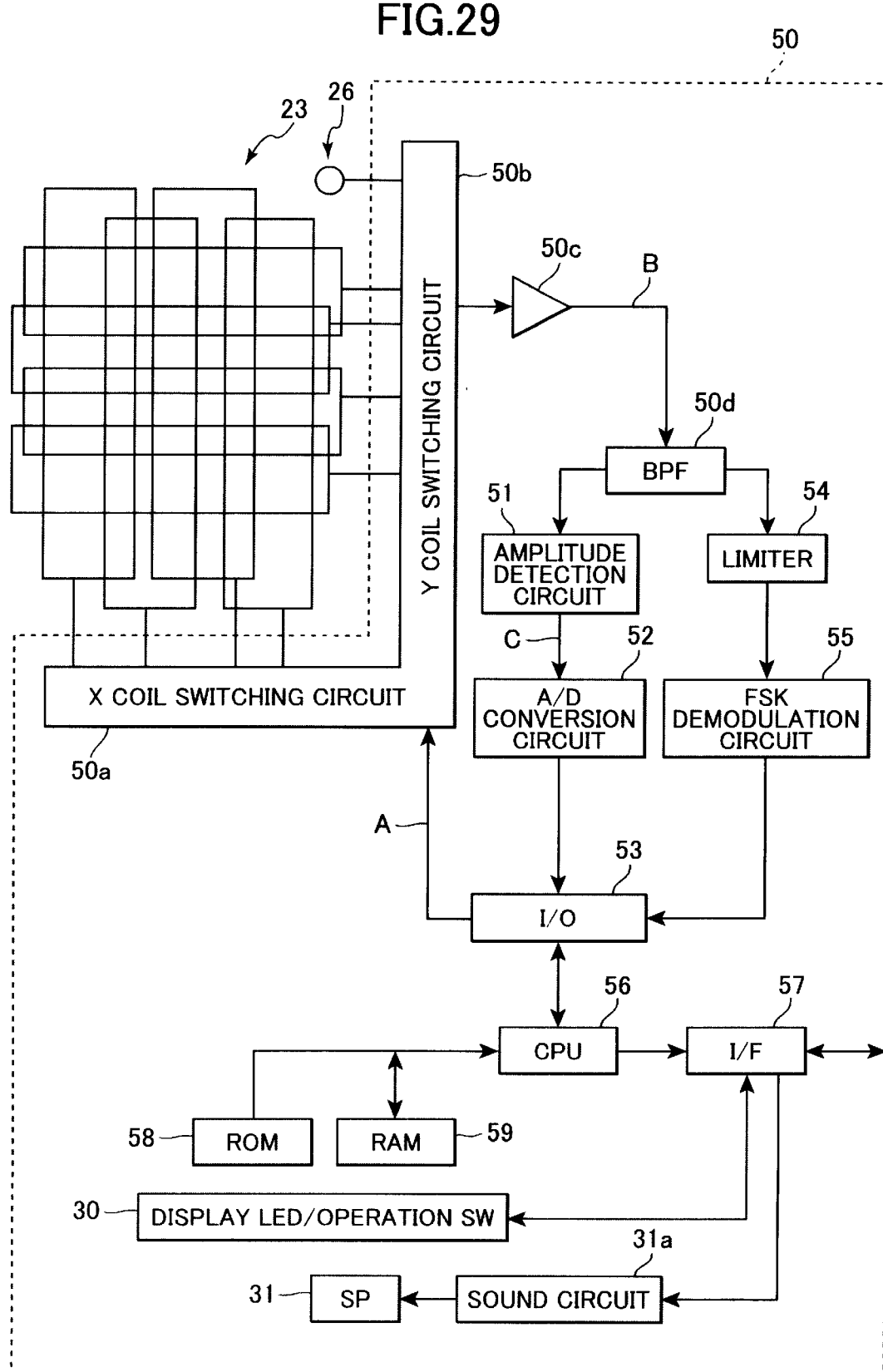
FIG. 29 is a block diagram showing an electrical configuration of the electronic white board.

As shown in FIGS. 27(a) and 27(b), the correction coil 26 is formed from a coil 26b that is formed from a wire of plural turns in a concentric spiral shape. Because of this concentric spiral shape with plural turns, the correction coil 26 can generate a high voltage when induced by the alternating magnetic field generated by the pen 60. Therefore, even if the level of the alternating magnetic field generated by the pen 60 changes slightly, the correction coil 26 can translate this small change in the alternating magnetic field into a large voltage change. As shown in FIGS. 28 and 29, the correction coil 26 has a pair of terminals 26c that are connected to the Y coil switching circuit 50b.

When the pen tip 62 of the pen is pressed against the region 26, the coil L1 in the pen generates an alternating magnetic field, which will be received by the region 26, and coordinate correction will be performed as will be described later. More specifically, when the pen 60 has not yet used at all and therefore the battery 70 in the pen 60 is charged full, the pen 60 is pressed against the region 26. As a result, the coil L1 in the pen generates an alternating magnetic field, whereupon the correction coil 26 generates a signal with a voltage value that corresponds to the strength of the alternating magnetic field. As shown in FIG. 29, the amplifier 50c amplifies the voltage signal. The band pass filter 50d filters out unnecessary bands from the amplified signal. The amplitude detection circuit 51 detects amplitude of the amplified and filtered signal from the band pass filter 50d. The A/D conversion circuit 52 converts the amplified and filtered signal from the circuit 51 into a digital signal "g" that corresponds to the amplitude, that is, the voltage value of the amplified signal. The digital signal is inputted into the CPU 56 through the I/O circuit 53. The value "g" of the thus detected voltage is stored in the ROM 58 as a reference value.

It is noted that in this example, the total number m of X coils X1–Xm is 13, and the total number n of Y coils Y1–Yn is 20. The width P1 of each of the X and Y coils 23 is 80 mm. Accordingly, the amount P1/4 is equal to 20 mm, and therefore the position coordinate table 58a is prepared in the same manner as shown in FIGS. 20(a)–20(b) for the second embodiment.

According to the present embodiment, the CR oscillation circuit 69e in the pen (FIG. 6(b)) is designed to oscillate a signal, whose frequency is set to some modulation frequency fm that corresponds to an identification number of the subject pen 60. For example, the frequency of the CR oscillation circuit 69e is set with a modulation frequency fm of 4.1 kHz for a pen with ID number (1).

As shown in FIG. 30(a), according to the present embodiment, the RAM 59 has a plurality of storage areas. More specifically, the RAM 59 has a work area 59c; a temporary storage area 59a; a finalized area 59b; and several table storage areas 59d for storing several position coordinate tables 58a, retrieved from the ROM 58, in one to one correspondence with several (four, in this example) pen identification numbers that are registered in the electronic white board 1 of the present embodiment. In this example, the pen identification numbers (1)–(4) are registered. The pen identification number (1) is for the pen with the modulation frequency fm of 4.1 kHz.

According to the present embodiment, the warning LED 39 on the writing panel 10 is used also for notifying that a pen ID number detected (to be described later) does not coincide with any identification numbers registered in the electronic white board 1.

Figure 31:
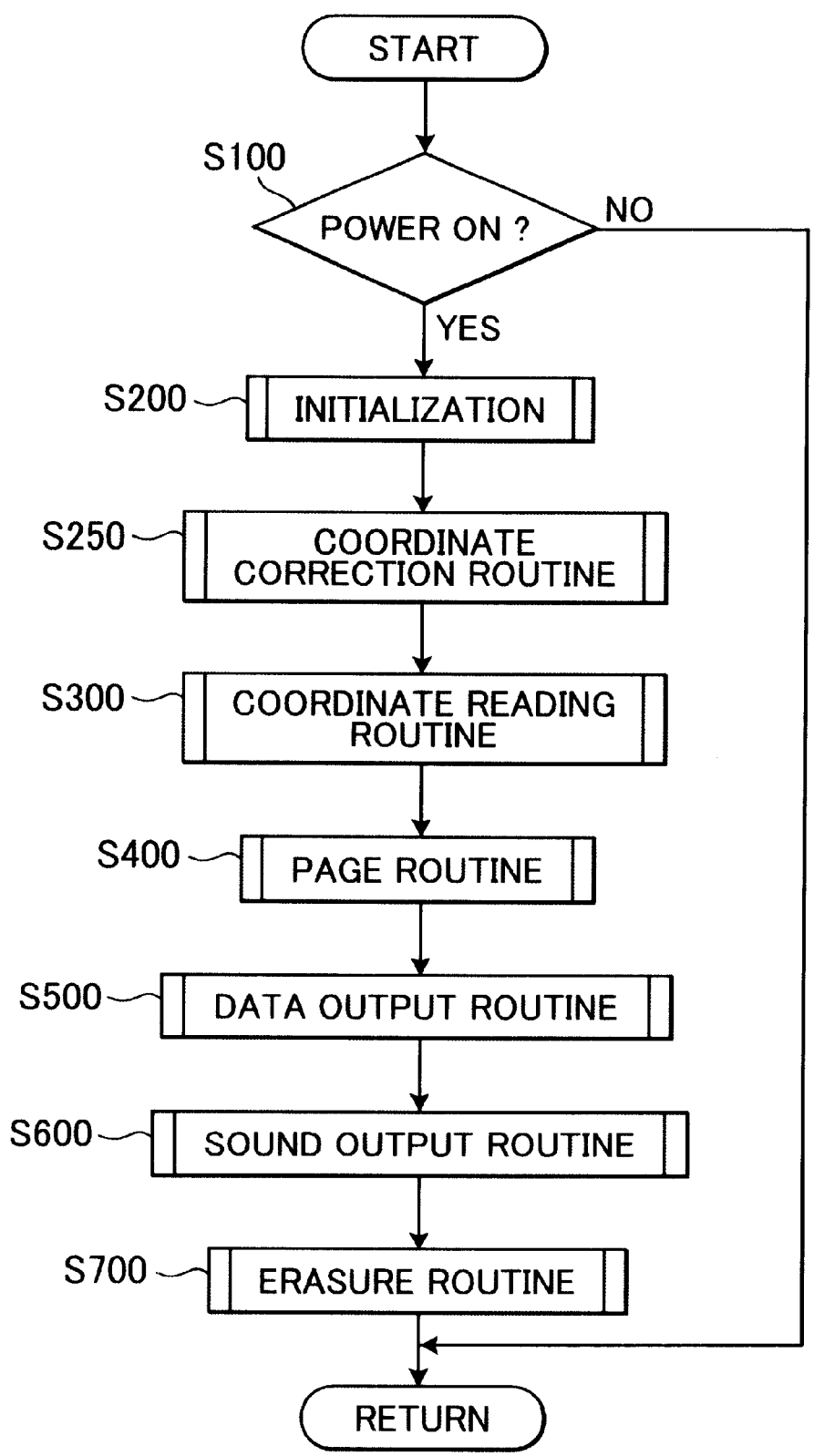
FIG. 31 is a flowchart of a main routine executed by the CPU in the control portion of FIG. 29.

According to the present embodiment, the CPU 56 executes the main routine as shown in FIG. 31. The main routine of the present embodiment is the same as that of the second embodiment except that a coordinate correction process of S250 is executed after the initialization process of S200 and before the coordinate reading process of S300 and except for the contents of the coordinate reading process of S300.

Figure 32:
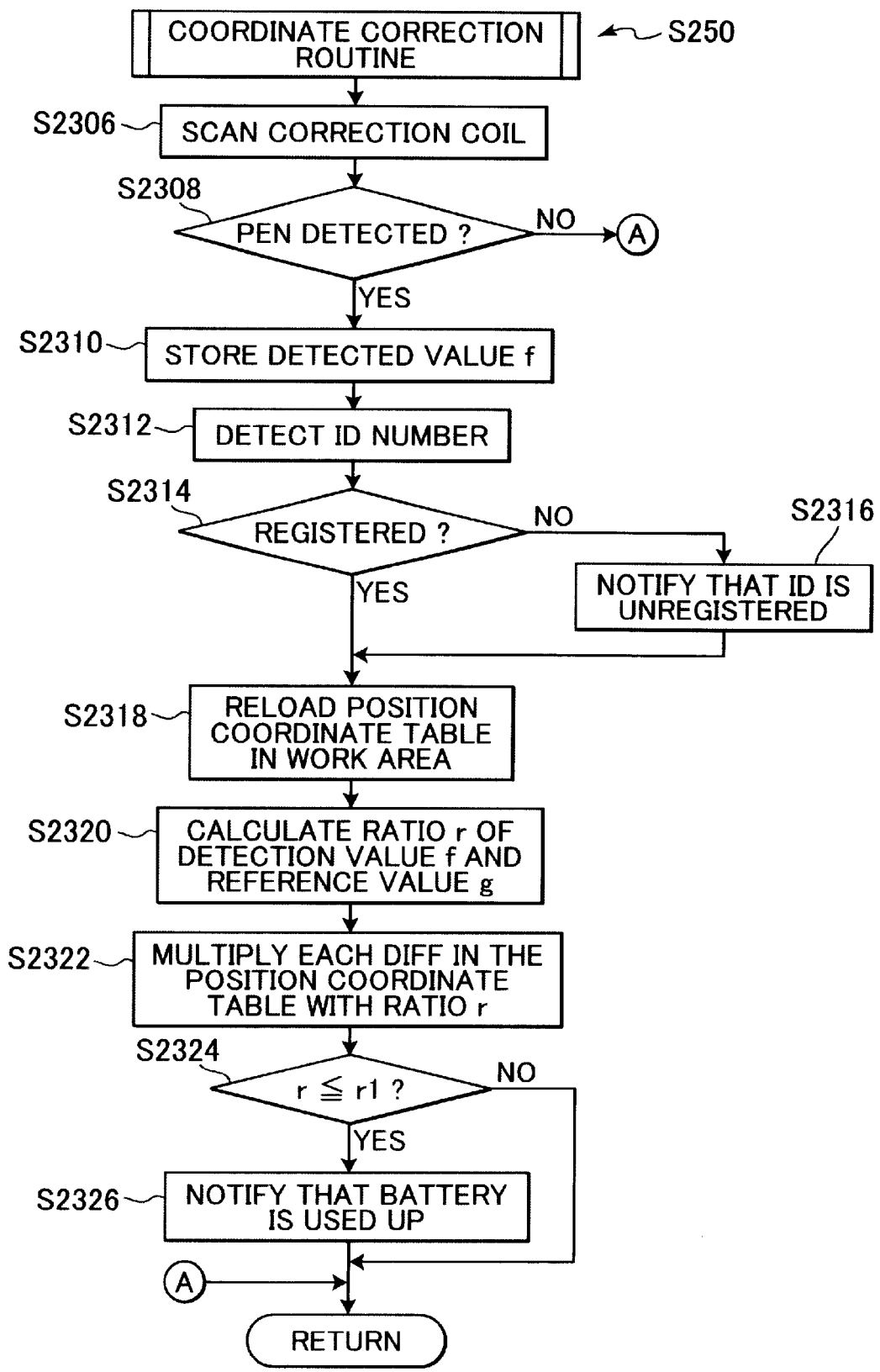
FIG. 32 is a flowchart of a coordinate correction process of S250 in FIG. 31.

Next, the coordinate correction process of S250 will be described below with reference to FIG. 32.

First, in S2306, the CPU 56 scans the correction coil 26 by driving the Y coil switching circuit 50b. In S2308, the CPU 56 determines whether or not the pen 60 has been detected. When the pen tip 62 of the pen 60 is pressed against the region 26a, an alternating magnetic field is generated from the coil L1 housed in the pen 60. The correction coil 26 will generate a signal with a voltage value because of this alternating magnetic field. As shown in FIG. 29, the amplifier 50c amplifies the voltage signal. The band pass filter 50d filters out unnecessary bands from the amplified signal. The amplitude detection circuit 51 detects amplitude of the amplified and filtered signal from the band pass filter 50d. The A/D conversion circuit 52 converts the amplified and filtered signal from the circuit 51 into a digital signal "f" that corresponds to the amplitude, that is, the voltage value of the amplified signal. The digital signal is inputted into the CPU 56 through the I/O circuit 53. At this point, the CPU 56 determines that the pen 60 is detected (S2308:YES).

Next, in S2310, the CPU 56 temporality stores, into the RAM 59, the detected value f, that is, the digital signal from the A/D conversion circuit 52. In S2312, the limiter circuit 54 converts the signal, passed through the band pass filter 50d, into a square waveform pulses. The FSK demodulation circuit 55 performs FSK demodulation on the square waveform pulses, and outputs a value, indicating the results of the FSK demodulation, to the CPU 56 through the I/O circuit 53. The CPU 56 reads the value outputted from the FSK demodulation circuit 55 and uses the value to detect, in S2312, an ID number for the presently-detected pen. Next, in S2314, the CPU 56 determines whether or not the detected ID number is registered.

In this example, ID numbers 1 to 4 are registered in the RAM 59 as shown in FIG. 30(a). If the pen 60 that corresponds to an ID number 1 is used, the CR oscillation circuit 59e in the pen 60 generates an oscillation frequency of 4.1 kHz and the FSK demodulation circuit 55 outputs the value of 245. In this case, the CPU 56 judges the ID number (1) when the CPU 56 reads a value of 245 from the FSK demodulation circuit 55. The CPU 56 therefore determines that the detected pen is a registered one, and the process of S2314 results in a positive determination.

If the CPU 56 determines that the ID number detected at the S2312 is not a registered number (S2314:NO), then in S2316 the CPU 56 outputs a switching signal to the warning LED 39 through the I/F circuit 57, thereby illuminating the warning LED 39 to notify the user that the ID number is not a registered one.

As described above, the position coordinate table 58a is stored in the table storage area 59d for each different ID number as shown in FIG. 30(a). If a pen 60 with an unregistered ID number is used, then it would be impossible to correct coordinates based on the condition of the battery in the pen 60. Because correction cannot be performed, the precision of coordinate reading can possibly degrade. The user is therefore notified of this potential problem in S2316.

When the CPU 56 determines that the ID number is a registered one (S2314:YES), then the position coordinate table 58a, which is already stored in the table storage area 59d for the detected ID number, is erased, and a new position coordinate table 58a (FIG. 20(b)) is retrieved from the ROM 58. The retrieved new position coordinate table 58a is then reloaded in the work area 59c in S2318.

In S2320, the CPU 56 calculates a ratio r by dividing the detected value f, which has been temporally stored in the RAM 59 in S2310, by the reference value g prestored in the ROM 58. Next, in S2322, the CPU 56 multiplies each value DIFF, in the reloaded position coordinate table 58a of FIG. 20(b), with the ratio r.

For example, if the reference value g is 256, and the detected value f is 128, then the ratio r is calculated to be 0.5 (128/256=0.5). Each value DIFF in the position coordinate table 58a, now stored in the work area 59a, is multiplied by this value of 0.5. A thus corrected position coordinate table 58a shown in FIG. 20(c) is therefore obtained by correcting the values DIFF to about one half of their original values. It should be noted that each value DIFF shown in FIG. 20(c) is determined by half-adjusting the results of multiplication with the ratio r.

Next, in S2324, the CPU 56 determines whether or not the ratio r calculated in S2320 is equal to or less than a predetermined limit value r1 prestored in the ROM 58. If so (S2324:YES), then the CPU 56 illuminates the warning LED 39 in S2329 to notify the user that the battery 70 in the pen 60 has been used up, or some problem has occurred in the circuitry, such as the coil L1 being cut.

Next, the coordinate reading process of S300, according to the present embodiment, will be described with reference to FIG. 33.

During the coordinate reading process of S300 in the present embodiment, processes of S2402–S2406 are first executed in the same manner as the processes of S1302–S1306 described in FIG. 22 in the second embodiment. In S2408, similarly to S1308 of the second embodiment, the CPU 56 reads the output value from the FSK demodulation circuit 55, and judges the pen identification number based on the read output value. For example, it is assumed that the FSK demodulation circuit 55 is designed to output a value of 245 when demodulating modulation frequency fm of 4.1 kHz. If the CPU 56 receives the output value of 245, then the CPU 56 judges the identification number to be (1).

Then, processes of S2410–S2416 are executed in the same manner as S1310–S1316 (FIG. 22) in the second embodiment. When e(max−1) is greater than e(max+1) (yes in S2416), it is known that the X coil X(max−1) is the second maximum coil. Accordingly, in S2418, the CPU 56 sets, as coil number "max2", the coil number of the second maximum voltage X coil X(max−1). The CPU 56 stores data of the thus set value "max2" in the RAM 59.

On the other hand, when e(max−1) is smaller than or equal to e(max+1) (no in S2416), it is known that the X coil X(max+1) is the second maximum coil. Accordingly, in S2420, the CPU 56 sets, as coil number "max3", the coil number of the second maximum voltage X coil X(max+1). The CPU 56 stores data of the thus set value "max3" in the RAM 59.

Then, in S2422, the CPU 56 calculates the X coordinate in a manner described below.

When the coil number "max2" is stored in S2418, it is known that the second maximum coil X(max2) (that is, X(max1)) exists in the negative direction from the coil X(max) along the X axis. Accordingly, the variable "SIDE" is set to −1. A difference voltage "DIFF" between the maximum voltages e(max) and the second maximum voltage e(max2) is determined by calculating e(max)−e(max2). On the other hand, when the coil number "max3" is stored in S2420, it is known that the second maximum coil X(max3) (that is, X(max+1)) exists in the positive direction from the coil X(max) along the X axis. Accordingly, the valuable "SIDE" is set to 1. A difference voltage "DIFF" between the maximum voltages e(max) and the second maximum voltage e(max3) is determined by calculating e(max)−e(max3).

Next, similarly to the second embodiment, the CPU 56 retrieves, from the position coordinate table 58a now stored in the work area 59c of the RAM 59, a coordinate offset amount ΔX that corresponds to a value DIFF that is closest to the calculated value DIFF. The CPU 56 sets the retrieved coordinate offset amount ΔX as a value "OFFSET". Then, the CPU 56 calculates the formula (2) described in the first embodiment, thereby obtaining the x coordinate of the pen.

Although not shown in the drawings, the CPU 56 executes the same operations as S2402–S2422 for the Y coils Y1–Yn.

As described above, according to the present embodiment, the correction region 26a is provided in the upper-right portion of the front surface of the frame 11. The correction region 26a is for detecting an alternating magnetic field generated by the coil L1 installed in the pen 60 in order to correct reading errors of coordinates due to compensation in the battery 70 in the pen 60. Before performing the writing operation on the writing surface 21a, the tip end of the pen 60 is pressed against the region 26a, thereby causing the coil L1 to generate the alternating magnetic field. As a result, the correction coil 26 generates an electric voltage with its amount f corresponding to the level of the alternating magnetic field. The voltage f is compared with the reference voltage g, and the compared result is used to correct the coordinates. All the coordinates to be detected thereafter will therefore be corrected with high precision.

By using the electronic white board 1 according to the present embodiment, the position coordinate table 58a can be corrected according to the voltage of the battery 70 in the pen 60 before using the pen 60 to write on the writing surface 21a, by merely pressing the pen tip 62 against the region 26a. All coordinates inputted after this correction operation will be corrected accordingly. Therefore, no uncorrected coordinates will occur, so that precision of coordinate reading is increased.

Also, because the position coordinate table 58a that corresponds to the ID number of the pen 60 is corrected, the degree of correction will remain constant for all the pens of the same ID number. Therefore, precision of coordinate reading can be increased for all the pens belonging to the same ID number.

Also, the correction coil 26 includes the spiral-shaped coil 26d made from a wiring of plural turns. Therefore, even if the level of the alternating magnetic field generated from the pen 60 drops by only a small amount, this small amount can be detected as a large level of change so that high precision correction can be performed.

Next, a first modification of the present embodiment will be described while referring to FIGS. 34 and 35.

An electronic white board 80 according to the present modification is provided with several holders 17 for supporting several pens 60. The position coordinate table 58a for each pen can be corrected by merely supporting the subject pen 60 in one of the holders 17.

Figure 34:
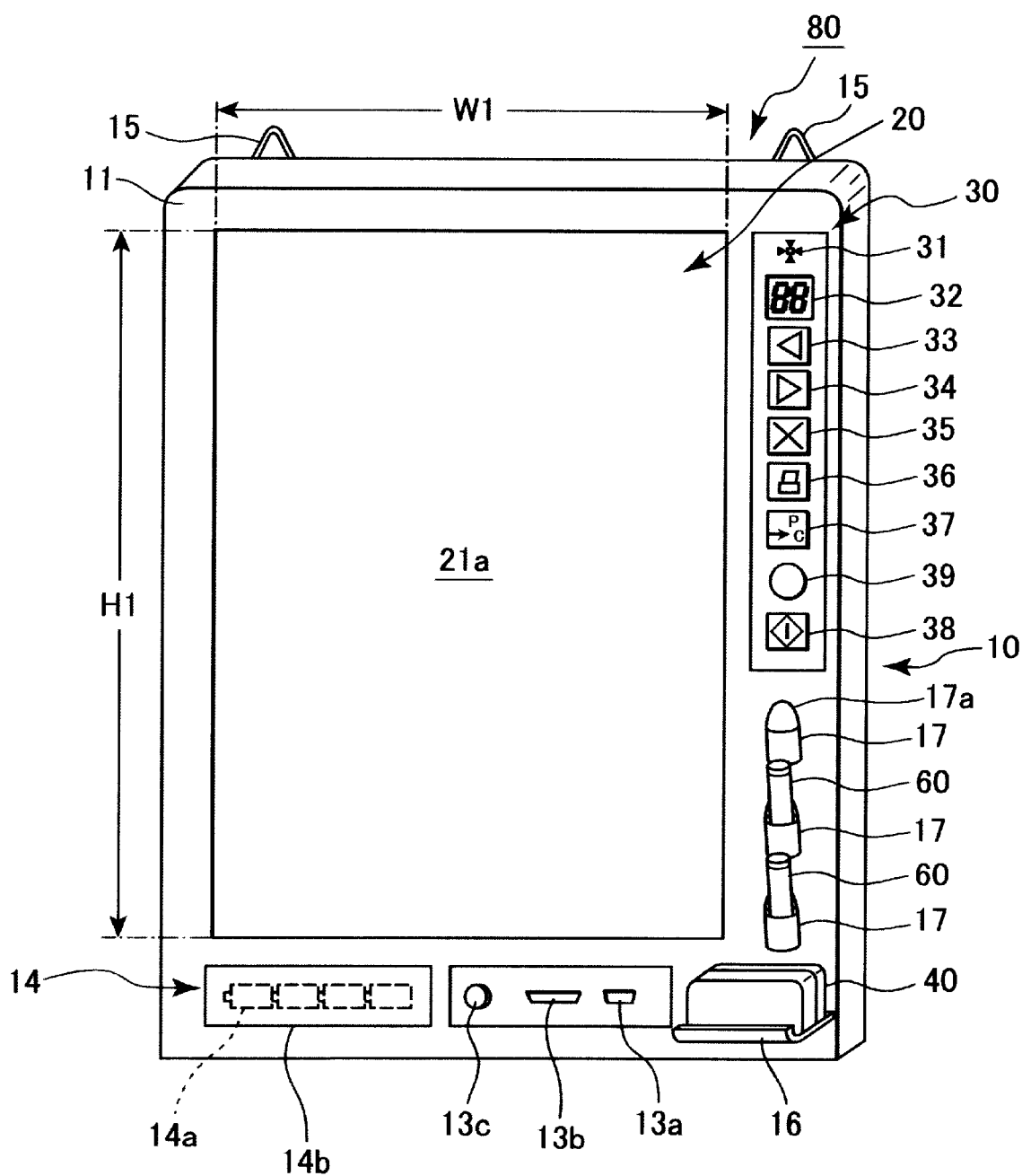
FIG. 34 is a perspective view showing main components of an electronic white board 80 according to a first modification of the third embodiment.

In this example, as shown in FIGS. 34 and 35(a), three holders 17 are provided at the right side on the front surface of the frame 11 of the electronic white board 80. The holders 17 are aligned vertically and serve to support three pens 60. A tray 16 for placing the eraser 40 protrudes outward from a position beneath the holders 17. An insertion hole 17a for inserting the pen 60 is formed in each of the holders 17.

As shown in FIG. 35(b), each insertion hole 17a is formed in a shape substantially corresponding to the outer configuration of the pen 60. A correction coil 26 is attached to the base 17b of each insertion hole 17a. Each correction coil 26 is constructed from a coil 26b having the same configuration with that of the present embodiment shown in FIG. 27(b). Each coil 26b is connected to the Y coil switching circuit 50b.

As shown in FIG. 35(a), each pen 60 is freely detachably insertable in directions indicated by arrows F3, F4 into and out of the holders 17. After the electronic white board 80 is turned ON, the user presses a pen 60, which is desired to be used, into its holder 17 so that the pen tip 62 presses against the base 17b of the insertion hole 17a. The coil L1 in the pen 60 generates an alternating magnetic field as a result. The alternating magnetic field induces a voltage signal in the correction coil 26.

In the same manner as described already in the present embodiment, the position coordinate table 58a that is stored in the table storage area 59d in correspondence with the presently-to-be-used pen 60 is corrected based on the level of this induced voltage signal.

According to the present modification, each time the pen 60 is inserted in the insertion hole 17a of the holder 17 of the electronic white board 80, the corresponding position coordinate table 58a is corrected depending on the voltage level of the battery in the pen 60. Therefore, coordinates can always be read with high precision.

Because the correction coil 26 is made by winding a wire in a spiral shape in a plurality of turns, even when the drop in the voltage in the pen is very small, the drop can be detected as a large change in the voltage generated by the correction coil 26. Accordingly, the position coordinate table 58a can be corrected with high precision.

The correction coil 26 can alternatively be provided around the periphery of the insertion hole 17a.

Also, in order to increase the strength at which the pen 60 is held in the insertion hole 17a, a groove or flange can be formed around the outer surface of the pen 60, and an engaging groove or flange can be formed at a corresponding position in the inner surface of the insertion hole 17a. In this case, the pen 60 and the insertion hole 17a can be designed so that the pen tip 62 can be continuously pressed against the base 17b when the pen 60 is pressed into the insertion hole 17a to a degree that is sufficient to engage the two. With this configuration, correction of the position coordinate table 58a will be executed even after the user releases his/her hand from the pen 60.

In the table storage areas 59d, a plurality of position coordinate tables 58a can be stored in one to one correspondence with the plurality of ID numbers. Accordingly, pen position can be calculated by a position coordinate table 58a that corresponds to the ID number of the pen 60 that is presently being used. Position coordinates can be accurately detected even if a plurality of pens 60 are used.

Next, a second modification of the present embodiment will be described while referring to FIGS. 36 to 39.

An electronic white board 81 according to the present modification can be used either standing vertically upright or reclining in a horizontal posture. However, regardless of the posture of the electronic white board 81, the correction region 26a will always be at the lower right position of the electronic white board 81.

Figure 36:
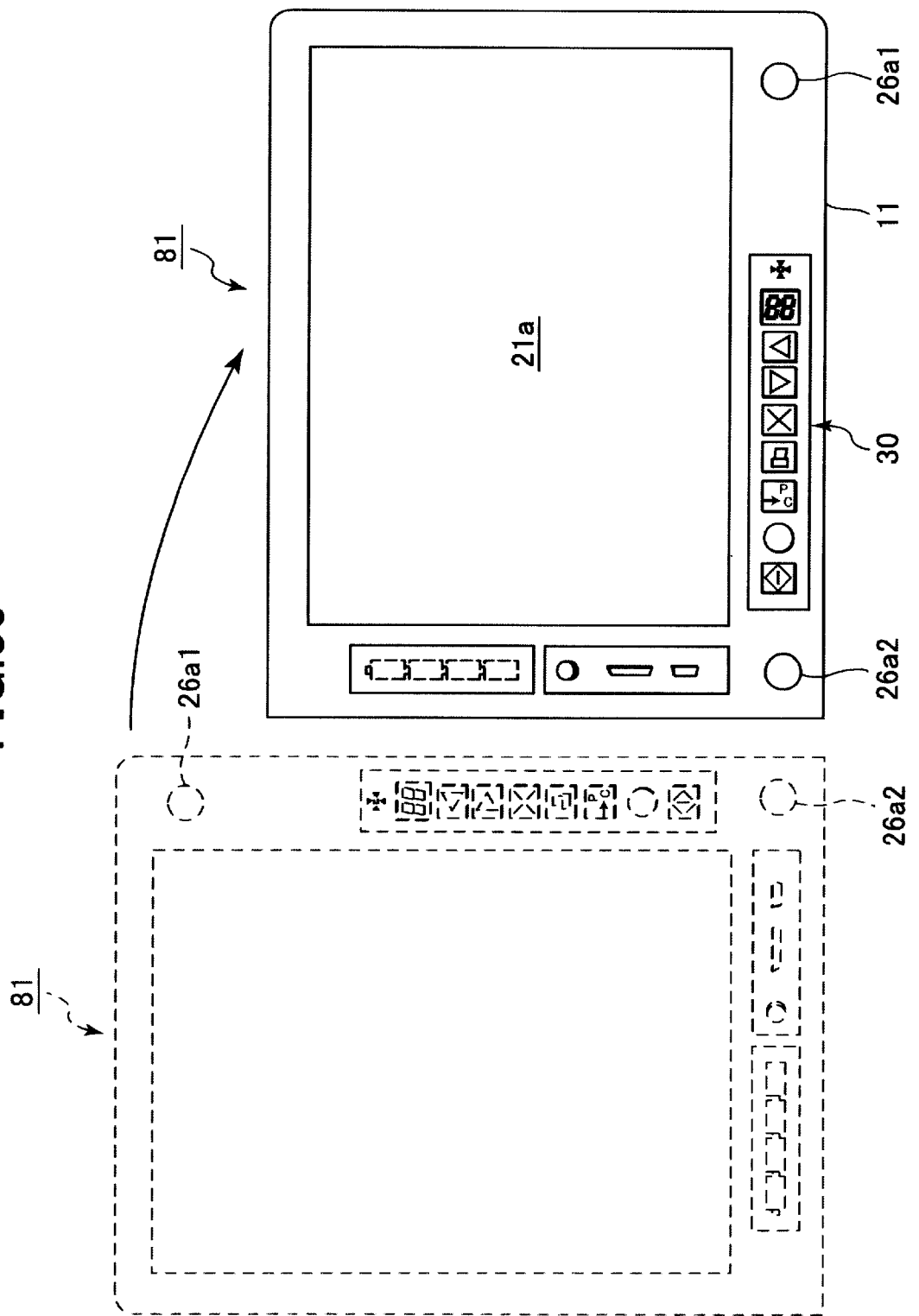
FIG. 36 is a plan view showing an electronic white board 81, according to a second modification of the third embodiment, being switched from a vertical posture to a horizontal posture.

As shown in FIG. 36, the electronic white board 81 according to the present modification includes two correction regions 26a1 and 26a2. When the electronic white board 81 is in the vertical orientation, the region 26a2 is located at the lower right of the frame and the region 26a1 is located at the upper right. Contrarily, when the electronic white board 81 is in the horizontal orientation, the region 26a1 is located at the lower right of the frame and the region 26a2 is located at the lower left.

In order to facilitate use by the user, whichever one of the regions 26a1 or 26a2 is located at the lower right will always function for correcting the position coordinate table 58a. That is to say, the region 26a2 will serve for correcting the position coordinate table 58a when the electronic white board 81 is in the horizontal posture, and the region 26a1 will function for correcting the position coordinate table 58a when the electronic white board 81 is in the horizontal posture.

Figure 37:
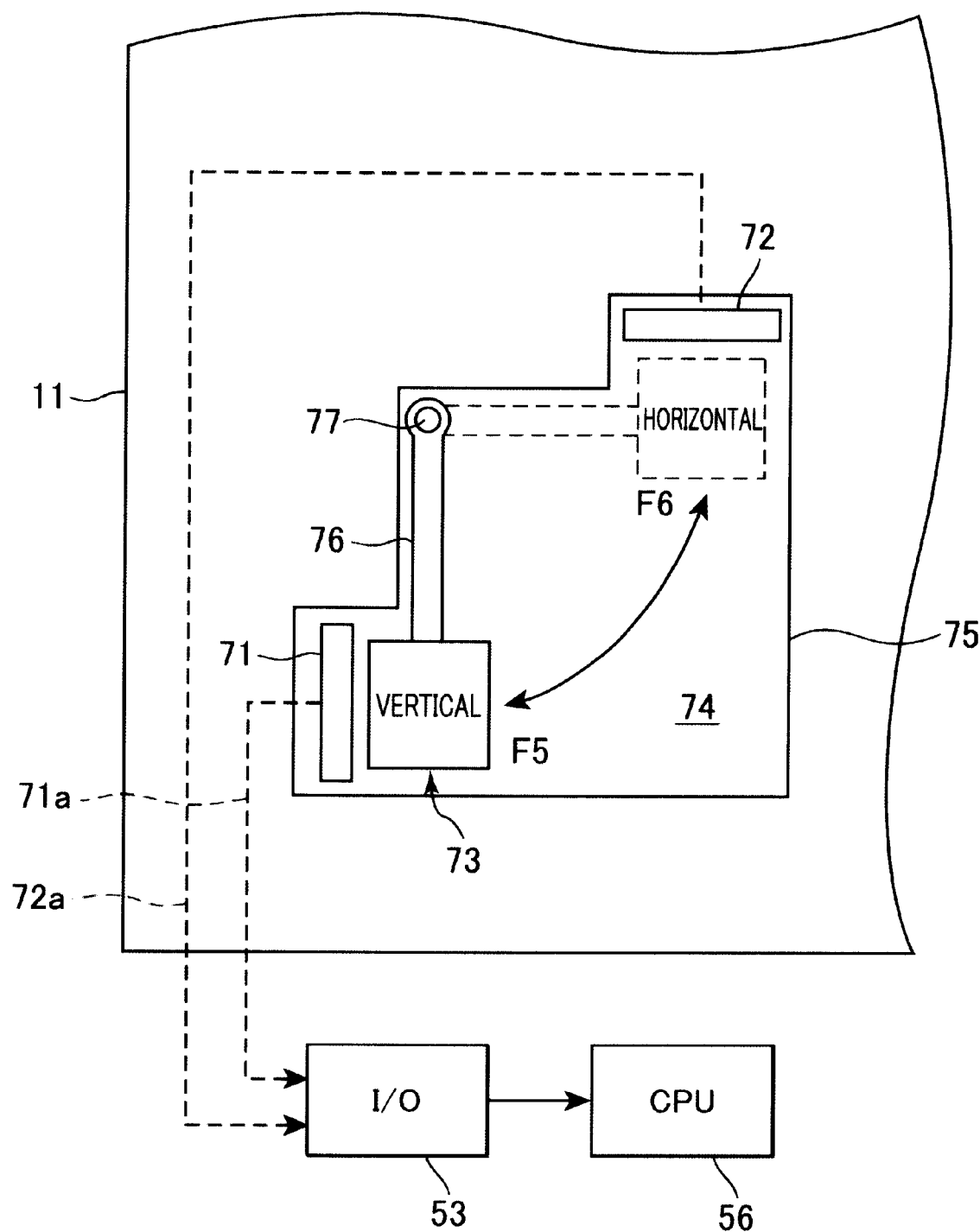
FIG. 37 is a schematic view showing a sensor provided internally to the electronic white board 81 of FIG. 36 for detecting the posture of the electronic white board 81.

As shown in FIG. 37, a space 74 is formed at the lower left corner portion in the frame 11. A sensor 75 for detecting the posture of the electronic white board 81 is provided in the space 74. The sensor 75 includes sensor coils 71, 72 and a pendulum 73. The pendulum 73 has a weight 78 and an arm member 76 connected to the weight 78. The weight 78 is made from a conductive material. The arm member 76 is freely pivotably mounted on a shaft member 77, so that the pendulum 73 changes its position depending on the posture of the electronic white board 81.

That is, when the electronic white board 81 is stood upright into a vertical posture as indicated by a broken line in FIG. 36, then the pendulum 73 will be positioned as indicated by a solid line in FIG. 37. Therefore, the sensor coil 71 will detect the pendulum 73, and will output a detection signal over a lead line 71a to the CPU 56 via the input/output circuit 53. The CPU 56 therefore determines that the electric white board 81 is in its vertical posture.

On the other hand, when the electronic white board 81 is in its horizontal posture as indicated by a solid line in FIG. 36, the pendulum 73 will move to the position indicated by a broken line in FIG. 37. Accordingly, the sensor coil 72 will detect the pendulum 73, and output a detection signal over a lead line 72a to the CPU 56 via the I/O circuit 53, whereupon the CPU 56 determines that the electronic white board 81 is in the horizontal posture.

Next, a coordinate correction routine of S250 and a coordinate reading routine of S300 executed according to the present modification will be explained while referring to FIGS. 38 and 39.

Figure 38:
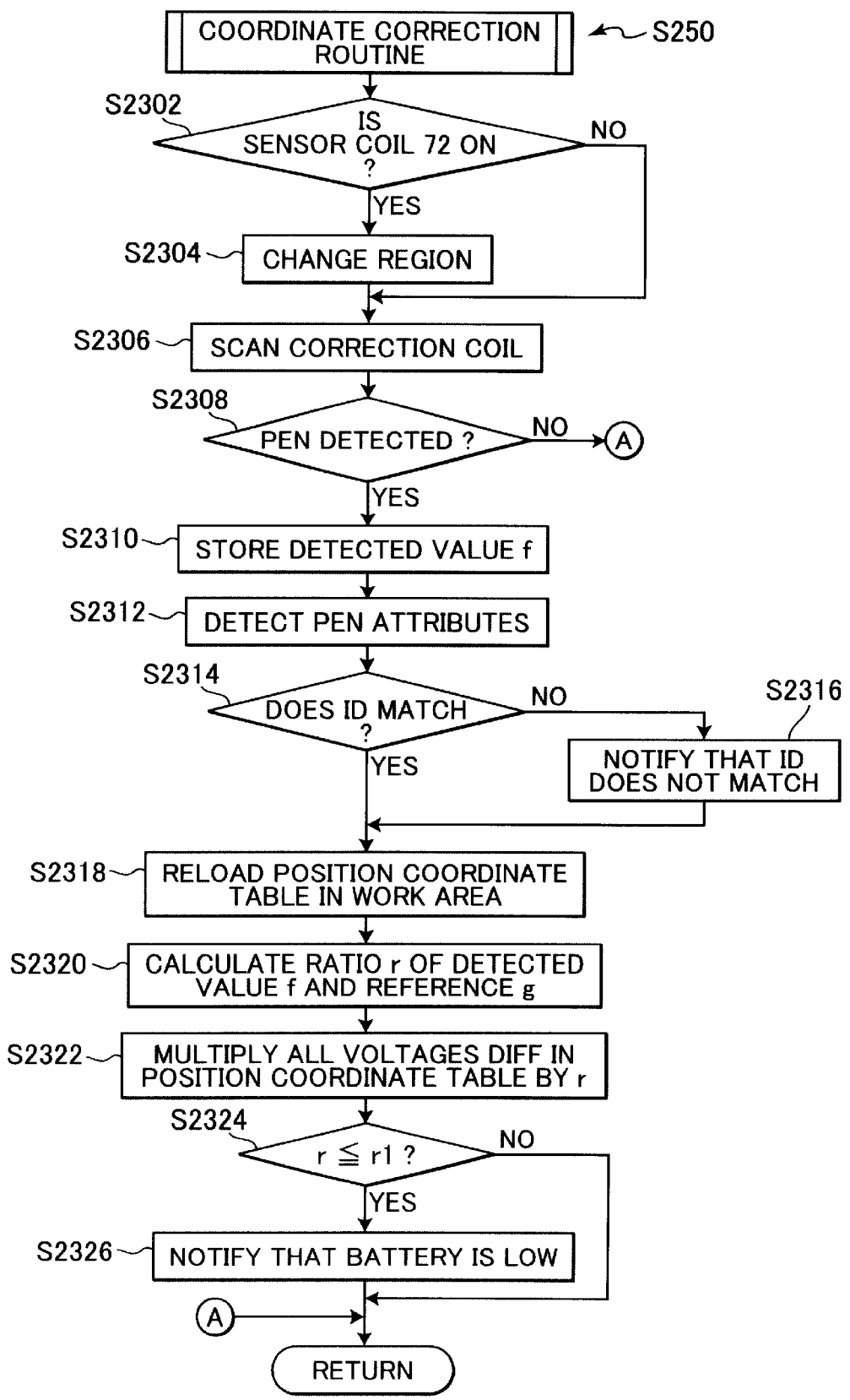
FIG. 38 is a flowchart representing the processes of the coordinate correction routine according to the second modification.

FIG. 38 is a flowchart representing the processes of the coordinate correction routine. FIG. 39 is a flowchart representing processes of the coordinate reading routine.

Figure 39:
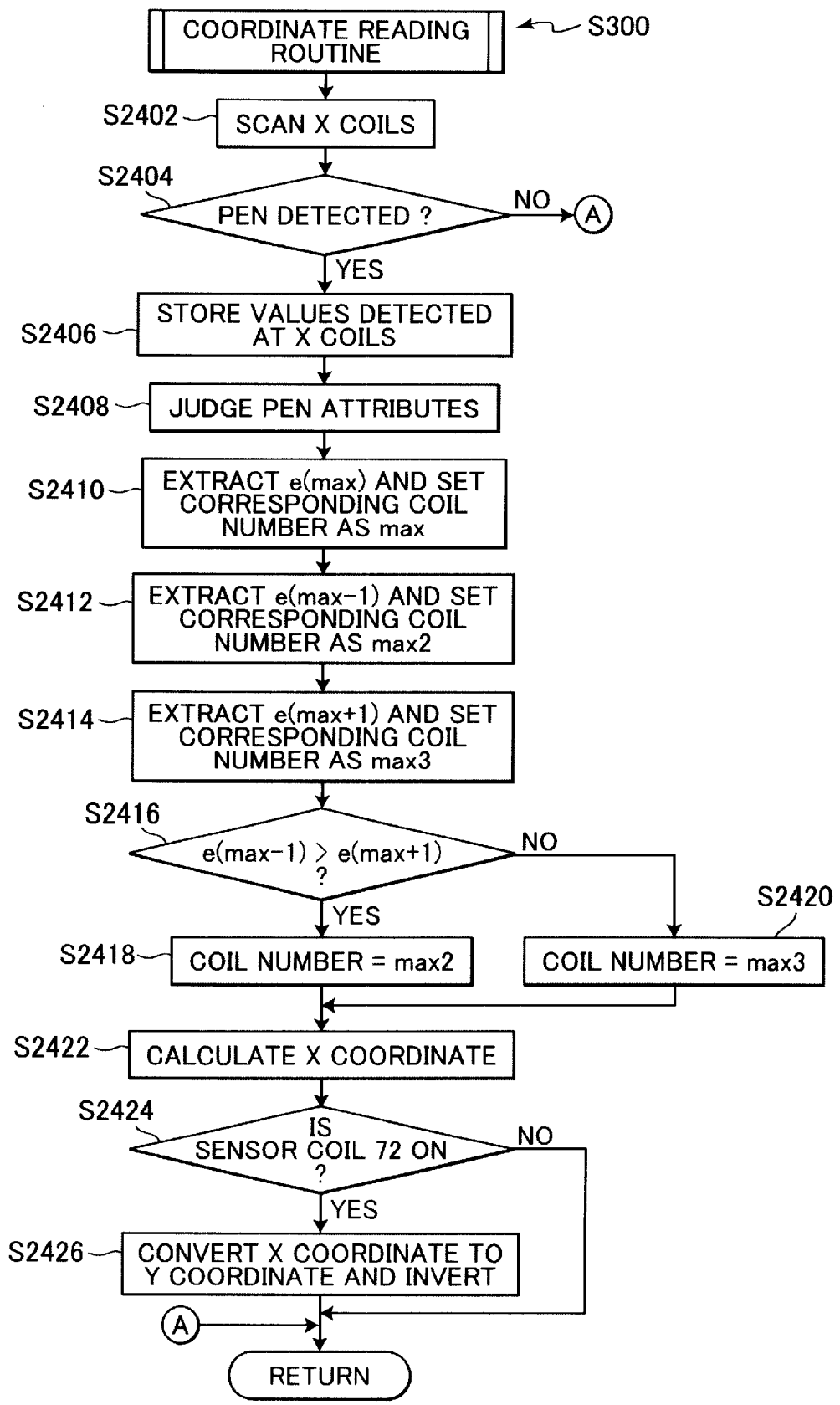
FIG. 39 is a flowchart representing processes of the coordinate reading routine according to the second modification.

It should be noted that S2306 to S2326 in FIG. 38 and S2402 to S2422 in FIG. 39 are the same as those of the coordinate correction routine (FIG. 32) and of the coordinate reading routine (FIG. 33) in the present embodiment. In the following explanation, it is assumed that the vertical posture of the electronic white board 81 is the standard posture.

As shown in FIG. 38, when the CPU 56 determines that the sensor coil 72 is ON (S2302:YES), then this means that the electronic white board 81 is in its horizontal posture and so changes the functioning region from the region 26a2 to the region 26a1 in S2304. This switching process is performed by switching between the correction coils 26 provided to the regions 26a2 and 26a1. As a result, when the pen tip 62 of the pen 60 is pressed against the region 26a1 at the lower right portion of the electronic white board 81, the position coordinate table 58a will be corrected in S2306–S2326 in the same manner as described already in the present embodiment.

Figure 33:
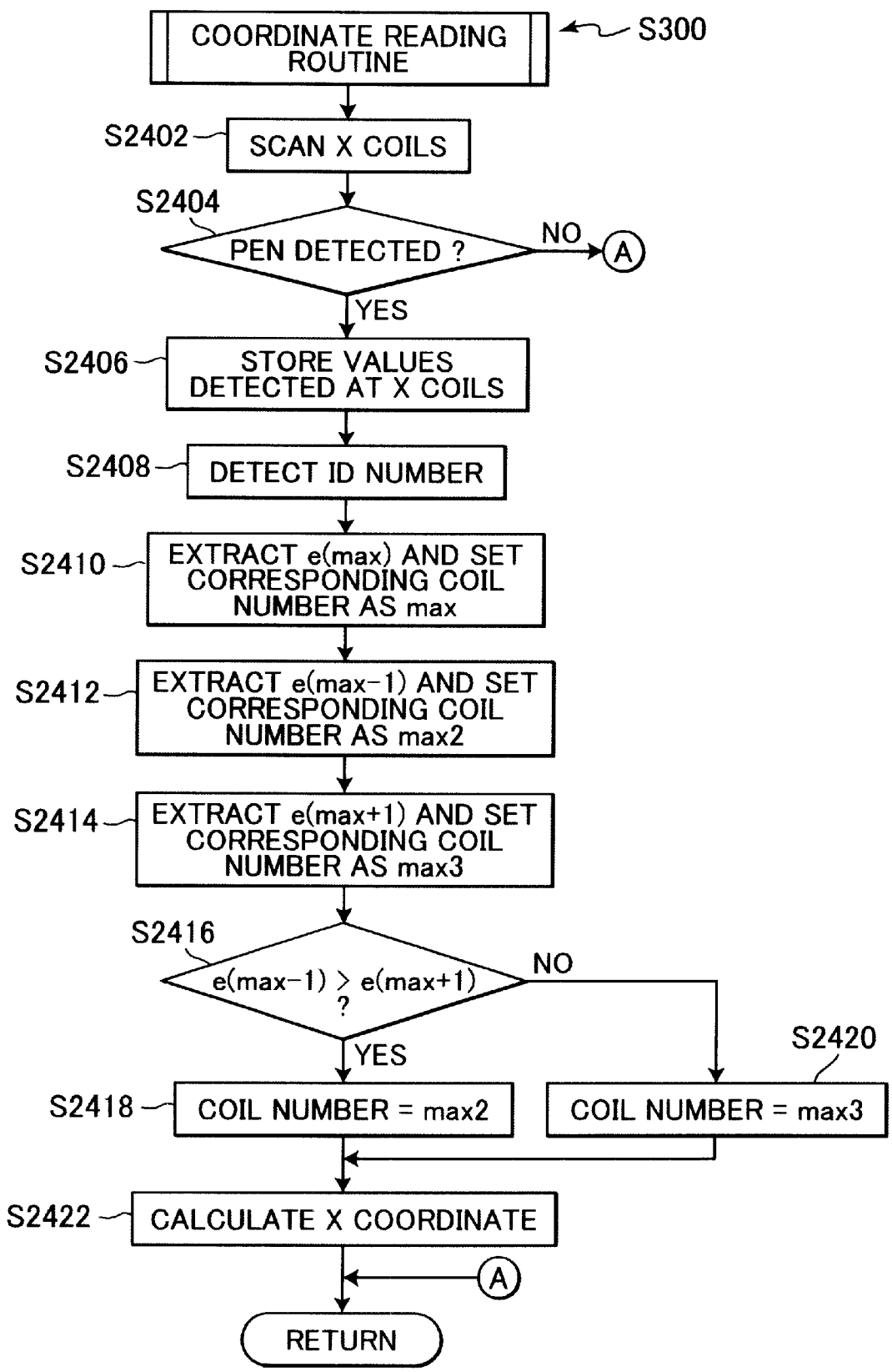
FIG. 33 is a flowchart of a coordinate reading process of S300 in FIG. 31.

As shown in FIG. 39, during the coordinate reading routine of S300, S2402–S2422 are executed in the same manner as described in the present embodiment (FIG. 33). After the CPU 56 calculates the X coordinates in S2422, the CPU 56 determines in S2424 whether or not the sensor coil 72 is ON. When the CPU 56 determines that the sensor coil 72 is ON (S2424:YES), then in S2426, the CPU 56 converts the calculated X coordinates into Y coordinates and inverts the converted Y coordinates. In other words, when the electronic white board 81 is switched from its vertical posture into its horizontal postures, the X and Y coordinates, and also positive and negative directions of the coordinates, are reversed as shown in FIG. 28. Therefore, in S2426, the CPU 56 converts these coordinates to correct values.

It should be noted that although not shown in FIG. 39, when the Y coordinates are calculated in the same manner as in S2402–S2422 of FIG. 39, in S2424, the thus calculated Y coordinates are converted into X coordinates, but positive and negative directional values are not changed. That is, inversion is not performed.

In this way, even when the posture of the electronic white board 81 is switched from its vertical posture to its horizontal posture or from its horizontal posture to its vertical posture, the position coordinate table 58a can always be corrected by pressing the pen tip 62 against the region at the lower right of the frame 11. Accordingly, the electronic white board 81 is easy to use in both its vertical and horizontal postures.

In the above description, there is provided a single correction region 26a for correcting the position coordinate table 58 to a single special position on the electronic white board 81. However, such correction regions can be provided to a plurality of positions, and the position coordinate table 58a can be corrected regardless of which region is used.

In the above description, the same warning LED 39 is used to notify the user both that the battery in the pen 60 is low and that the ID number of the pen 60 is unregistered. However, two warning LEDs can be provided, one being illuminated or blinked to notify the user of low batteries and one being illuminated or blinked to notify the user of unregistered ID number.

Furthermore, the speaker 31 can be driven by the sound circuit 31a to beep to notify the user of low batteries or unregistered ID number instead of simultaneously with illuminating or blinking the warning LED 39.

It should be noted that when the read coordinate indicates that a pen is located on some lengthwise edge of sense coils 23, the value f detected from a sense coil at this time can be compared to the reference value g and the position coordinate table 58a can be corrected based on the results of this comparison.

Fourth Embodiment

A fourth embodiment will be described below with reference to FIGS. 40(a)–51(b).

According to the present embodiment, the position coordinate table 58a is not corrected, but instead, the detection voltage values from the X and Y coils are corrected.

The electronic white board 1 of the present embodiment is the same as that of the first embodiment except for the points described below.

Figure 40A:
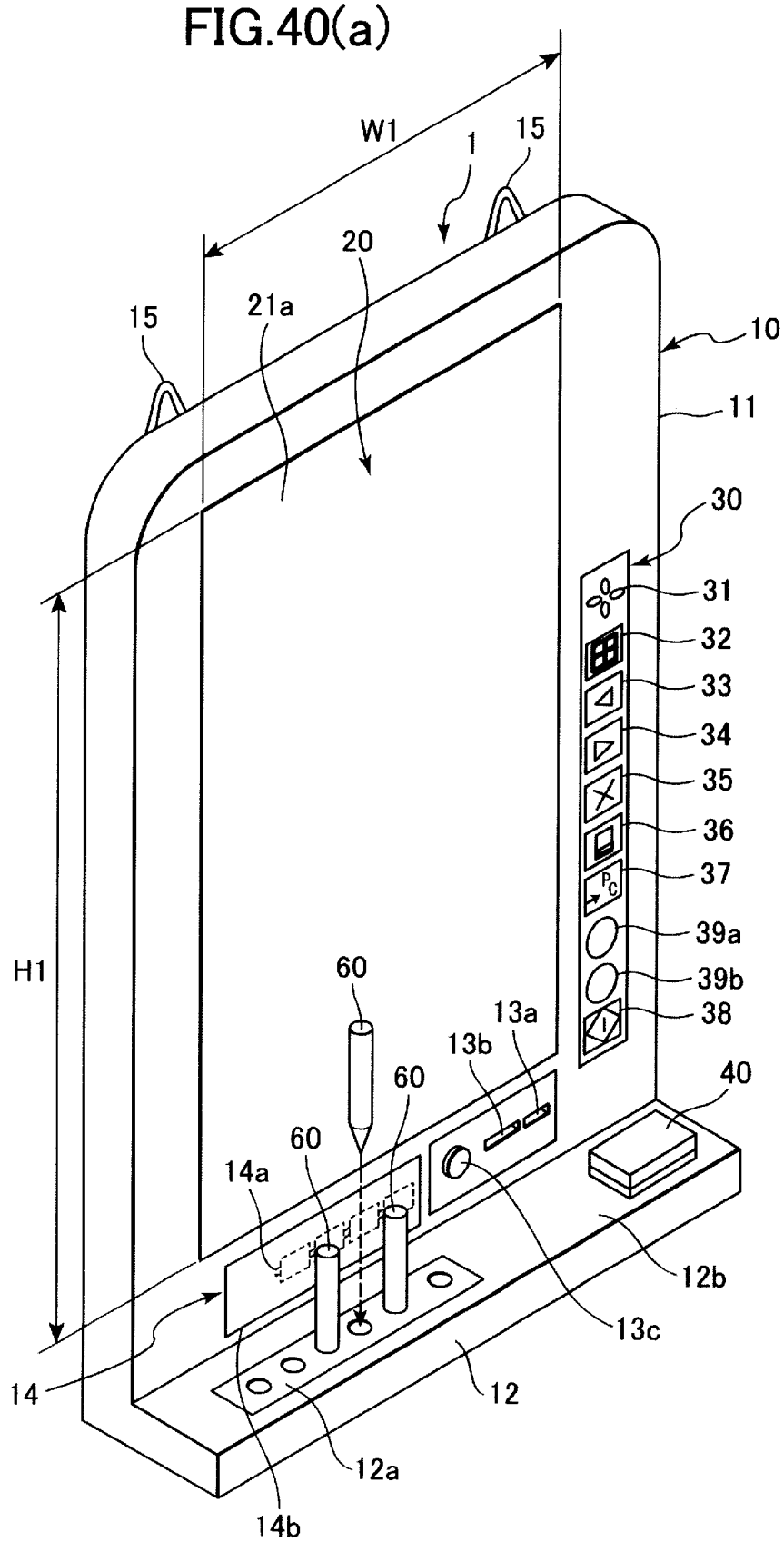
FIG. 40(a) is an external perspective view illustrating an essential configuration of an electronic white board according to a fourth embodiment of the present invention.
Figure 40B:
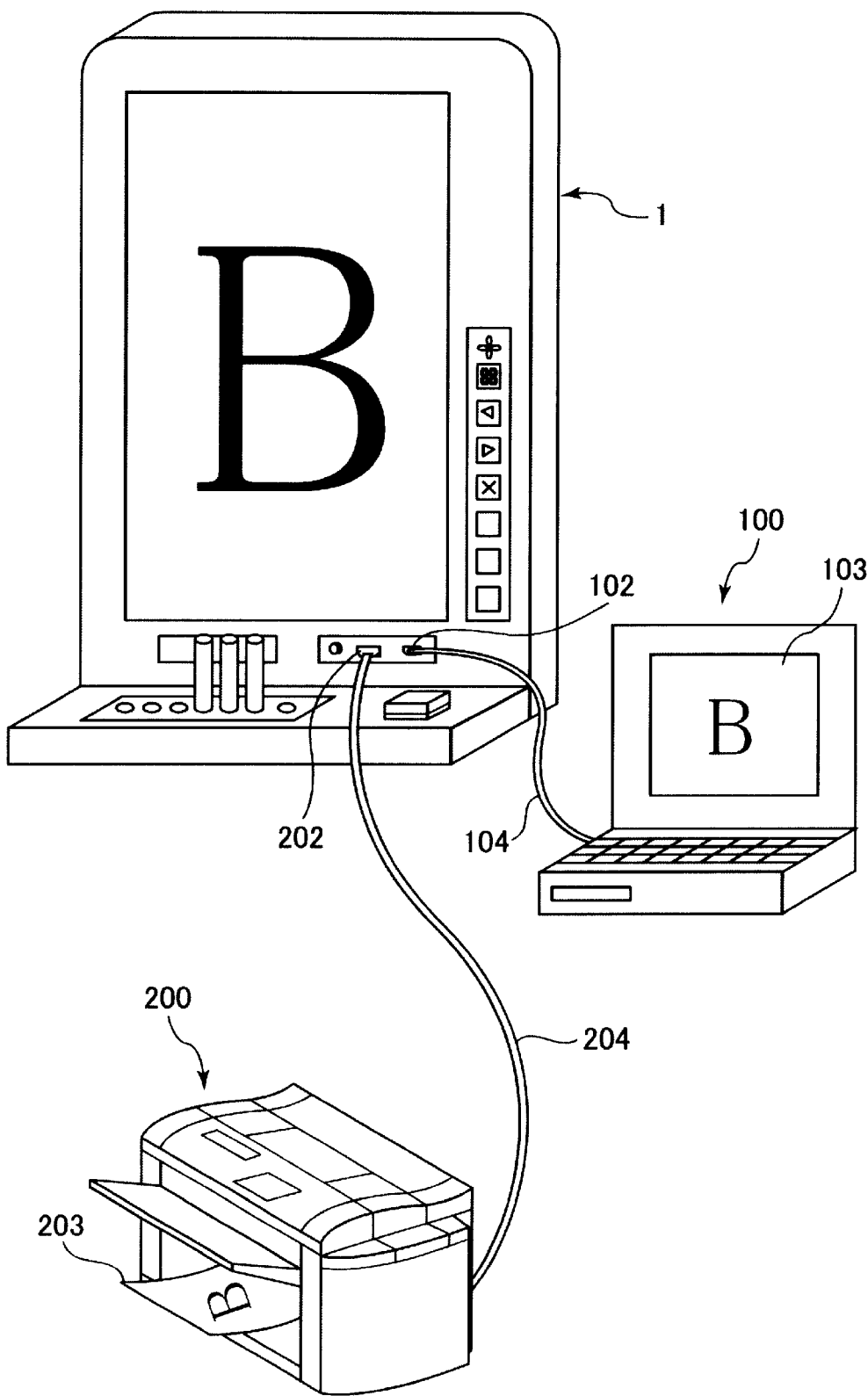
FIG. 40(b) is an illustration showing the electronic white board of FIG. 40(a) being electrically connected to a personal computer (PC) and a printer.

According to the present embodiment, as shown in FIGS. 40(a) and 40(b), several holes or concaves 12a are formed in the upper surface of the stand 12 for supporting several pens 60. The warning LED 39 is divided into an input warning LED 39a and a battery warning LED 39b. The input warning LED 39a is for warning about improper input. The battery warning LED 39b is for warning when the buttery 70 runs out.

Figure 41A:
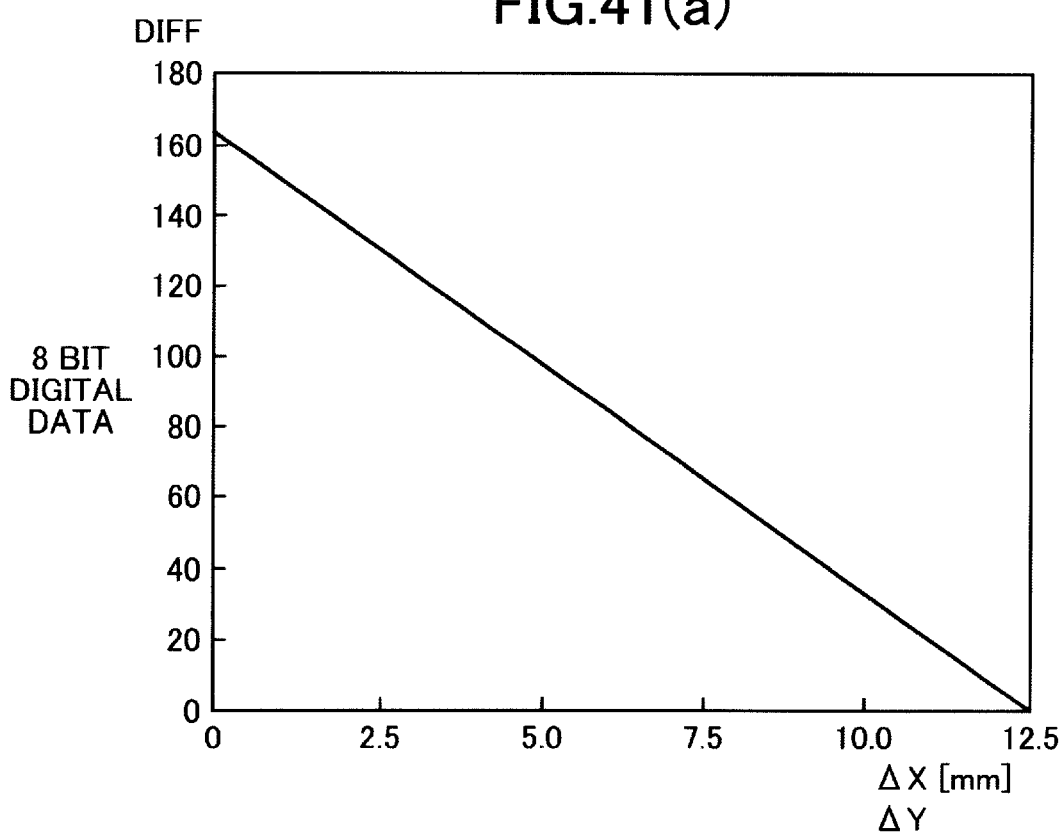
FIG. 41(a) is a graph representing a position coordinate table 58a according to the fourth embodiment.
Figure 42B:
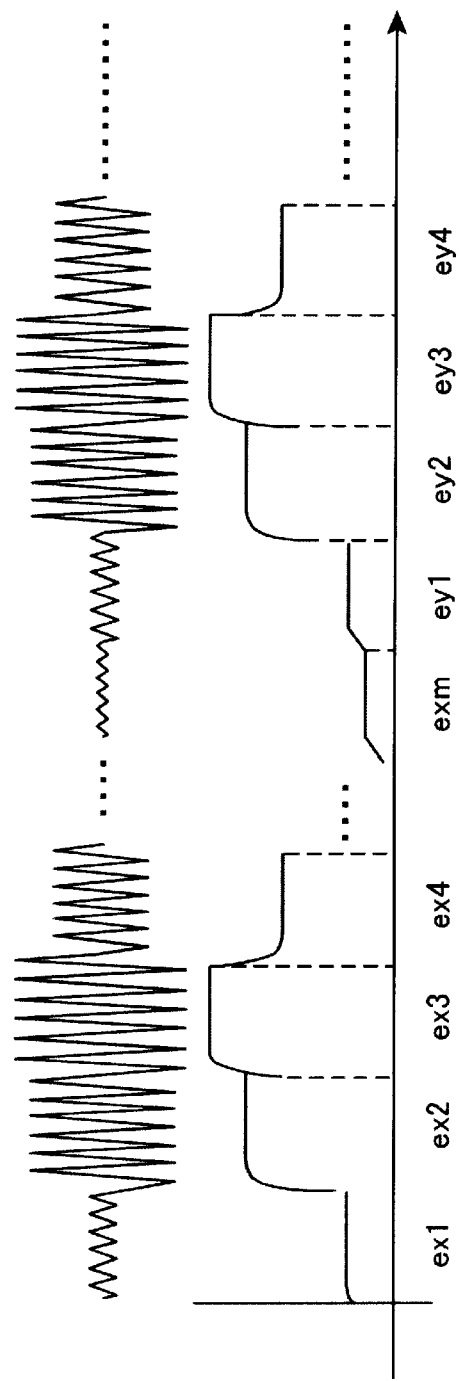
FIG. 42(b) illustrates signals A, B, and C in the block diagram of FIG. 8.

In this example, the sense coils 23 are arranged in the same manner as shown in FIG. 7(a) and 7(b) with the parameters P2X=680 mm, P2Y=980 mm, m=22, and n=34. Because the sense coils 23 have the width P1 of 50 mm and are arranged with the pitch of P1/2, the position coordinate table 58a is prepared as shown in FIG. 41(b) in the same manner as in the first embodiment. FIG. 41(a) shows the relationship between the coordinate offset values Δx, Δy and the voltage difference values DIFF in the position coordinate table 58a of FIG. 41(b).

In this example, in the pen 60 having the structure of FIG. 6(a), the coil L1 has a ring shape formed from 200 turns of windings with an inner diameter of about 15 mm and a length of about 15 mm. The coil L1 is mounted inside the pen 60 so that the coil L1 will be separated by about 20 mm from the tip of the pen tip 62 that abuts against the writing surface 21a of the writing panel 10.

According to the present embodiment, in the oscillation circuit 69 (FIG. 6(b)) of the pen 60, the CR oscillation circuit 69e is set with one of a plurality of different modulation frequencies fm in correspondence with one of a plurality of different attributes of the pen 60, as to color of ink stored in the ink cartridge 63 and thickness of the pen tip 62.

In this example, the central frequency of the carrier wave is 410 kHz. The frequency deviation is ±15 kHz. According to the present embodiment, the integrated circuit IC1 is a TOSHIBA TC7SLU04F. The integrated circuits IC2 and IC3 are both TOSHIBA TC7SLU04. Also, the MOS FET is a 2SK2158. The resistors R1 and R2 have both resistance of 1 MΩ. The resistor R3 has a resistance range of 0 to 1 MΩ. The capacitors C2, C3, C4, C5 are 2,700 pF, 1,000 pF, 270 pF, 100 pF, respectively. The battery 70 is LR44 with a voltage of about 1.5 V.

The relationship between the pen attributes (ink color and pen tip thickness) and modulation frequencies fm is set as shown in FIG. 42(a). In FIG. 42(a), "fine" refers to the pen tip 62 with a fine or thin tip, "thick" refers to the pen tip 62 with a thick tip. For example, "black thick" refers to an attribute of a pen that employs a thick pen tip 62 and that stores black colored ink in its ink cartridge 63. Because pens 60 with different characters (attributes) are designed to oscillate with different modulation frequencies fm, when the pen 60 with some attribute is used to write characters on the electronic white board 1 and to generate the alternating magnetic field, the electronic white board 1 recognizes the character of the pen 60.

It is noted that the eraser 40 is allocated with another modulation frequency fm, which is different from the modulation frequencies fm allocated to the pens 60, in order to allow the electronic white board 1 can recognize the eraser 40 when the eraser 40 is used to erase the images drawn on the electronic white board 1.

In the control portion 50 (FIG. 8), the portion of the amplified signal B, only in a required bandwidth, passes through the bandpass filter (BPF) 50d. Accordingly, the resultant signals have the same waveform as that of the carrier signals transmitted from the pen 60. It is noted that the carrier signals are frequency-shift-keying modulated according to the modulation frequency fm of the CR signal, and therefore have the waveform as shown in FIG. 44(a).

The amplified signals, having passed through the BPF 50d, are then received by the amplitude detection circuit 51 and the limitter circuit 54. Accordingly, the limiter circuit 54 converts the filtered, amplified signal (frequency-shift-keying modulated carrier wave) B into a square waveform shown in FIG. 44(a). The FSK demodulation circuit 55 demodulates the square wave of FIG. 44(a) and detects the period TA of the modulation frequency fm, at which the carrier wave is modulated.

Figure 43:
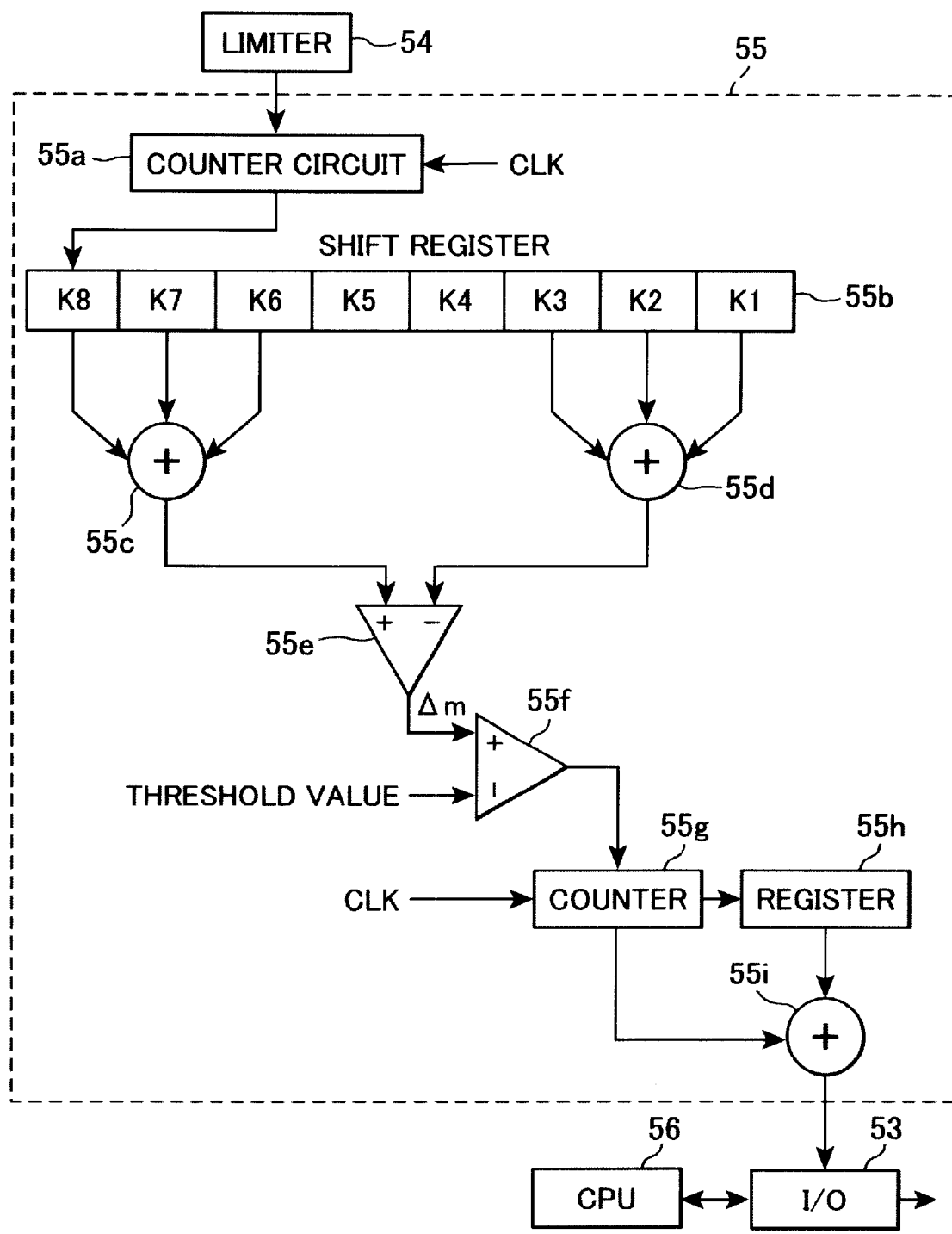
FIG. 43 is a block diagram showing an electrical configuration of a FSK demodulation circuit in the electronic white board of FIG. 8 according to the fourth embodiment.

As shown in FIG. 43, the FSK demodulation circuit 55 includes: a counter circuit 55a, a shift register 55b, a first average calculating circuit 55c, a second average calculating circuit 55d, a subtraction circuit 55e, and an absolute-value comparator 55f, a counter 55g, a register 55h, and an adding circuit 55i.

Figure 44A:
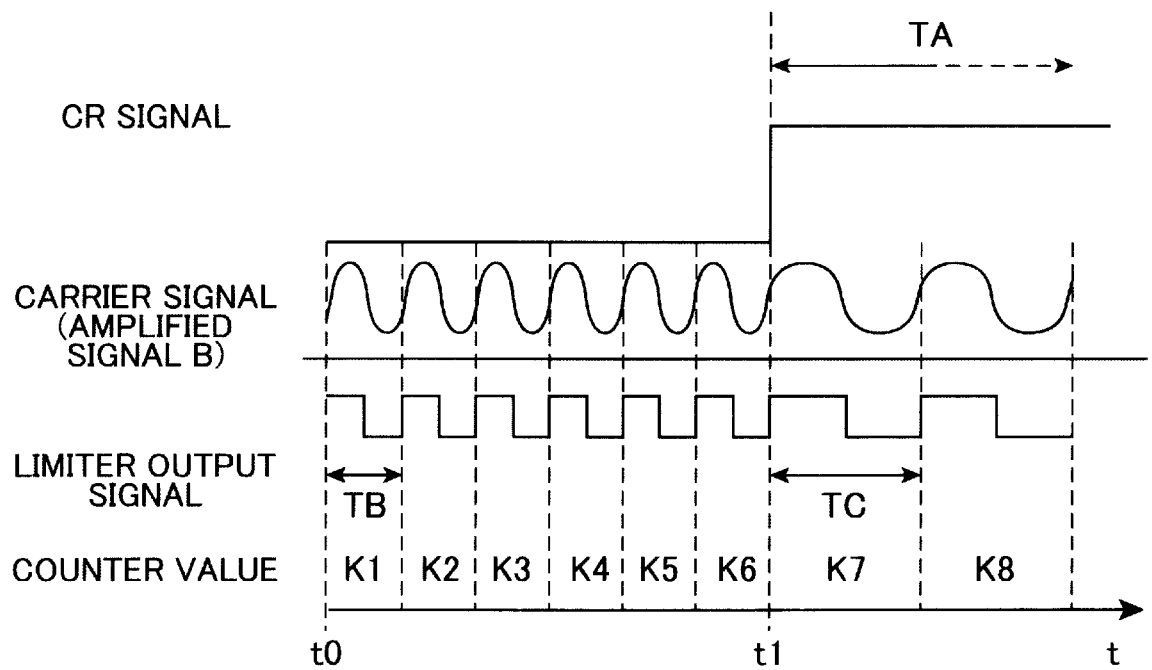

The counter circuit 55a is for counting the counter value K indicative of the duration of each period of the limitter output signal of FIG. 44(a). The shift register 55b, the first average calculating circuit 55c, the second average calculating circuit 55d, the subtraction circuit 55e, and the absolute-value comparator 55f are for cooperating to detect timing when the detected amount of the counter value K changes. The counter 55g, the register 55h, and the adder circuit 55i are for cooperating to measure the period from when the detected amount of the counter value K first changes, when the detected amount of the counter value K again changes, and until when the detected amount of the counter value K further changes, by calculating a sum (demodulated count number) of count numbers of counting the system clock signals. The adding circuit 55i is connected to the CPU 56 via the I/O circuit 53. The ROM 58 stores a table shown in FIG. 42(a) that is indicative of a relationship between the several pen attributes and corresponding demodulated count numbers, each demodulated count number being indicative of the duration of a single period for the corresponding modulation frequency fm. Accordingly, the CPU 56 can refer to the table of FIG. 42(a) to judge the pen attribute of the pen 60 based on the demodulated count number outputted from the adding circuit 55i.

It is noted that in this example, as shown in FIG. 44(a), the FSK circuit 69d in the pen 60 (FIG. 6(b)) is designed to modulate the carrier signals (from the LC oscillation circuit 69c) to a high frequency of, for example, 525 kHz while the CR signal (from the CR oscillation circuit 69e) is in a low level, and to a lower frequency of, for example, 395 kHz when the CR signal is in a high level. The amplified signals B having passed through the BPF 50d (FIG. 8) have the save waveform with the carrier signals modulated by the FSK circuit 69d and outputted from the pen 60. Accordingly, the limiter circuit 54 outputs the limiter output signal shown in FIG. 44(a) that has a period TB during a low level period of the CR signal (from the CR oscillation circuit 69e) and a period TC during the high level period of the CR signal (from the CR oscillation circuit 69e). The period TC is longer than the period TB.

The counter circuit 55a is for measuring each period TB or TC of the limiter output signal. That is, the counter circuit 55a counts, using a system clock provided by the CPU 56, the number K of the system clock signals (counter value) indicative of each period TB or TC of the limiter output signals. More specifically, when a rising edge of the limiter output signal is detected, the counter circuit 55a starts measuring the period until the next rising edge of the limiter output signal is detected. The counter circuit 55a then outputs the counter value K to the shift register 55b, and resets the counter value K to start the next counting. Thus, the counter circuit 55a measures the length TB or TC of one period of the limiter output signals.

The counter value K thus measured by the counter circuit 55a is either one of the values corresponding to the lengths TB and TC. The counter value K increases from a value corresponding to the length TB to the other value corresponding to the length TC when the CR signal changes from its low level to its high level. The counter value K decreases from the value corresponding to the length TC to the value corresponding to the length TB when the CR signal changes from the high level to the low level.

Accordingly, by detecting the timing at which the counter value K changes, the timing of the rising edge and the lowering edge of the CR signal can be detected. Because the time duration from when the counter value K changes to when it changes again is equivalent to a half of a single period of the CR signal. Therefore, by measuring the time from when the counter value K changes first time until when the counter value K changes third time, the duration of a single period of the CR signal can be determined. Accordingly, the modulation frequency fm can be determined, and the attribute of the pen 60 can be determined in accordance with the relationship between the modulation frequencies fm and the pen attributes (FIG. 42(a)).

Figure 44B:
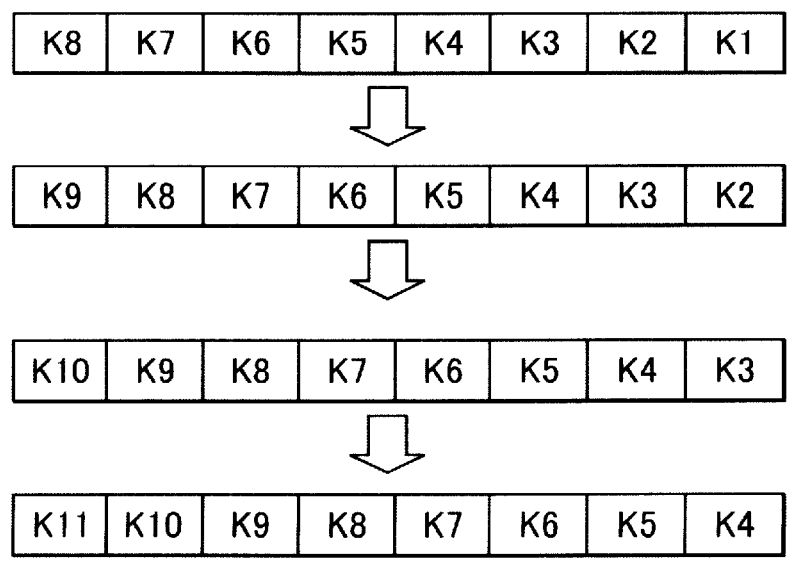
FIG. 44(b) illustrates how the counter values held in the shift register 55b are shifted.

According to the present embodiment, the shift register 55b is configured, as shown in FIG. 44(b), to store counter values K counted by the counter circuit 55a for eight successive periods Ki-7 to Ki of the limiter output signal. Each time a new counter value K (i+1) is inputted from the counter circuit 55a to the shift register 55b, all of the counter values K in the shift register 55b shift by one position and the counter value K (i-7) counted in the oldest period among the eight successive periods is discarded.

The first average calculating circuit 55c is for calculating an average of the latest counter value Ki, the second latest counter value Ki-1, and the third latest counter value Ki-2, and outputs the calculated average to the subtraction circuit 55e as a first mean value. The second average calculating circuit 55d is for calculating an average of the oldest counter value Ki-7, the second oldest counter value Ki-6, and the third oldest counter value Ki-5, and outputs the calculated average to the subtraction circuit 55e as a second mean.

The subtraction circuit 55e is for calculating a difference Δm between the first mean and the second mean, and outputs the difference Δm to the absolute-value comparator 55f. In the example shown in FIG. 44(b), at a first timing, the first average calculating circuit 55c calculates the mean value of the counter values K1 to K3. The second average calculating circuit 55d calculates the mean value of the counter values K6 to K8. In this case, each of the counter values K7 and K8, indicative of the length of the period TC, is longer than each of the counter values K1–K3 and K6, indicative of the length of the period TB. Therefore, the second mean value will be larger than the first mean value. Accordingly, when it is detected that the difference between the second mean value and the first mean value is thus large, then it is known that the level of the CR signal changes between the low level and the high level. By thus detecting the timing when the CR signal changes, the period of the CR signal, that is, the period of the modulation frequency fm can be detected.

It is noted that each of the average circuits 55c and 55d is designed to calculate an average of three counter values K which are obtained at three different timings separated from one another. Accordingly, even if one of the counter values K have been effected by noise, the overall effects of the noise will be small by the calculation of the average.

It should be noted that the first average circuit 55c and the second average circuit 55d are designed depending on the complexity of the circuitry and on the ratio between the frequency of the carrier wave (oscillation frequency of the LC oscillation circuit 69c) and the modulation frequency fm. The shift register 55b is designed to hold the total number of counter values K, indicative of the total number of periods of the limitter output signal, dependently on the ratio of the system clock frequency to the carrier wave frequency. The system clock frequency is set to a frequency that enables sufficient distinction in changes in frequency of the carrier wave.

The absolute-value comparator 55f is for comparing an absolute value of the difference Δm, outputted from the subtractor 55e, with a preset threshold value Th, to thereby judge whether or not the absolute value of the difference Δm is equal to or greater than the threshold value Th. The absolute-value comparator 55f outputs a threshold value judgement output in one of two different levels (high level and low level) according to the judgement results as shown in FIG. 45. More specifically, when the absolute value of the difference Δm is judged to be greater than or equal to the threshold value Th, the absolute-value comparator 55f changes the threshold value judgement output between a low level and a high level. Thus, the absolute value comparator 55f judges that the period of the limiter output signal has changed or said differently detects the rising or lowering edge of the CR signal.

For example, it is assumed that the counter circuit 55a counts the counter value K of ten (10) for the short period TB of the limiter output signal and counts the counter value K of sixteen (16) for the longer period TC. In the first row of FIG. 44(b), the calculation range by the first average circuit 55c and the second average circuit 55d reach the timing of the rising edge of the CR signal. In this case, all of the counter values K1 to K6 shown in FIG. 44(a) are ten (10). Therefore, the first mean value is equal to 10 ((K1+K2+K3)/3=10). Also, because the counter value K7 and the counter value K8 are both equal to 16, then the second mean value will be equal to 14 ((K6+K7+K8)/3=42/3=14). Therefore, the difference Δm obtained by the subtraction circuit 55e will be equal to −4 (10−14=−4).

If the threshold value Th is set to two (2), because 4 (absolute value of the difference Δm) is greater than 2

(threshold value m1), the threshold judgement output is changed between a low level and a high level. This level condition of the threshold value judgement output will be maintained until the absolute value comparator 55*f* judges that the absolute value of the difference Δm becomes equal to or greater than the threshold value Th next.

When the calculation range by the first average circuit 55*c* and the second average circuit 55*d* is shifted from the edge timing of the CR signal and reaches the timing when the period of the limiter output signal is fixed, both average calculating circuits 55*c*, 55*d* will calculate average values for the counter values K from the same periods. Therefore, the subtraction results by the subtraction circuit 55*e* will be equal to zero (0). In this case, the threshold value judgement output from the absolute-value comparator 55*f* will be continued unchanged as shown in FIG. 45.

When the calculation range by the first average circuit 55*c* and the second average circuit 55*d* again reaches the edge timing of the CR signal, the absolute value of the difference Δm becomes greater than the threshold value Th again, and the threshold judgement output is changed again between a low level and a high level.

The counter 55*g* is for using the system clock (SLK) to count the number of the system clock signals to thereby measure the time that the threshold judgement output is maintained at one of high and low levels, that is, a half period of the threshold judgement output. That is, when change in the threshold value judgment output is detected between a low level and a high level, the counter 55*g* starts counting until the threshold judgement output again changes between the high and low levels.

Figure 46A:
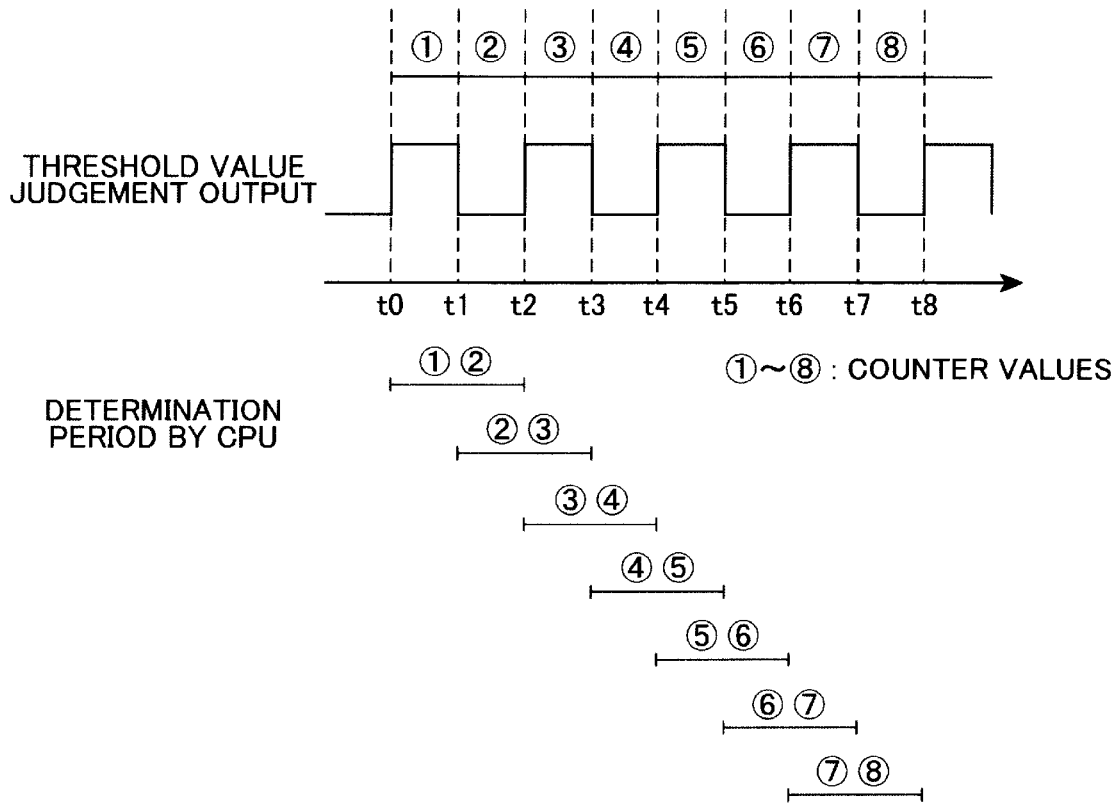
FIG. 46(a) shows the relationship between the threshold value judgement output by the absolute-value comparator 55f and the determination period by CPU.
Figure 46B:
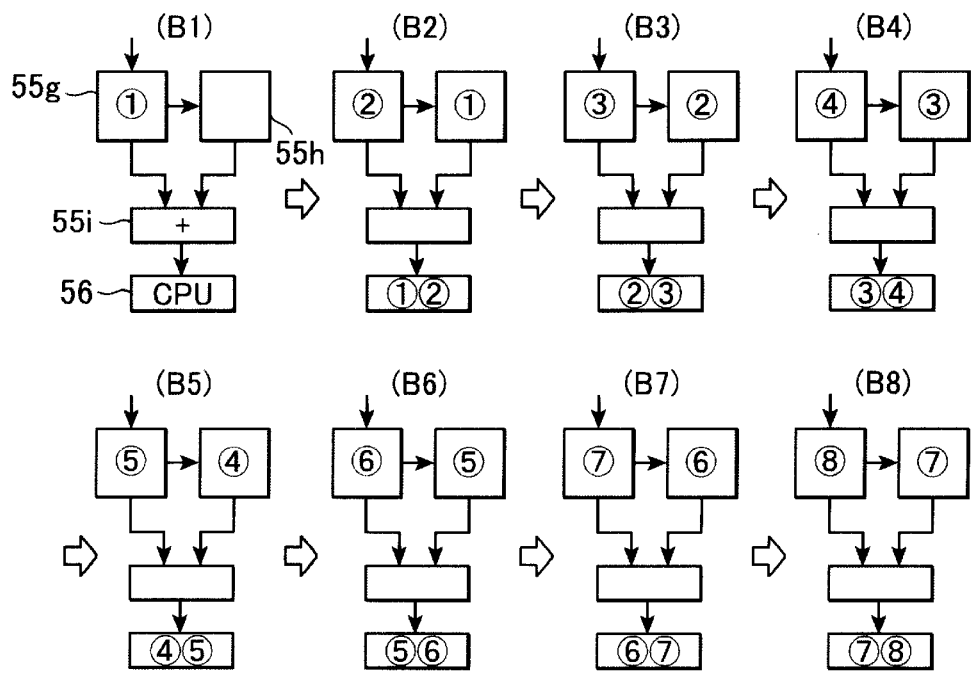
FIG. 46(b) illustrates how counter value K counted by counter 55g moves.

As shown in FIG. 46(*a*), it is assumed that the absolute-value comparator 55*f* first judges at a timing t0 that the absolute value of the difference Δm becomes equal to or greater than the threshold value Th. In other words, at the timing t0, the absolute value comparator 55*f* determines that the period of the limiter output signal has changed, and recognizes the rising edge of the CR signal. The absolute-value comparator 55*f* changes the threshold value judgement output from a low level to a high level. The absolute-value comparator 55*f* again judges at timing t1 that the absolute value of the difference Δm becomes equal to or greater than the threshold value Th. In other words, at the timing t1, the absolute value comparator 55*f* determines that the period of the limiter output signal has changed again, and recognizes the lowering edge of the CR signal. The absolute-value comparator 55*f* changes the threshold value judgement output from a high level to a low level. The counter value K counted by the counter circuit 55*g* between the timings t0 and t1 is ① as indicated in (B1) of FIG. 46(*b*). At the timing t1, the counter 55*g* then outputs the counter value ① to the register 55*h* as shown in (B2) of FIG. 46(*b*). The counter 55*g* then resets the counter value ①, and again counts a half period of the threshold value judgement output, that is, the time that the threshold value judgement output is maintained at a low level until the timing t2 when the threshold value judgement output again changes. In this example, the counter value measured between the timings t1 and t2 is indicated by ②.

Thus, the counter 55*g* will measure the lengths of successive periods t0–t1, t1–t2, t2–t3, . . . , and t7–t8, to thereby output counter values ① to ⑧ indicative of the lengths of the periods t0–t1, t1–t2, t2–t3, . . . , and t7–t8, respectively. In each period t0–t1, t1–t2, t2–t3, . . . , and t7–t8, the threshold judgment output is maintained at either the low or high level.

The adding circuit 55*i* determines that an adding timing has arrived when the counter values K have been held in both of the counter 55*g* and the register 55*h*. In this example, at the timing t2 when the counter value ① is held in the register 55*h* and the counter value ② is determined in the counter 55*g*, the adding circuit 55*i* adds the counter value ② held in the counter 55*g* and the counter value ① held in the register 55*h*, and outputs the sum ①+②, as a demodulated counter value, to the CPU 56. At the same time, the counter 55*g* outputs the counter value ② to the register 55*h* as indicated in (B3) of FIG. 46(*b*).

Thus, the CPU 56 reads the demodulated counter value (sum value ①+②) from the FSK demodulation circuit 55 via the input/output circuit 56, and judges the pen attribute based on the received demodulated counter value (sum value ①+②) while referring to the table shown in FIG. 42(*a*). For example, if the sum ①+② is 245, then the CPU 56 will judge the pen attributes to be black and thick as indicated in the table of FIG. 42(*a*).

In the same manner as described above, the adding circuit 55*i* adds the counter value ② for the duration t1–t2, now registered in the register 55*h*, to the counter value ③ for the duration t2–t3, newly counted in the counter 55*g*, and outputs the sum to the CPU 56 as indicated in (B3) in FIG. 46(*b*). These processes are repeated so that every time the threshold value judgement output changes between low and high levels, the counter value K of the counter 55*g* is outputted to the register 55*h*, and the adding circuit 55*i* adds the counter value K in the counter 55*g* to the counter value K held in the register 55*h* and outputs the sum to the CPU 56. That is, as shown in FIG. 46(*b*), the adding circuit 55*i* adds the counter value K, which is counted during the latest duration by the counter 55*g*, to the counter value K, which is counted during the duration immediately prior to the latest duration and which is held in the register 55*h*, and the sum is outputted to the CPU 56. For this reason, as shown in FIG. 46(*a*), the CPU 56 judges the pen attributes, based on the sum of the latest counter value K and the preceding counter value K, each half period of the threshold value judgement output. Accordingly, even if the scanning operation of the loop coils 23 is performed at a timing between times t0 and t1 shown in FIG. 46(*a*), it is unnecessary to wait for the next period of t2–t4. The counter sum can be determined for the time t1 to t3 that is after a half period elapsed from the time t1. Accordingly, the pen attribute can be judged immediately.

Accordingly, when the period of the limitter output signal changes as shown in FIG. 45, the counter circuit 55*a* starts counting the system clock signals each time a rising edge of the limitter output signal is detected. The absolute-value comparator 55*f* produces the threshold judgement output whose level changes in correspondence with the timing when the period of the limitter output signal changes. The counter 55*g* counts the system clock signals each time the level of the threshold judgement output changes. The adding circuit 55*i* calculates the duration of the successive two periods, during which the threshold judgement output is in high and low levels. The duration is indicative of the length of a single period required by the threshold judgement output to change two times. Thus, duration is indicative of the length of a single period of the CR signal where the level of the CR signal changes two times, and accordingly is indicative of the modulation frequency fm of the CR signal. Thus, if the modulation frequency fm of the CR signal is high, the level of the threshold judgement output highly frequently changes, and therefore the counter value counted by the counter 55*g* will be small. When the modulation frequency fm of the CR signal is less, the level of the threshold judgement output changes less frequently, and therefore the counter value counted by the counter 55g is large.

Next, the voltages induced by the sense coils 23 (FIG. 7(a)) will be described in greater detail.

Figure 47A:
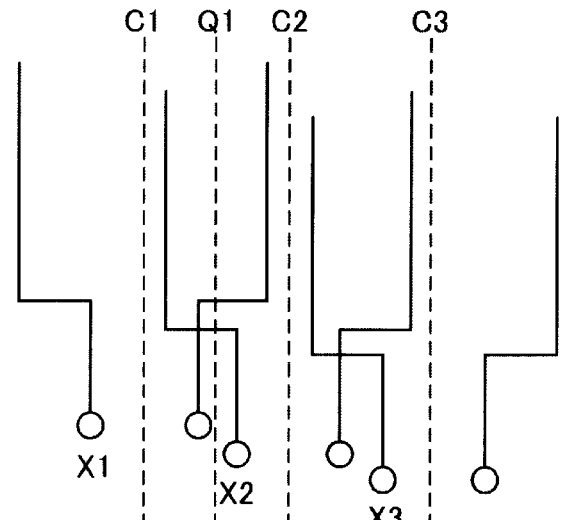
FIG. 47(a) is a schematic diagram showing relative positions of the X coils X1, X2, X3, according to the fourth embodiment.
Figure 47B:
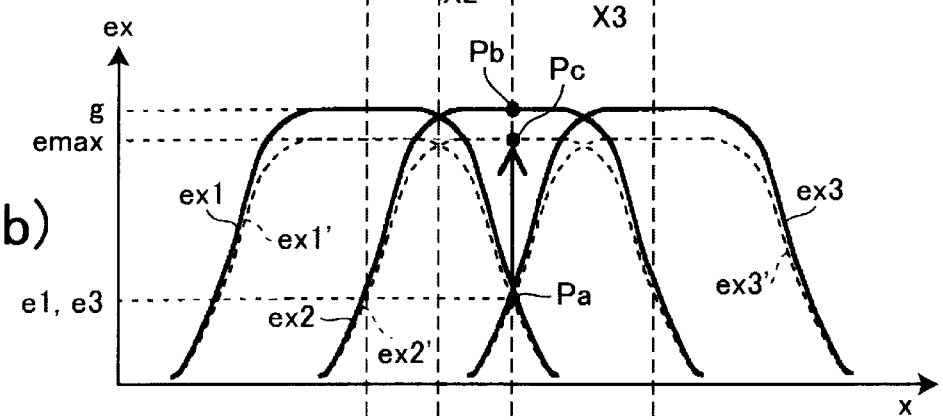
FIG. 47(b) is a graph representing induction voltage obtained by scanning the X coils X1, X2, X3 of FIG. 47(a)

As shown in FIG. 47(a), adjacent X coils X1, X2, X3 are arranged to overlap in the X coordinate direction by one half of their width P1. As shown in FIG. 47(b), voltages indicated by plots ex1, ex2, ex3 are induced at X coils X1, X2, X3 in accordance with the X coordinate position of the pen 60 when the pen 60 is supplied with a full electric charge. At point Pa of FIG. 47(b), then the voltage values induced at coils X1, X3 reach the same value as indicated by plots ex1 and ex3. Here, assuming that the conditions of the X coils X1, X2, X3 are the same, then the plots ex1, ex2, ex3 will have the same curve. Therefore, the point Pa where the plot ex2 and the plot ex3 intersect will represent the X coordinate of the center line C2 of the X coil X2. The maximum voltage value e(max) is induced by the X coil X2 when the pen is on the center line C2 of the X coil X2. Accordingly, it is assumed that when the voltage values e1, e3 are the same, the voltage e(max) induced at the coil X2 as indicated by point Pb is the maximum value. In this case, the voltage value e(max) equals the voltage of the reference value g.

Thus, the reference value g is defined as the induction voltage value e that is developed when the pen 60 is located on the center line C of an optional coil Xi under the condition that the battery 70 is completely charged and nothing is interfered with the induced voltage.

Figure 47C:
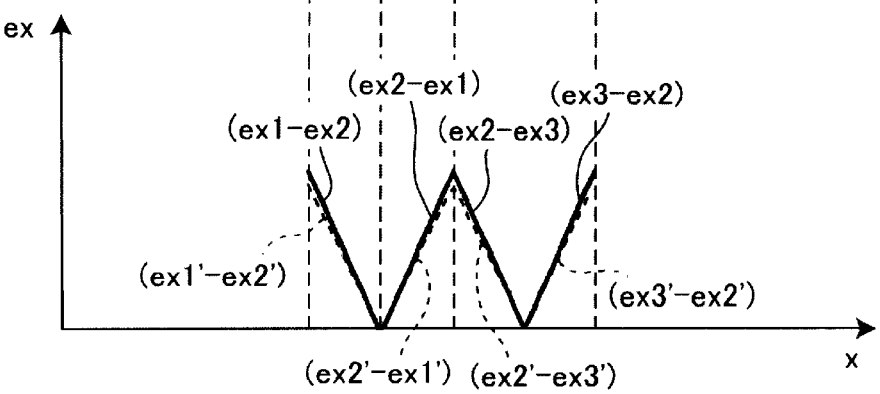
FIG. 47(c) is a graph representing difference in voltage between the adjacent X coils X1, X2, X3.

In this condition, as shown in FIG. 47(c), there are obtained optimal differences between voltage values of adjacent coils, which are represented in solid lines in FIG. 47(c) by plots (ex1−ex2), (ex2−ex1), (ex2−ex3), and (ex3−ex2). In the same manner as in the first embodiment, according to the present embodiment, the position coordinate table 58a is prepared as shown in FIG. 41(b) to indicate the optimum differences.

However, when the voltage supplied to the pen 60 drops, or when some flip chart or other object is attached to the writing surface 21a, then the voltage induced at the coil X2 may not match the predetermined reference value g even though the pen 60 is located on the center line C2. Accordingly, the voltages induced by the coils X1–X3 decrease as indicated in broken lines by the plots ex1', ex2', ex3'. In this case, even when the pen is located on the center line C2 and therefore the electric voltages e1', e3' are the same, the actually measured value MAX developed at the X coil X2 will be the voltage value indicated at point Pc. That is, the actually measured value MAX will be lower than the reference value g.

Also, as shown in FIG. 47(c), differences between voltage values of adjacent coils, which are represented in broken lines in FIG. 47(c) by plots (ex1'−ex2'), (ex2'−ex1'), (ex2'−ex3'), and (ex3'−ex2'), will differ from the optimal differences, which are represented in solid line in FIG. 47(c) by plots (ex1−ex2), (ex2−ex1), (ex2−ex3), and (ex3−ex2).

Figure 48:
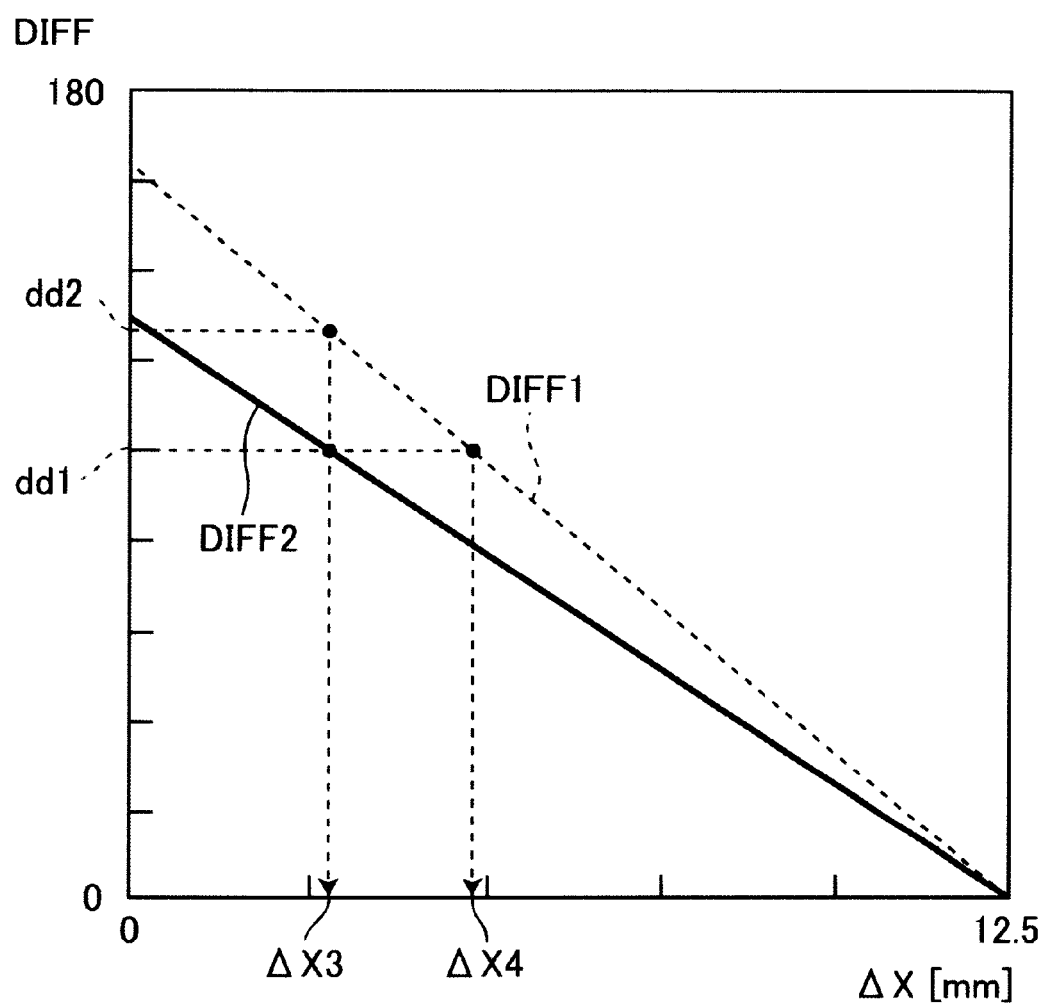
FIG. 48 is a graph showing the relationship between voltage differences and the pen position obtained when the voltage in the battery of the pen drops.

FIG. 48 is a graph representing change in voltage induced by the pen 60 in accordance with distance from the center line C of each X coil X. The horizontal axis of the graph in FIG. 47 represents distance ΔX[mm] from the center line C of each X coil X, and the vertical axis represents the difference DIFF of 8-bit digital data in the amplitudes obtained at the maximum and second maximum sense coils when the pen 60 is separated from the center line C by various distances. The broken line plot DIFF1 represents change in voltage difference with distance when a full voltage is supplied to the pen 60. In other words, the broken line plot DIFF1 shows the position coordinate table 58a shown in FIG. 41(a).

Contrarily, the solid line plot DIFF2 represents change in voltage difference with distance when less than a full voltage is supplied to the pen 60. As shown in FIG. 48, when a full charge is supplied to the pen 60, then the amplitude difference DIFF will be the optimum value represented by the reference value g when the pen 60 is located on the center line C, that is, when the distance ΔX [mm] is zero. The amplitude DIFF will be dd2 when the pen 60 is located at position ΔX3, and will be dd1 when the pen 60 is located at position ΔX4.

However, when the pen 60 is supplied with less than a full voltage as indicated by plot DIFF2, then when the pen 60 is located on the center line C, the amplitude difference DIFF will be about a value dd2, which is less than the optimum value represented by the reference value g. Similarly, the amplitude difference DIFF will be dd1 when the pen 60 is located at position ΔX3. Accordingly, unless the reduction in voltage is taken into account, it will be assumed that the pen 60 is located a distance ΔX4 from the center line C even when the pen 60 is actually located at position ΔX3.

Thus, the correct position of the pen 60 cannot be determined if the distance ΔX is determined based on the position coordinate table 58a shown in FIG. 41(b), which is prepared based on the graph shown in FIG. 41(a). However, the correct distance ΔX3 can be determined even if the voltage supplied to the pen 60 drops, by correcting the 8-bit digital value dd1 detected from voltage values obtained during scanning of the X coils into the 8-bit digital value dd2 based on the drop in voltage as shown in FIG. 48.

According to the present embodiment, therefore, this correction is performed in a manner described below.

First, the reference value g, shown in FIG. 47(b) is detected when the pen is fully charged, and is stored in the ROM 58.

When the actually measured value MAX is detected as described above, the measured value MAX is compared with the reference value g. Then, the reduction in voltage is calculated by dividing the reference value g by the voltage value MAX. This produces a correction value r. By multiplying the difference DIFF in voltage values obtained during actual scanning operations by the correction constant r, the correct distance ΔX3 can be determined using the position coordinate table 58a (FIG. 41(b)), even though this position coordinate table 58a is prepared based on the reference value g.

Although this correction procedure has been explained for X coils, the same procedures can be used for the Y coils, so its explanation will be omitted.

Figure 49:
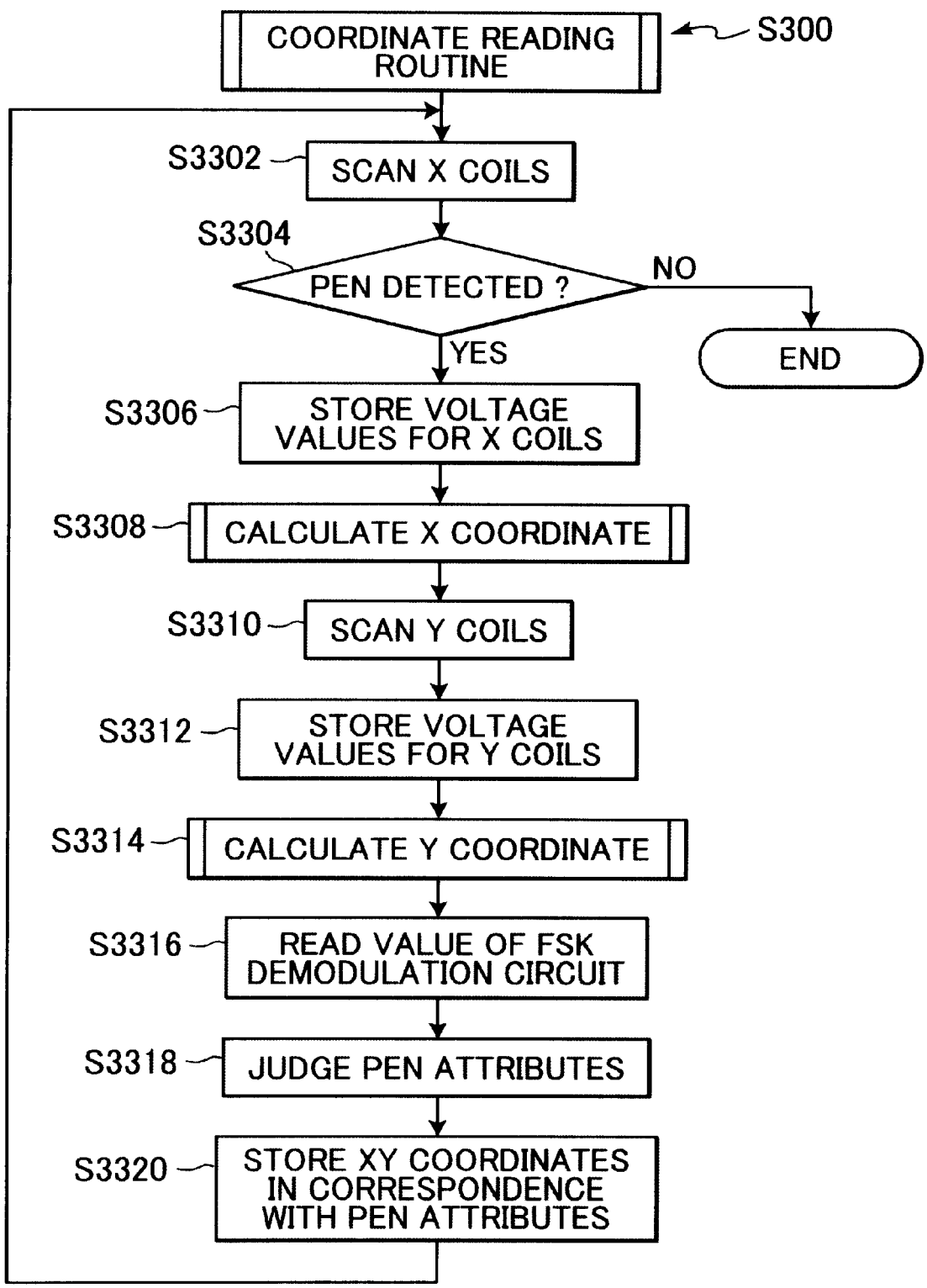
FIG. 49 is a flowchart of the coordinate reading process of S300 in FIG. 14 according to the fourth embodiment.

According to the present embodiment, the coordinate reading process of S300 in FIG. 14 is performed as shown in FIG. 49.

That is, when the coordinate reading routine is started, then X coils are first scanned in S3302. More specifically, the X coils X1 to Xm are scanned by the coil selection signal A (FIG. 42(b)) in this order. If no pen 60 is detected (S3304:NO), then the coordinate reading process of S300 is ended, and the routine proceeds to the page routine of S400 (FIG. 14). If the pen 60 is detected (S3304:YES), then in S3306, the voltage values of all the X coils and Y coils are stored in the RAM 59. More specifically, the voltage values ex(1)−ex(m) from the X coils X1−Xm are stored in association with the corresponding coil numbers (1)−(m) in the temporary storage area 59a as shown in FIG. 41(c). Once the voltage values for the X coils are thus stored in S3306, then the X coordinate calculation routine is performed in S3308.

When the X coordinate is obtained in S3308, then Y coils are scanned in S3310. More specifically, the Y coils Y1 to Yn are scanned by the coil selection signal A (FIG. 42(b)) in this order. Then, in S3312, the voltage values ey(1)–ey(n) from the Y coils Y1–Yn are stored in association with the corresponding coil numbers (1)–(n) in the temporary storage area 59a. Once the voltage values for the Y coils are thus stored in S3312, then the Y coordinate calculation routine is performed in S3314.

When the Y coordinate calculation routine of S3314 is completed, then the routine for reading values from the FSK demodulation circuit 55 is performed in S3316, and a routine for determining the pen attribute is performed in S3318.

Then, in S3320, the CPU 56 stores the pen attributes in association with the X and Y coordinates in the RAM 59. Then, the program returns to S3302.

Next, operations of the X coordinate calculation routine in S3308 will be described while referring to the flowcharts in FIG. 50.

First, in S802, the CPU 56 stores, in the RAM 59, the maximum voltage value e(max) and the coil number (max) of the maximum voltage X coil X(max). In S804, the CPU 56 stores, in the RAM 59, the coil number (max−1) of the X coil X(max−1) that is adjacent to the maximum voltage X coil X(max) in the negative direction along the X axis. The CPU 56 further stores, in the RAM 59, the voltage value e(max−1) of the X coil X(max−1). In S806, the CPU 56 stores, in the RAM 59, the coil number (max+1) of the X coil X(max+1) that is adjacent to the maximum voltage X coil X(max) in the positive direction along the X axis. The CPU 56 further stores, in the RAM 59, the voltage value e(max+1) of the X coil X(max+1).

Then, in S808, the CPU 56 judges whether the voltage value e(max−1) is equal to the voltage value e(max+1). If e(max−1)=e(max+1) (Yes in S808), the CPU 56 sets the voltage value e(max) as a measured value "MAX". Then, the CPU 56 retrieves the reference value g from the ROM 58, and calculates a correction coefficient r=g/MAX by dividing the reference value g by the measured value MAX. Thus, the correction value r is calculated as a ratio of the reference value g to the actually measured value MAX. The calculated correction value r is stored in the RAM 59.

Thus, when the induction voltage value detected from coils (max−1) and (max+1) on either side of an optional loop coil are the same value (S808:YES), then the voltage value e(max) actually induced at the coil (max) that indicates the largest voltage value is set as the actual voltage value MAX. The position that has obtained the voltage value e(max), which is in this case the actual voltage value MAX, is located on the center line C of the optional coil (max).

In S810, the actually measured value MAX is compared with a predetermined reference value ALM to determine whether the measured value MAX is less than or equal to the reference value ALM. It is noted that the reference value ALM represents the limit up to where calibration correction enables reading of correct coordinates. Therefore, when the actually measured value MAX exceeds the reference value ALM (S810:NO), then this means that a proper coordinate can be obtained using calibration correction techniques. Therefore, the routine proceeds to S812.

On the other hand, when the actually measured value MAX is less than or equal to the reference value ALM (S810:YES), then this means that accurate coordinates cannot be guaranteed even if calibration and correction techniques are executed. Therefore, the battery warning LED 39d on the writing panel 10 is illuminated or flashed for a predetermined duration of time to warn the user that the battery charge is too low. The speaker 31 can be driven to produce a warning sound at the same time. It should be noted that the user is only warned that the battery charge is too low. Other processes continue without stopping. That is to say, when MAX≦ALM (Yes in S810), then there is a potential that proper coordinates cannot be obtained. On the other hand, there are many cases when proper coordinates can be obtained or coordinate values can be read with a certain amount of positional error. Such potentially defective data is therefore retained to electronically represent the actual information on the writing surface 21a. Therefore, the user is only warned about the low battery charge situation in S811, while other processes in flowchart of FIG. 50 continue as usual. That is, the program proceeds to S812.

On the other hand, when the voltage value e(max−1) is different from the voltage value e(max+1) (no in S808), the program directly proceeds to S812.

In S812, the CPU 56 compares the voltage values e(max−1) and e(max+1) with each other. If e(max−1)>e(max+1) (S812:YES), it is known that the coil X(max−1) is the second maximum voltage coil X(max2). Accordingly, in S818, the coil X(max−1) is set as the coil X(max2), and the value "SIDE" is set to −1. In S820, the difference value DIFF is calculated by subtracting the voltage value e(max−1) (=e(max2)) from the maximum voltage value e(max) and by multiplying the subtracted result by the correction coefficient "r" that is now stored in the RAM 59.

On the other hand, if e(max−1)≦e(max+1) (S812:NO), it is known that the coil X(max+1) is the second maximum voltage coil X(max2). Accordingly, then in S814, the coil X(max+1) is set as the coil X(max2), and the values "SIDE" is set to 1. In S816, the difference value "DIFF" is calculated by subtracting the voltage value e(max+1) (=e(max2)) from the maximum voltage vale e(max) and by multiplying the subtracted result by the correction coefficient "r" that is now stored in the RAM 59.

Thus, in S812, S814, S816, S818, and S820, the following formula is calculated:

$$DIFF=r\times[e(\max)-e(\max2)]$$

The value "SIDE" is set in the same manner as in the first embodiment.

Next, in S822, the CPU 56 refers to the position coordinate table 58a (FIG. 41(b)), and selects a positional coordinate ΔX that corresponds to a value DIFF that is closest to the calculated value DIFF. The CPU 56 then sets the selected positional coordinate ΔX as a value "OFFSET" in S822. Then, in S2824, the CPU 56 determines the X coordinate X of the pen by calculating the formula (2) described in the first embodiment. Thus, the x coordinate calculating routine of S3308 is completed.

Although not shown in the drawing, the y coordinate calculating routine of S3314 is conducted in the same manner as in the x coordinate calculating routine of S3308.

As described above, according to the present embodiment, if the pen is located on the center line C2 of the coil X2 as shown in FIG. 47(a), even when the output of the pen 60 decreases, the values of the voltages (plots ex1' and ex3') induced at the coils X1 and X3 are the same with each other at point Pa. Accordingly, the value of the voltage induced at the coil X2 (the point Pc in the plot ex2' on the X coordinate position the same as the point Pa) is regarded as a maximum voltage MAX. Detected voltage values are corrected by a ratio r of the maximum voltage MAX relative to the predetermined reference voltage value g (point Pb) that is predetermined for the design of the writing panel.

Figure 50:
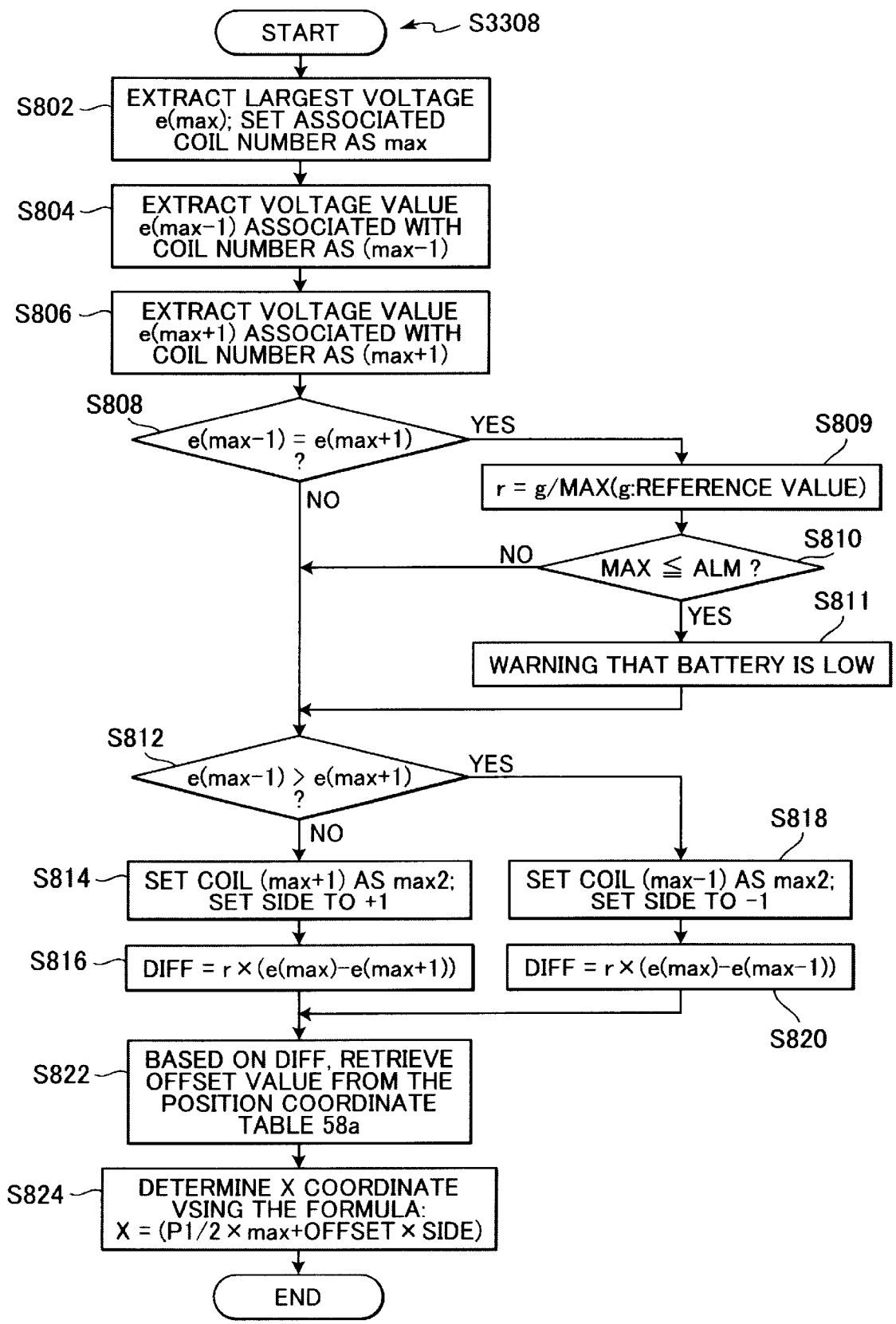
FIG. 50 is a flowchart of the X coordinate calculation routine of S3308 in FIG. 49.

More specifically, as shown in the flowchart of FIG. 50, first in S802, the voltage values detected during the X coil scan of the S3302 are compared to one another to determine the coil (max) that indicates the largest voltage value e(max). If the values e(max+1)=e(max−1) (yes in S808), the coefficient value r is determined by dividing the reference value g by the largest voltage value e(max) (=MAX). The coil (max2) with the second largest voltage value e(max2) is determined in S812. Then, the value SIDE, which indicates the direction from the center line C of the coil (max), is determined based on the relationship between the maximum voltage value e(max) and the second largest voltage value e(max2) in S814, S818. Then, the value DIFF is determined based on difference between the maximum voltage value e(max) and the second maximum voltage value e(max2) and the correction value r in S816 or S820. Then the coordinate value OFFSET is determined in S822 by referring to the position coordinate table 58*a*. Then, the X coordinate is determined in S824 based on the distance and direction from the center line C of the coil (max).

Next will be described the process of S3316 (FIG. 49) to read demodulation counter values from the FSK demodulation circuit 55.

Figure 51A:
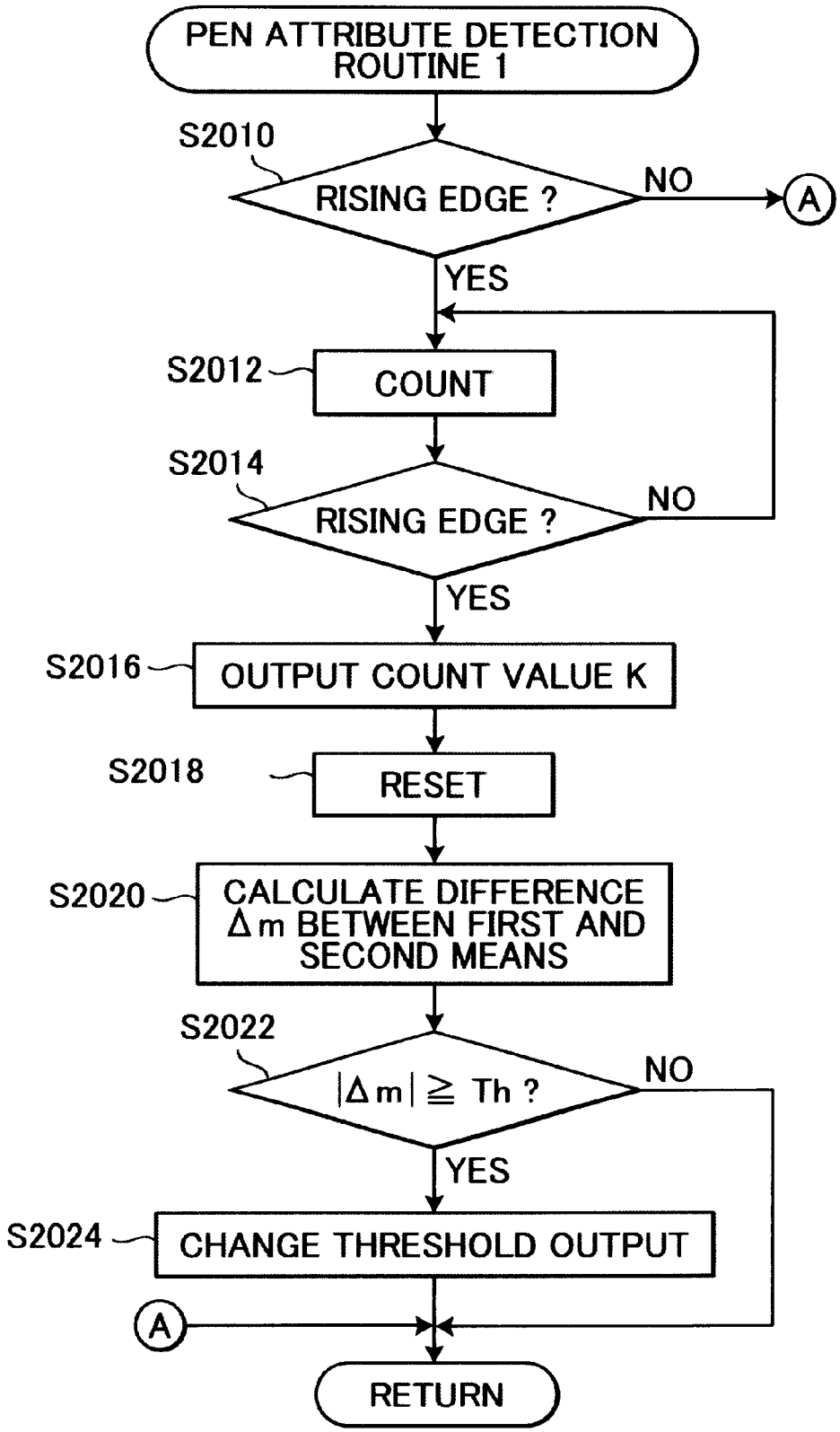
FIG. 51(a) is a flowchart of a first pen attribute detection process executed by the counter circuit 55a, the shift register 55b, the average calculating circuit 55c, 55d, the subtracting circuit 55e, and the absolute-value comparator 55f in the FSK demodulation circuit 55.
Figure 51B:
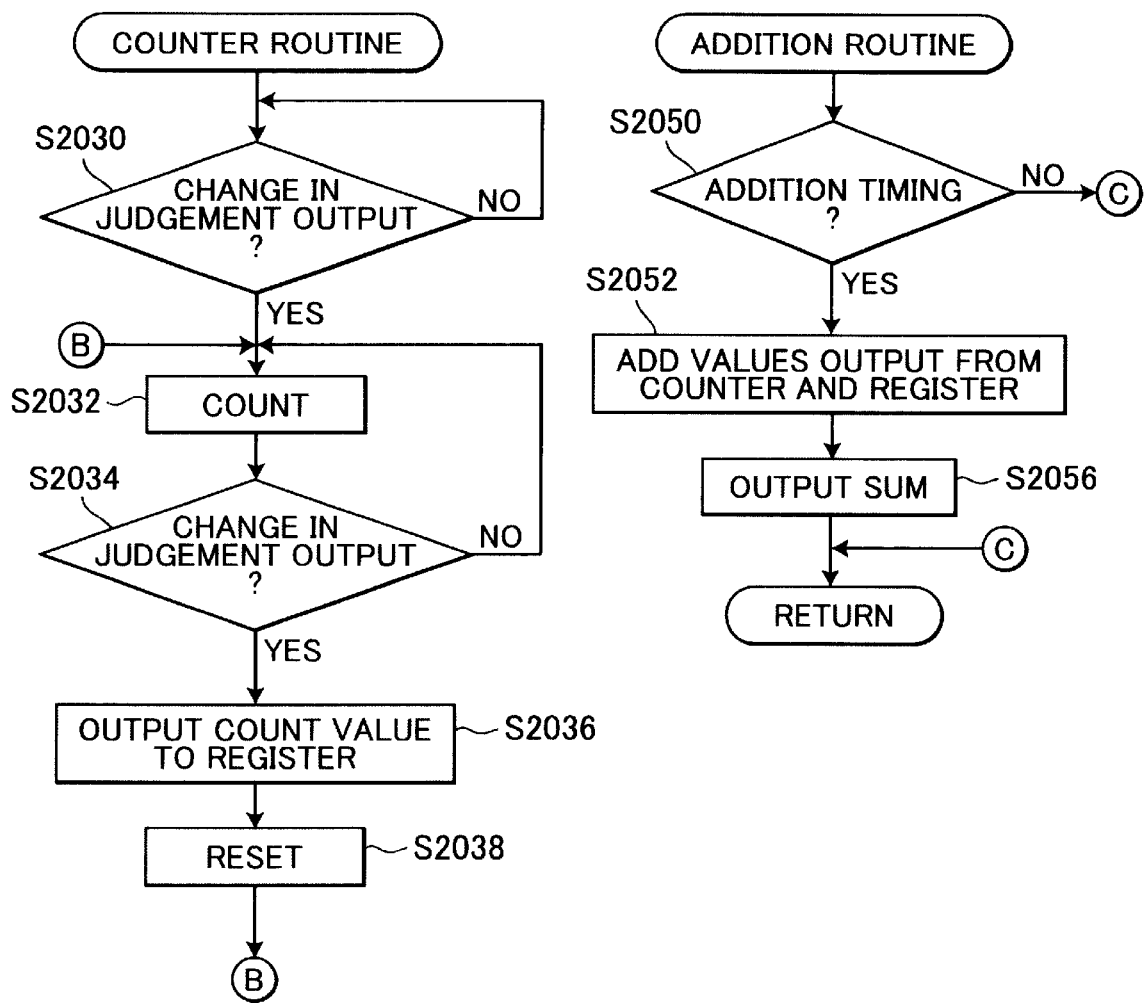
FIG. 51(b) shows flowcharts of a second pen attribute detection process, which includes a counting process by the counter 55g and an adding process by the adder 55i.

In the FSK demodulation circuit 55, the counter circuit 55*a*, the shift register 55*b*, the average calculating circuit 55*c*, 55*d*, the subtracting circuit 55*e*, and the absolute-value comparator 55*f* perform a first pen attribute detection process shown in FIG. 51(*a*). The counter 55*g*, the register 55*h*, and the adding circuit 55*i* perform a second pen attribute detection process shown in FIG. 51(*b*).

The first and second pen attribute detection processes will be described while referring to FIGS. 51(*a*) and 51(*b*).

As described already, the amplified signals having passed through the band pass filter 50*d* are supplied not only to the amplitude detection circuit 51 but also to the limiter circuit 54. The signals are converted by the limiter circuit 54 into a limiter output signal with the square waveform shown in FIG. 44(*a*). The limiter output signal is supplied to the FSK demodulation circuit 55.

As shown in FIG. 51(*a*), when the FSK demodulation circuit 55 detects a rising edge of the limiter output signal (S2010:YES), then in S2012, the counter circuit 55*a* starts counting the number of the system clock (CLK) to measure the period of the limiter output signals. When the next rising edge of the limiter output signals is detected (S2014:YES), then in S2016, the counter value K by the counter circuit 55*a* is outputted to the shift register 55*b*. Then, in S2018, the counter value K of the counter circuit 55*a* is reset. Thus, the counter circuit 55*a* measures the length TB or TC of a single period of limiter output signal shown in FIG. 44(*a*).

The thus newly produced counter value K is inputted into the shift resister 55*b* so that counter values K obtained during eight successive periods are stored in the shift register 55*b*. Each time the new counter value K is inputted to the shift register 55*b*, all of the counter values K in the shift register 55*b* are shifted one position and the oldest counter value K is discarded. The first average circuit 55*c* calculates an average from the latest counter value K to the third latest counter value K, and outputs the calculated mean value to the subtraction circuit 55*e* as the first mean value. The second average calculating circuit 55*d* calculates an average of the oldest counter value K to the third oldest counter value K, and outputs the calculated mean value to the subtraction circuit 55*e* as a second mean value.

Next, in S2020, the subtraction circuit 55*e* calculates the difference Δm between the first mean value and the second mean value, and outputs the difference Δm to the absolute-value comparator 55*f*. Then, in S2022, the absolute-value comparator 55*f* compares the absolute value of the difference Δm with the preset threshold value Th to judge whether or not the absolute value of the difference Δm is equal to or greater than the threshold value Th. If the absolute value of the difference Δm is judged to be greater than or equal to the threshold value Th (S2022:YES), then in S2024, a threshold value judgement output, to be outputted from the absolute-value comparator 55*f*, is changed between a low level and a high level.

As shown in FIG. 51(*b*), when the counter 55*g* detects the change in the threshold judgment output between a low level and a high level (S2030:YES), then in S2032, the counter 55*g* starts counting the system clock (SLK) pulses to measure the time that the threshold judgement output is maintained at the present level, that is, the half period of the threshold judgement output.

When the absolute value converter 55*f* again judges that the absolute value of the difference Δm is equal to or greater than the threshold value Th (S2022:YES), then in S2024, the absolute value comparator 55*f* again changes the threshold value judgement output between a high level and a low level. At the same time, the counter 55*g* detects in S2034 that the threshold value judgement output changes again (S2034:YES). Then, in S2036 the counter 55*g* outputs its counter value to the register 55*h*. Next, in S2038, the counter 55*g* resets the counter value. The counter 55*g* then again starts counting in S2032 the half period of the threshold value judgement output, that is, the time that the threshold value judgement output is maintained at the present level.

The adding circuit 55*i* determines whether the adding timing has arrived by detecting the timing when the counter values are inputted to both the counter 55*g* and the register 55*h*. When counter values are inputted to both the counter 55*g* and the register 55*h* for a certain timing (S2050: YES), then in S2052, the adding circuit 55*i* adds the counter value now held in the counter 55*g* to the counter value now held in the register 55*h*. The adding circuit 55*i* then outputs the sum value to the CPU 56 in S2056. At this time, the counter 55*g* outputs in S2036 the next counter value to the register 55*h*.

Accordingly, in S3316 (FIG. 49), the CPU 56 reads the sum value from the adding circuit 55*i*, that is, the demodulation counter value of the FSK demodulation circuit 55, through the input/output circuit 53.

In S3318, the CPU 56 determines the pen attributes based on the retrieved sum value while referring to the table of FIG. 42(*a*). For example, if the sum value is 245, then the CPU 56 will judge the pen attributes to be black and thick.

Then, in S3320, the CPU 56 stores the pen attributes in association with the X and Y coordinates in the RAM 59. The thus stored written data (X and Y coordinate data and the pen attribute data) will be outputted to the printer 200, for example, which in turn prints the characters or figures in a manner corresponding to the pen attribute. For example, if the pen attribute is black and thick, the printer 200 will print the characters or figures in thick black font. Also, the written data could be outputted to the personal computer 100 and displayed on the monitor 103 in the thick black font. Thus, the written data is reproduced according to the attributes of the pen 60.

In this way, the X and Y coils are repeatedly scanned in S3302 and S3310. When the user starts writing images on the writing surface 21*a* using the pen 60, the pen 60 is detected for the first time (S3304:YES). Then, S3302 to S3320 are repeatedly executed until the pen 60 is separated from the writing surface 21a so that the pen 60 is no longer detected (S3304:NO). The pen attributes and the X and Y coordinates for the pen 60 are stored in association with each other in a locus memory area (not shown) prepared in the RAM 59. Each set of X and Y coordinates is indicative of a position (pen position) defined on a dot matrix, on which a plurality of dot positions are arranged in the X and Y axial directions. In this way, the coordinate detection routine of S300 is ended.

As described above, according to the present embodiment, when the pen 60 is located on the writing surface 21a at a position that induces the same induction voltage value e in two loop coils 23 that are adjacent to a target loop coil 23, then the voltage value e(max) induced in the target loop coil at that coordinate, that is, where the voltage value of the adjacent coil match, is set as the actually measured value MAX. The ratio between the actually measured value MAX and the predetermined reference value g is used to determine the correction value r. Based on the correction value r, the detected voltage values e can be corrected, so that proper coordinate values can be calculated. For this reason, even if the voltage supplied to the pen 60 drops, accurate coordinates of the pen 60 can be read.

Also, because the loop coils 23 overlap by half of their width P1, a signal that is sufficiently large for calibration can be obtained from the loop coils located on either side of the target first loop coil. Therefore, accurate calibration can be performed.

Further, the correspondence relationship between distances OFFSET and voltage values DIFF are prestored in the position coordinate table 58a. The distances OFFSET represent distances from an optional loop coil 23. The voltage values DIFF are voltages induced when the pen 60 is at the position indicated by the OFFSET. The correspondence relationship in the position coordinate table 58 is based on the predetermined reference value g. The calibration operation is performed to compare the reference value g with a voltage value MAX that is considered to be the maximum voltage value of those actually measured. Based on the ratio between the reference value g and the maximum voltage value MAX, the voltage value e retrieved from any loop coils can be corrected. Therefore, the position coordinate table 58 can be used to accurately determine the present position of the pen 60, even if the power supply to the pen 60 drops. Processes can be rapidly performed.

The CPU 56 can detect when the voltage value MAX, which is the maximum induced voltage, is equal to or less than the predetermined value ALM, which is prestored in the storage region of the ROM 58. The battery warning LED 39b or the speaker 31 can be used to notify the user when the maximum induction voltage value MAX is equal to or less than the predetermined value ALM. Therefore, the user can be notified when, even though the pen 60 is located on the writing surface 21a, a required amount of induction voltage is not induced in any of the loop coils 23 because the voltage of the battery 70 has dropped or because some object, such as a flip chart, interferes with transmission of signals. Also, no discrepancy will exist between the figures and symbols actually written on the board, in ink for example, and electrically read data.

While the invention has been described in detail with reference to the specific embodiments thereof, it would be apparent to those skilled in the art that various changes and modifications may be made therein without departing from the spirit of the invention.

For example, the values of the lengths P2X and P2Y, width P1, and pitch P1/2 of the sense coils are not limited to those values described above in the embodiments and modifications.

The process of the first embodiment can be modified as described below.

Figure 52:
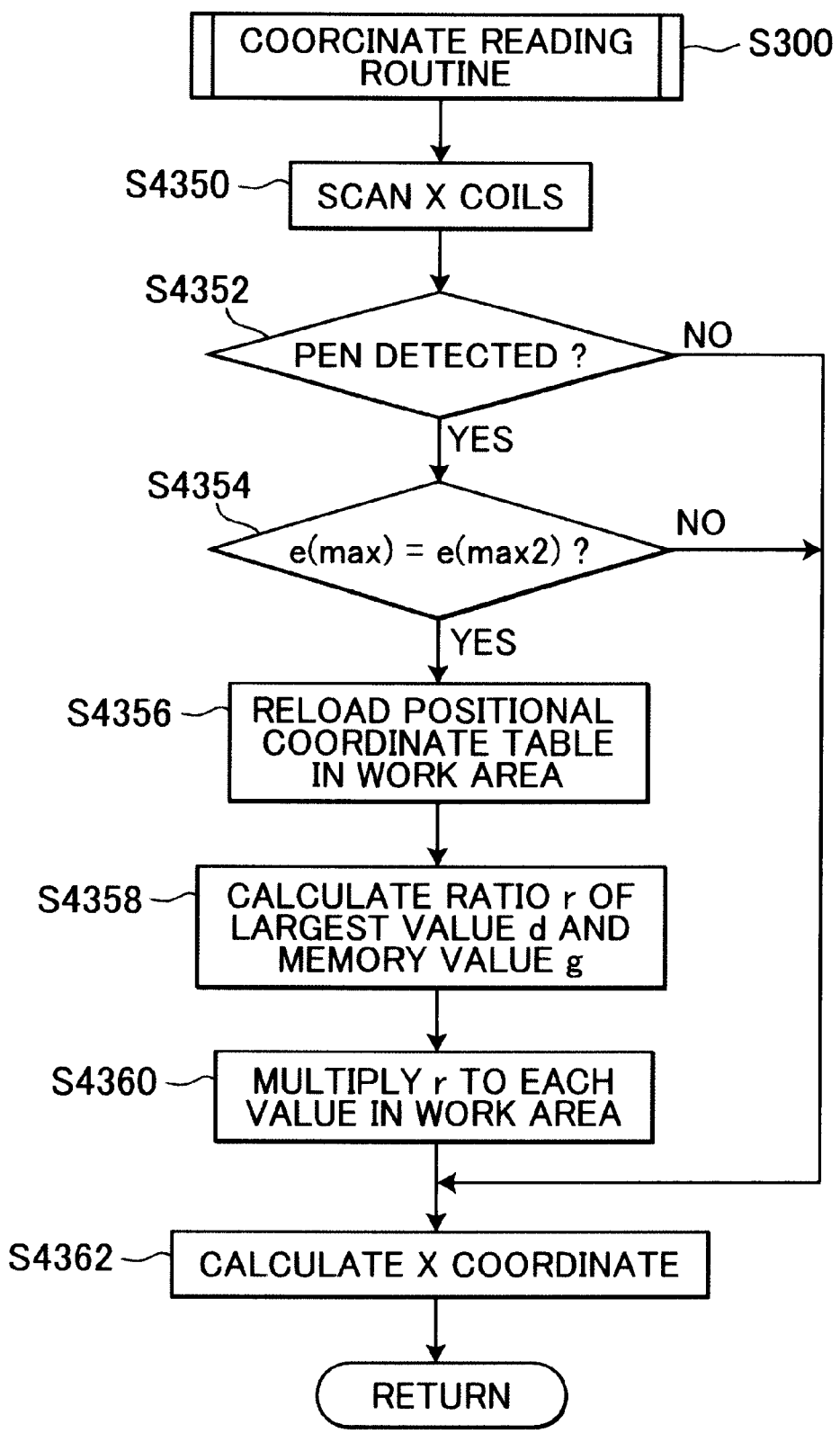
FIG. 52 is a flowchart of a coordinate reading process of S300 according to another modification of the first embodiment.

According to the present modification, as shown in FIG. 52, first in S4350, the CPU 56 scans all of the X coils X1–Xm. If the pen 60 is detected (S4352:YES), then in S4354, all the voltage values e(1) to e(m), detected at all the X coils X1–Xm, are stored in the RAM 59, and then the CPU 56 selects the maximum voltage coil X(max) that has produced the largest value e(max) among all the voltage values e(1) to e(m). The CPU 56 judges whether or not one of the two adjacent coils X(max−1) and X(max+1) is a coil X(max2) that has generated the voltage, whose value is greater than that from the other coil and whose value is the same as the voltage e(max) of the maximum voltage coil X(max). More specifically, in S4354, the CPU first judges which of the voltages e(max−1) and e(max+1) is greater than the other, and sets the greater one as e(max2). The value e(max2) is the second maximum voltage among all the values e(1) to e(m). The CPU 56 further judges in S4354 whether the second maximum voltage (max2) is equal to the maximum value (max). If the second maximum voltage (max2) is equal to the maximum value (max) (S4354:YES), then in S4356, the CPU 56 reloads the new positional coordinate table 58a from the ROM 58 into the work area of the RAM 59. In S4358, the CPU 56 calculates the ratio r of the largest value d (=e(max)), detected in S4354, relative to the memory value g prestored in the ROM 58. The memory value g is preset, as shown in FIG. 13, based on a voltage value that has been generated by a sense coil 23 in response to the alternating magnetic field from the pen 60 when the battery 70 in the pen 60 is not yet used at all. In other words, the memory value g is such a voltage (initial voltage) of the sense coil 23 that has not dropped at all. It is noted that when the pen 60 is located in the intermediate line between adjacent two coils as shown in FIG. 13, the subject two coils always generate the maximum voltage values e(max) and e(max2) of the same amounts with each other, regardless of the amount of the magnetic field from the pen 60. Therefore, the ratio r between the maximum value d (=e(max), e(max2)) and the memory value g properly indicates the degree of drop in the output level of the magnetic field from the pen 60.

In S4360, the CPU 56 multiplies, by the ratio r, each value DIFF in the positional coordinate table 58a (FIG. 10(b)) which is now reloaded in the work area of the RAM 59. By doing this operation, the positional coordinate table 58a is updated to values that properly correspond to the present output level from the pen 60. Then, the X coordinate is calculated in the same manner as in S330 in the first embodiment.

Although not shown in the drawing, Y coordinate is calculated in the same manner as the processes of S4350–S4362 in the coordinate reading routine of S300.

As described above, according to the present modification, it is possible to update the positional coordinate table 58a in association with drop in the output level from the pen 60 even if the output level of the magnetic field from the pen 60 drops. Therefore, the positional coordinates can be calculated and corrected accurately.

What is claimed is:

1. A coordinate reading device for reading a coordinate of a position of a target member, which generates an alternating magnetic field, the coordinate reading device comprising:

a coordinate input sheet that has a coordinate input surface defining a coordinate of a target member that generates an alternating magnetic field;

a loop-wire attaching member that is provided below the coordinate input sheet and that has a plurality of loop wires, each loop wire being capable of producing a signal in response to the alternating magnetic field;

a detection unit that detects the signals from the plurality of loop wires;

a coordinate determination unit that determines a coordinate of the position of the target member based on the signal from at least one of the loop wires that is selected for coordinate determination; and a correction unit that controls the coordinate determination unit to determine a corrected coordinate of the position of the target member based on a relationship between a predetermined reference value and the value of the signal from at least one of the plurality of loop wires that is selected for coordinate correction;

wherein the plurality of loop wires include one correction loop wire that is located on a predetermined position on the loop-wire attaching member and that is used exclusively for the correction operation, wherein the correction unit compares the value of the signal from the correction loop wire with the predetermined reference value, and controls the coordinate determination unit to determine the corrected coordinate of the position of the target member based on the compared result.

2. A coordinate reading device as claimed in claim 1, wherein the correction unit includes a notifying unit that notifies the compared result.

3. A coordinate reading device as claimed in claim 1, further comprising a holder member holding the target member in a manner that the target member produces the alternating magnetic field when the target member is held in the holding member, the correction loop wire being provided to the holder member.

4. A coordinate reading device as claimed in claim 1, wherein the target member employs a battery, a strength of the alternating magnetic field corresponds to a condition of the battery, the signal has a value that corresponds to the location of the target member and to the condition of the battery in the target member, and the coordinate determination unit determines a corrected coordinate of the position of the target member dependently on the condition of the battery in the target member.

5. A coordinate reading device as claimed in claim 4, wherein the correction unit determines, as data indicative of the battery condition, a relationship between a predetermined reference value and the value of the signal from at least one of the plurality of loop wires that is selected for coordinate correction, the correction unit controlling the coordinate determination unit to determine the corrected coordinate of the position of the target member based on the determined relationship.

6. A coordinate reading device for reading a coordinate of a position of a target member, which generates an alternating magnetic field, the coordinate reading device comprising:

a coordinate input sheet that has a coordinate input surface defining a coordinate of a target member that generates an alternating magnetic field;

a loop-wire attaching member that is provided below the coordinate input sheet and that has a plurality of loop wires, each loop wire being capable of producing a signal in response to the alternating magnetic field;

a detection unit that detects the signals from the plurality of loop wires;

a coordinate determination unit that determines a coordinate of the position of the target member based on the signal from at least one of the loop wires that is selected for coordinate determination; and a correction unit that controls the coordinate determination unit to determine a corrected coordinate of the position of the target member based on a relationship between a predetermined reference value and the value of the signal from at least one of the plurality of loop wires that is selected for coordinate correction;

wherein the correction unit includes:

a selection unit that selects, for coordinate correction, at least two loop wires among the plurality of loop wires, based on the relationship between the values of the signals from the at least two loop wires;

a ratio calculation unit that calculates a ratio between the value of the signal from the at least one loop wire in the at least two loop wires selected for coordinate correction and the predetermined reference value; and a control unit that controls the coordinate determination unit to determine the corrected coordinate of the position of the target member based on the calculated ratio.

7. A coordinate reading device as claimed in claim 6, wherein the selection unit selects two loop wires that are adjacent to each other and that produce the signals of the same values with each other, and wherein the ratio calculation unit calculates a ratio between the value of the signal from one loop wire in the selected two loop wires and the predetermined reference value.

8. A coordinate reading device as claimed in claim 6, wherein the selection unit selects one maximum loop wire that produces the signal of the maximum values among all the loop wires and two adjacent loop wires that are adjacent to the one loop wire.

9. A coordinate reading device as claimed in claim 8, wherein the selection unit includes a judging unit that judges whether the selected two adjacent loop wires produce the signals of the same values, the ratio calculation unit calculating a ratio between the value of the maximum loop wire and the predetermined reference value when the two adjacent loop wires produce the signals of the same values.

10. A coordinate reading device as claimed in claim 8, wherein the selection unit includes a judging unit that judges whether one of the selected two adjacent loop wires produces the signal of the value that is lower than a predetermined threshold value, the ratio calculation unit calculating a ratio between the value of either one of the maximum loop wire and the other one of the adjacent loop wire and the predetermined reference value when the one of the two adjacent loop wires produces the signal of the value that is lower than the predetermined threshold value.

11. A coordinate reading device as claimed in claim 10, wherein the selection unit includes a judging unit that judges whether one of the selected two adjacent loop wires produces the signal substantially of a zero value.

12. A coordinate reading device as claimed in claim 10, wherein the predetermined threshold value is greater than a level of noise that is generated when the target member generates no alternating magnetic field.

13. A coordinate reading device as claimed in claim 10, wherein the plurality of loop wires are arranged so that each loop wire extends in a predetermined direction, each two adjacent loop wires defining a region between the center lines of the subject two adjacent loop wires, each two adjacent loop wires generating signals of levels greater than other remaining loop wires when the target member is located within the corresponding region.

14. A coordinate reading device as claimed in claim 10, wherein the plurality of loop wires are arranged so that each loop wire generates a signal, whose value has a primary peak and a pair of secondary peaks appearing in both sides of the primary peak and whose value has a pair of null points at a pair of borders that are defined between the primary peak and the pair of secondary peaks, the null points obtained for the plurality of loop wires being arranged substantially at a uniform interval.

15. A coordinate reading device as claimed in claim 6, wherein the selection unit selects one loop wire and two adjacent loop wires that are adjacent to the one loop wire and that produce the signals of the same values, the ratio calculation unit calculating a ratio between the value of the one loop wire that is sandwiched between the two adjacent loop wires and the predetermined reference value when the two adjacent loop wires produce the signals of the same values.

16. A coordinate reading device as claimed in claim 15, wherein the plurality of loop wires are arranged parallel with one another and are overlapped with one another in a widthwise direction of the loop wires by a half width of each loop wire.

17. A coordinate reading device as claimed in claim 6, wherein the ratio calculation unit includes:
   a judging unit that judges whether the value of the signal from the at least one loop wire is lower than or equal to a predetermined limit value; and
   a notifying unit that notifies when the value of the signal from the at least one loop wire is lower than or equal to the predetermined limit value.

18. A coordinate reading device as claimed in claim 17, wherein the judging unit judges whether the ratio between the value of the signal from the at least one loop wire and the predetermined reference value is lower than or equal to a predetermined ratio limit value.

19. A coordinate reading device as claimed in claim 6, wherein the target member employs a battery, a strength of the alternating magnetic field corresponds to a condition of the battery, the signal has a value that corresponds to the location of the target member and to the condition of the battery in the target member, and the coordinate determination unit determines a corrected coordinate of the position of the target member dependently on the condition of the battery in the target member.

20. A coordinate reading device as claimed in claim 19, wherein the correction unit determines, as data indicative of the battery condition, a relationship between a predetermined reference value and the value of the signal from at least one of the plurality of loop wires that is selected for coordinate correction, the correction unit controlling the coordinate determination unit to determine the corrected coordinate of the position of the target member based on the determined relationship.

21. A coordinate reading device as claimed in claim 20, wherein the selection unit selects two loop wires that are adjacent to each other and that produce the signals of the same values with each other, and wherein the ratio calculation unit calculates a ratio between the value of the signal from one loop wire in the selected two loop wires and the predetermined reference value.

22. A coordinate reading device as claimed in claim 20, wherein the selection unit selects one maximum loop wire that produces the signal of the maximum values among all the loop wires and two adjacent loop wires that are adjacent to the one loop wire.

23. A coordinate reading device as claimed in claim 22, wherein the selection unit includes a judging unit that judges whether the selected two adjacent loop wires produce the signals of the same values, the ratio calculation unit calculating a ratio between the value of the maximum loop wire and the predetermined reference value when the two adjacent loop wires produce the signals of the same values.

24. A coordinate reading device as claimed in claim 22, wherein the selection unit includes a judging unit that judges whether one of the selected two adjacent loop wires produces the signal of the value that is lower than a predetermined threshold value, the ratio calculation unit calculating a ratio between the value of either one of the maximum loop wire and the other one of the adjacent loop wire and the predetermined reference value when the one of the two adjacent loop wires produces the signal of the value that is lower than the predetermined threshold value.

25. A coordinate reading device as claimed in claim 20, wherein the selection unit selects one loop wire and two adjacent loop wires that are adjacent to the one loop wire and that produce the signals of the same values, the ratio calculation unit calculating a ratio between the value of the one loop wire that is sandwiched between the two adjacent loop wires and the predetermined reference value when the two adjacent loop wires produce the signals of the same values.

26. A coordinate reading device for reading a coordinate of a position of a target member, which generates an alternating magnetic field, the coordinate reading device comprising:
   a coordinate input sheet that has a coordinate input surface defining a coordinate of a target member that generates an alternating magnetic field;
   a loop-wire attaching member that is provided below the coordinate input sheet and that has a plurality of loop wires, each loop wire being capable of producing a signal in response to the alternating magnetic field;
   a detection unit that detects the signals from the plurality of loop wires;
   a coordinate determination unit that determines a coordinate of the position of the target member based on the signal from at least one of the loop wires that is selected for coordinate determination; and
   a correction unit that controls the coordinate determination unit to determine a corrected coordinate of the position of the target member based on a relationship between a predetermined reference value and the value of the signal from at least one of the plurality of loop wires that is selected for coordinate correction;
   wherein the target member transmits attribute information of the target member,
   the coordinate reading device further comprising an attribute detection unit that detects the attribute information transmitted from the target member, the correction unit controlling the coordinate determination unit to determine the corrected coordinate of the position of the target member, both based on the relationship between the predetermined reference value and the value of the signal from the at least one loop wire selected for coordinate correction and based on the detected attribute information.

27. A coordinate reading device for reading a coordinate of a position of a target member, which generates an alternating magnetic field, the coordinate reading device comprising:
   a coordinate input sheet that has a coordinate input surface defining a coordinate of a target member that generates an alternating magnetic field;

a loop-wire attaching member that is provided below the coordinate input sheet and that has a plurality of loop wires, each loop wire being capable of producing a signal in response to the alternating magnetic field;

a detection unit that detects the signals from the plurality of loop wires;

a coordinate determination unit that determines a coordinate of the position of the target member based on the signal from at least one of the loop wires that is selected for coordinate determination; and a correction unit that controls the coordinate determination unit to determine a corrected coordinate of the position of the target member based on a relationship between a predetermined reference value and the value of the signal from at least one of the plurality of loop wires that is selected for coordinate correction;

wherein the correction unit includes:

a ratio calculation unit that calculates a ratio between the value of the signal from the at least one loop wire selected for coordinate correction and the predetermined reference value; and a control unit that controls the coordinate determination unit to determine the corrected coordinate of the position of the target member based on the calculated ratio.

28. A coordinate reading device as claimed in claim 27, wherein the control unit multiplies the calculated ratio to the value of the signal from the at least one loop wire selected for coordinate determination, and controls the coordinate determination unit to determine the corrected coordinate of the position of the target member based on the multiplied value.

29. A coordinate reading device as claimed in claim 27, wherein the coordinate determination unit includes:

a storage unit that stores table data indicative of correspondence between a plurality of sets of coordinate data and a plurality of values that correspond to the values of the signals from the plurality of loop wires; and a selecting unit that selects one set of coordinate data based on the value of the signal from the at least one loop coil selected for coordinate determination, and wherein the control unit multiplies the calculated ratio to all of the plurality of values in the table data, and controls the coordinate determination unit to determine the corrected coordinate of the position of the target member while referring to the multiplied values in the table data based on the value of the signal from the at least one loop coil selected for coordinate determination.

30. A coordinate reading device for reading a coordinate of a position of a target member, which generates an alternating magnetic field, the coordinate reading device comprising:

a coordinate input sheet that has a coordinate input surface defining a coordinate of a target member that generates an alternating magnetic field;

a loop-wire attaching member that is provided below the coordinate input sheet and that has a plurality of loop wires, each loop wire being capable of producing a signal in response to the alternating magnetic field;

a detection unit that detects the signals from the plurality of loop wires;

a coordinate determination unit that determines a coordinate of the position of the target member based on the signal from at least one of the loop wires that is selected for coordinate determination; and a correction unit that controls the coordinate determination unit to determine a corrected coordinate of the position of the target member based on a relationship between a predetermined reference value and the value of the signal from at least one of the plurality of loop wires that is selected for coordinate correction;

wherein the coordinate determining unit determines the coordinate of the position of the target member by converting the value of the signal from the at least one loop wire selected for coordinate determination into a coordinate value by a conversion manner, wherein the detection unit performs a successive series of scanning operations, each series of scanning operation being for scanningly detecting all the plurality of loop wires, and wherein the correction unit further includes:

an update timing judging unit that judges, after each scanning operation, whether a conversion manner update timing is reached, by judging whether at least two loop wires among all the loop wires produce signals of the values in a predetermined condition; and a control unit that updates the conversion manner, at the conversion manner update timing, based on the relationship between the value of the signal from one of the at least two loop wires and the predetermined reference values, and that controls the coordinate determination unit to determine the corrected coordinate of the position of the target member based on the updated conversion manner.

31. A coordinate reading device as claimed in claim 30, wherein the update timing judging unit judges whether two of the plurality of loop wires produce the signals of the same values, and wherein the control unit updates the conversion manner, based on a ratio between the value of the signal from one of the two loop wires and the predetermined reference value.

32. A coordinate reading device as claimed in claim 30, wherein the update timing judging unit judges whether one adjacent loop wire that is adjacent to a maximum loop wire, which produces the signal of the maximum value among all the loop wires, produces a signal of the value lower than a predetermined threshold value, and wherein the control unit updates the conversion manner, based on a ratio between the value of the signal from one of the maximum loop wire and the other adjacent loop wire adjacent to the maximum loop wire and the predetermined reference value.

33. A coordinate reading device as claimed in claim 30, wherein the update timing judging unit judges whether two adjacent loop wires that are adjacent to one loop wire and that sandwich the one loop wire therebetween produce the signals of the same values, and wherein the control unit updates the conversion manner, based on a ratio between the value of the signal from the one central loop wire and the predetermined reference value.

34. A coordinate reading device for reading a coordinate of a position of a target member, which generates an alternating magnetic field, the coordinate reading device comprising:

a coordinate input sheet that has a coordinate input surface defining a coordinate of a target member that generates an alternating magnetic field;

a loop-wire attaching member that is provided below the coordinate input sheet and that has a plurality of loop wires, each loop wire being capable of producing a signal in response to the alternating magnetic field;

a detection unit that detects the signals from the plurality of loop wires;

a coordinate determination unit that determines a coordinate of the position of the target member based on the signal from at least one of the loop wires that is selected for coordinate determination; and a correction unit that controls the coordinate determination unit to determine a corrected coordinate of the position of the target member based on a relationship between a predetermined reference value and the value of the signal from at least one of the plurality of loop wires that is selected for coordinate correction;

wherein the correction unit further includes:

a storage unit that stores the values of the signals detected from the plurality of loop wires until a corrected-coordinate calculation timing;

a timing judging unit that judges whether the corrected-coordinate calculation timing is reached, by judging whether at least two of the plurality of loop wires produce signals with the values in a predetermined condition; and a control unit that controls the coordinate determination unit to determine the corrected coordinate of the position of the target member at the corrected-coordinate calculation timing based on the values of the signals stored in the storage unit.

35. A coordinate reading device as claimed in claim 34, wherein the detection unit performs a successive series of scanning operations, each series of scanning operation being for scanningly detecting all the plurality of loop wires, wherein the timing judging unit judges, after each scanning operation by the detection unit, whether at least two of the plurality of loop wires have the predetermined condition, and wherein when at least two of the plurality of loop wires have the predetermined condition for some scanning operation, the control unit controls the coordinate determination unit to determine the corrected coordinate of the position of the target member based on the values of the signals that have been stored in the storage unit.

36. A coordinate reading device for reading a coordinate of a position of a target member, which generates an alternating magnetic field, the coordinate reading device comprising:

a coordinate input sheet that has a coordinate input surface defining a coordinate of a target member that generates an alternating magnetic field;

a loop-wire attaching member that is provided below the coordinate input sheet and that has a plurality of loop wires, each loop wire being capable of producing a signal in response to the alternating magnetic field;

a detection unit that detects the signals from the plurality of loop wires;

a coordinate determination unit that determines a coordinate of the position of the target member based on the signal from at least one of the loop wires that is selected for coordinate determination; and a correction unit that controls the coordinate determination unit to determine a corrected coordinate of the position of the target member based on a relationship between a predetermined reference value and the value of the signal from at least one of the plurality of loop wires that is selected for coordinate correction;

wherein the coordinate determining unit determines the coordinate of the position of the target member by converting the value of the signal from the at least one loop wire selected for coordinate determination into a coordinate value by a conversion manner, wherein the detection unit performs a successive series of scanning operations, each series of scanning operation being for scanningly detecting all the plurality of loop wires, and wherein the correction unit further includes:

an update timing judging unit that judges, after each scanning operation, whether a conversion manner update timing is reached, by judging whether at least two of the plurality of loop wires produce signals with the values in a predetermined condition, while preventing the time interval between successive conversion manner update timings from being lower than a predetermined time interval; and a control unit that updates the conversion manner at the conversion manner update timing and that controls the coordinate determination unit to determine the corrected coordinate of the position of the target member based on the updated conversion manner.

37. A coordinate reading device as claimed in claim 36, wherein the update timing judging unit includes:

a first judging unit that judges, after each scanning operation, whether the predetermined time interval has passed from the latest conversion update timing; and a second judging unit that judges, when the first judging unit judges that the predetermined time interval has passed from the latest conversion update timing, whether at least two of the plurality of loop wires have the predetermined condition, and wherein when the second judging unit judges that at least two of the plurality of loop wires have the predetermined condition for some scanning operation, the control unit updates the conversion manner, and controls the coordinate determination unit to determine the corrected coordinate of the position of the target member based on the updated conversion manner.

* * * * *